US008612884B2

(12) United States Patent
Capela et al.

(10) Patent No.: US 8,612,884 B2
(45) Date of Patent: *Dec. 17, 2013

(54) DEVICE, METHOD, AND GRAPHICAL USER INTERFACE FOR RESIZING OBJECTS

(75) Inventors: Jay Christopher Capela, Santa Cruz, CA (US); Charles J. Migos, San Bruno, CA (US); William John Thimbleby, Sunnyvale, CA (US); Christopher Douglas Weeldreyer, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/790,504

(22) Filed: May 28, 2010

(65) Prior Publication Data

US 2011/0181527 A1 Jul. 28, 2011

Related U.S. Application Data

(60) Provisional application No. 61/298,513, filed on Jan. 26, 2010.

(51) Int. Cl.
 *G06F 3/00* (2006.01)
(52) U.S. Cl.
 USPC ............................................ 715/800; 345/173
(58) Field of Classification Search
 USPC .................................. 715/800, 863; 345/173
 See application file for complete search history.

(56) References Cited

U.S. PATENT DOCUMENTS

| 4,885,786 A | 12/1989 | Anderson et al. |
| 5,283,561 A | 2/1994 | Lumelsky et al. |
| 5,327,161 A | 7/1994 | Logan et al. |
| 5,359,703 A | 10/1994 | Robertson et al. |
| 5,371,845 A | 12/1994 | Newell et al. |
| 5,483,261 A | 1/1996 | Yasutake |

(Continued)

FOREIGN PATENT DOCUMENTS

| EP | 1 577 746 A2 | 9/2005 |
| EP | 1 840 717 A1 | 10/2007 |

(Continued)

OTHER PUBLICATIONS

International Search Report and Written Opinion dated Jul. 1, 2011, in International Application No. PCT/US2011/022519, which corresponds to U.S. Appl. No. 12/790,504.

(Continued)

*Primary Examiner* — Kieu Vu
*Assistant Examiner* — Andrew Chung
(74) *Attorney, Agent, or Firm* — Morgan, Lewis & Bockius LLP

(57) ABSTRACT

A method for resizing a currently selected user interface object includes simultaneously displaying on a touch-sensitive display the currently selected user interface object having a center, and a plurality of resizing handles for the currently selected user interface object. The method also includes detecting a first contact on a first resizing handle in the plurality of resizing handles, and detecting movement of the first contact across the touch-sensitive display. The method further includes, in response to detecting movement of the first contact, when a second contact is detected on the touch-sensitive display while detecting movement of the first contact, resizing the currently selected user interface object about the center of the currently selected user interface object.

12 Claims, 47 Drawing Sheets

(56) References Cited

U.S. PATENT DOCUMENTS

| | | |
|---|---|---|
| 5,490,241 A | 2/1996 | Mallgren et al. |
| 5,511,148 A | 4/1996 | Wellner |
| 5,533,183 A | 7/1996 | Henderson, Jr. et al. |
| 5,581,670 A | 12/1996 | Bier et al. |
| 5,675,753 A | 10/1997 | Hansen et al. |
| 5,729,673 A | 3/1998 | Cooper et al. |
| 5,808,601 A | 9/1998 | Leah et al. |
| 5,825,352 A | 10/1998 | Bisset et al. |
| 5,872,559 A | 2/1999 | Shieh |
| 5,880,743 A | 3/1999 | Moran et al. |
| 5,910,800 A | 6/1999 | Shields et al. |
| 6,025,844 A | 2/2000 | Parsons |
| 6,065,021 A | 5/2000 | George |
| 6,073,036 A | 6/2000 | Heikkinen et al. |
| 6,075,531 A | 6/2000 | DeStefano |
| 6,175,364 B1 | 1/2001 | Wong et al. |
| 6,208,329 B1 | 3/2001 | Ballare |
| 6,215,490 B1 | 4/2001 | Kaply |
| 6,253,218 B1 | 6/2001 | Aoki et al. |
| 6,278,443 B1 | 8/2001 | Amro et al. |
| 6,323,846 B1 | 11/2001 | Westerman et al. |
| 6,346,935 B1 | 2/2002 | Nakajima et al. |
| 6,392,673 B1 | 5/2002 | Andrew et al. |
| 6,480,813 B1 | 11/2002 | Bloomquist et al. |
| 6,565,608 B1 | 5/2003 | Fein et al. |
| 6,570,557 B1 | 5/2003 | Westerman et al. |
| 6,646,655 B1 | 11/2003 | Brandt et al. |
| 6,657,615 B2 | 12/2003 | Harada |
| 6,677,932 B1 | 1/2004 | Westerman |
| 6,686,935 B1 | 2/2004 | Richard |
| 6,690,365 B2 | 2/2004 | Hinckley et al. |
| 6,807,361 B1 | 10/2004 | Girgensohn et al. |
| 6,888,536 B2 | 5/2005 | Westerman et al. |
| 6,903,751 B2 | 6/2005 | Saund et al. |
| 6,928,619 B2 | 8/2005 | Clow et al. |
| 7,030,861 B1 | 4/2006 | Westerman et al. |
| 7,093,192 B2 | 8/2006 | Mullen et al. |
| 7,110,005 B2 | 9/2006 | Arvin et al. |
| 7,134,093 B2 | 11/2006 | Etgen et al. |
| 7,158,158 B1 | 1/2007 | Fleming et al. |
| 7,190,379 B2 * | 3/2007 | Nissen .................... 345/660 |
| 7,216,293 B2 | 5/2007 | Kataoka et al. |
| 7,218,226 B2 | 5/2007 | Wehrenberg |
| 7,287,241 B2 | 10/2007 | Balsiger |
| 7,454,717 B2 | 11/2008 | Hinckley et al. |
| 7,456,823 B2 | 11/2008 | Poupyrev et al. |
| 7,469,381 B2 | 12/2008 | Ording |
| 7,469,833 B1 | 12/2008 | Kelley et al. |
| 7,477,233 B2 | 1/2009 | Duncan et al. |
| 7,489,324 B2 | 2/2009 | Royal et al. |
| 7,555,710 B2 * | 6/2009 | Kobashi et al. ............. 715/243 |
| 7,557,797 B2 | 7/2009 | Ludwig |
| 7,614,008 B2 | 11/2009 | Ording |
| 7,619,618 B2 | 11/2009 | Westerman et al. |
| 7,633,076 B2 | 12/2009 | Huppi et al. |
| 7,634,725 B2 * | 12/2009 | Nishikawa ................. 715/243 |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,688,306 B2 | 3/2010 | Wehrenberg et al. |
| 7,694,231 B2 | 4/2010 | Kocienda et al. |
| 7,705,830 B2 | 4/2010 | Westerman et al. |
| 7,728,823 B2 * | 6/2010 | Lyon et al. ................. 345/173 |
| 7,743,348 B2 | 6/2010 | Robbins et al. |
| 7,812,826 B2 | 10/2010 | Ording et al. |
| 7,856,605 B2 | 12/2010 | Ording et al. |
| 7,904,810 B2 | 3/2011 | Chen et al. |
| 7,934,156 B2 | 4/2011 | Forstall et al. |
| 7,936,341 B2 | 5/2011 | Weiss |
| 7,956,847 B2 | 6/2011 | Christie |
| 8,023,158 B2 | 9/2011 | Maki et al. |
| 8,024,667 B2 | 9/2011 | Shaw et al. |
| 8,095,884 B2 | 1/2012 | Karunakaran et al. |
| 8,161,400 B2 | 4/2012 | Kwon |
| 8,171,401 B2 * | 5/2012 | Sun ............................ 715/252 |
| 8,171,431 B2 | 5/2012 | Grossman et al. |
| 8,176,435 B1 | 5/2012 | Jitkoff et al. |
| 8,176,438 B2 | 5/2012 | Zaman et al. |
| 8,209,630 B2 | 6/2012 | Thimbleby et al. |
| 8,276,085 B2 * | 9/2012 | Sherwani ...................... 715/761 |
| 8,291,349 B1 | 10/2012 | Park et al. |
| 8,291,350 B1 | 10/2012 | Park et al. |
| 8,312,387 B2 * | 11/2012 | Williams et al. .............. 715/800 |
| 2002/0015024 A1 | 2/2002 | Westerman et al. |
| 2002/0018075 A1 | 2/2002 | Maulik et al. |
| 2002/0057292 A1 | 5/2002 | Holtz |
| 2002/0062321 A1 | 5/2002 | Shibata |
| 2002/0109668 A1 | 8/2002 | Rosenberg et al. |
| 2002/0109708 A1 | 8/2002 | Peurach et al. |
| 2002/0161772 A1 | 10/2002 | Bergelson et al. |
| 2003/0014382 A1 | 1/2003 | Iwamoto et al. |
| 2003/0128192 A1 | 7/2003 | van Os |
| 2003/0142137 A1 | 7/2003 | Brown et al. |
| 2003/0210268 A1 | 11/2003 | Kataoka et al. |
| 2004/0066407 A1 | 4/2004 | Regan et al. |
| 2004/0088656 A1 | 5/2004 | Washio |
| 2004/0141009 A1 | 7/2004 | Hinckley et al. |
| 2004/0150668 A1 | 8/2004 | Myers et al. |
| 2004/0174399 A1 | 9/2004 | Wu et al. |
| 2004/0225968 A1 | 11/2004 | Look et al. |
| 2004/0239691 A1 | 12/2004 | Sprang et al. |
| 2005/0052427 A1 | 3/2005 | Wu et al. |
| 2005/0068290 A1 | 3/2005 | Jaeger |
| 2005/0071774 A1 | 3/2005 | Lipsky et al. |
| 2005/0088423 A1 | 4/2005 | Keely et al. |
| 2005/0091008 A1 | 4/2005 | Green et al. |
| 2005/0108620 A1 | 5/2005 | Allyn et al. |
| 2005/0108656 A1 | 5/2005 | Wu et al. |
| 2005/0231512 A1 * | 10/2005 | Niles et al. .................... 345/473 |
| 2005/0289476 A1 | 12/2005 | Tokkonen |
| 2006/0001650 A1 * | 1/2006 | Robbins et al. ................ 345/173 |
| 2006/0022955 A1 | 2/2006 | Kennedy |
| 2006/0026521 A1 | 2/2006 | Hotelling et al. |
| 2006/0033724 A1 | 2/2006 | Chaudhri et al. |
| 2006/0055662 A1 | 3/2006 | Rimas-Ribikauskas et al. |
| 2006/0055684 A1 | 3/2006 | Rimas-Ribikauskas et al. |
| 2006/0085757 A1 | 4/2006 | Andre et al. |
| 2006/0085767 A1 | 4/2006 | Hinckley et al. |
| 2006/0112335 A1 | 5/2006 | Hofmeister et al. |
| 2006/0125803 A1 | 6/2006 | Westerman et al. |
| 2006/0129945 A1 | 6/2006 | Dettinger et al. |
| 2006/0136246 A1 | 6/2006 | Tu |
| 2006/0136833 A1 | 6/2006 | Dettinger et al. |
| 2006/0161870 A1 | 7/2006 | Hotelling et al. |
| 2006/0174568 A1 | 8/2006 | Kinoshita et al. |
| 2006/0184966 A1 | 8/2006 | Hunleth et al. |
| 2006/0190833 A1 | 8/2006 | SanGiovanni et al. |
| 2006/0197750 A1 | 9/2006 | Kerr et al. |
| 2006/0197753 A1 | 9/2006 | Hotelling |
| 2006/0238517 A1 | 10/2006 | King et al. |
| 2006/0238521 A1 | 10/2006 | Westerman et al. |
| 2006/0248469 A1 | 11/2006 | Czerwinski et al. |
| 2006/0279532 A1 | 12/2006 | Olszewski et al. |
| 2007/0050726 A1 | 3/2007 | Wakai et al. |
| 2007/0067711 A1 | 3/2007 | Woodall et al. |
| 2007/0079236 A1 | 4/2007 | Schrier et al. |
| 2007/0113198 A1 | 5/2007 | Robertson et al. |
| 2007/0126732 A1 | 6/2007 | Robertson et al. |
| 2007/0152980 A1 | 7/2007 | Kocienda et al. |
| 2007/0152984 A1 | 7/2007 | Ording et al. |
| 2007/0160345 A1 | 7/2007 | Sakai et al. |
| 2007/0177803 A1 | 8/2007 | Elias et al. |
| 2007/0186178 A1 | 8/2007 | Schiller |
| 2007/0192744 A1 | 8/2007 | Reponen |
| 2007/0192749 A1 | 8/2007 | Baudisch |
| 2007/0198942 A1 | 8/2007 | Morris |
| 2007/0220444 A1 | 9/2007 | Sunday et al. |
| 2007/0229471 A1 | 10/2007 | Kim et al. |
| 2007/0236475 A1 | 10/2007 | Wherry |
| 2007/0245257 A1 | 10/2007 | Chan et al. |
| 2007/0247435 A1 | 10/2007 | Benko et al. |
| 2007/0253025 A1 | 11/2007 | Terayoko |
| 2007/0257890 A1 | 11/2007 | Hotelling |
| 2008/0022197 A1 | 1/2008 | Bargeron et al. |

(56) References Cited

U.S. PATENT DOCUMENTS

| | | |
|---|---|---|
| 2008/0034317 A1 | 2/2008 | Fard et al. |
| 2008/0036743 A1 | 2/2008 | Westerman et al. |
| 2008/0042978 A1 | 2/2008 | Perez-Noguera |
| 2008/0052945 A1 | 3/2008 | Matas et al. |
| 2008/0066016 A1 | 3/2008 | Dowdy et al. |
| 2008/0072173 A1 | 3/2008 | Brunner et al. |
| 2008/0094368 A1 | 4/2008 | Ording et al. |
| 2008/0100642 A1* | 5/2008 | Betancourt et al. ........... 345/663 |
| 2008/0109751 A1 | 5/2008 | Fitzmaurice et al. |
| 2008/0140868 A1 | 6/2008 | Kalayjian et al. |
| 2008/0147664 A1 | 6/2008 | Fujiwara et al. |
| 2008/0148181 A1 | 6/2008 | Reyes et al. |
| 2008/0150715 A1 | 6/2008 | Tang et al. |
| 2008/0165141 A1 | 7/2008 | Christie |
| 2008/0165142 A1 | 7/2008 | Kocienda et al. |
| 2008/0167834 A1 | 7/2008 | Herz et al. |
| 2008/0180404 A1 | 7/2008 | Han et al. |
| 2008/0180405 A1 | 7/2008 | Han et al. |
| 2008/0180406 A1 | 7/2008 | Han et al. |
| 2008/0186285 A1 | 8/2008 | Shimizu |
| 2008/0211766 A1 | 9/2008 | Westerman et al. |
| 2008/0229223 A1 | 9/2008 | Kake |
| 2008/0244410 A1 | 10/2008 | Schormann |
| 2008/0259040 A1 | 10/2008 | Ording et al. |
| 2008/0267468 A1 | 10/2008 | Geiger et al. |
| 2008/0270886 A1 | 10/2008 | Gossweiler et al. |
| 2008/0278455 A1 | 11/2008 | Atkins et al. |
| 2008/0284799 A1 | 11/2008 | Hollemans et al. |
| 2008/0297482 A1 | 12/2008 | Weiss |
| 2008/0303786 A1 | 12/2008 | Nakamura et al. |
| 2008/0309632 A1 | 12/2008 | Westerman et al. |
| 2008/0320391 A1 | 12/2008 | Lemay et al. |
| 2009/0013350 A1 | 1/2009 | Ohlfs et al. |
| 2009/0051660 A1 | 2/2009 | Feland, III et al. |
| 2009/0051946 A1 | 2/2009 | Hibi |
| 2009/0079700 A1 | 3/2009 | Abernathy |
| 2009/0113330 A1 | 4/2009 | Garrison et al. |
| 2009/0122018 A1 | 5/2009 | Vymenets et al. |
| 2009/0150775 A1 | 6/2009 | Miyazaki et al. |
| 2009/0158326 A1 | 6/2009 | Hunt et al. |
| 2009/0164936 A1* | 6/2009 | Kawaguchi ................ 715/788 |
| 2009/0172606 A1 | 7/2009 | Dunn et al. |
| 2009/0174679 A1 | 7/2009 | Westerman |
| 2009/0183930 A1 | 7/2009 | Yang et al. |
| 2009/0184939 A1 | 7/2009 | Wohlstadter et al. |
| 2009/0228792 A1 | 9/2009 | van Os et al. |
| 2009/0231275 A1 | 9/2009 | Odgers |
| 2009/0237363 A1 | 9/2009 | Levy et al. |
| 2009/0239587 A1 | 9/2009 | Negron et al. |
| 2009/0256809 A1 | 10/2009 | Minor |
| 2009/0256857 A1 | 10/2009 | Davidson et al. |
| 2009/0259964 A1 | 10/2009 | Davidson et al. |
| 2009/0282332 A1 | 11/2009 | Porat |
| 2009/0303231 A1 | 12/2009 | Robinet et al. |
| 2009/0307589 A1 | 12/2009 | Inose et al. |
| 2009/0309881 A1 | 12/2009 | Zhao et al. |
| 2009/0327975 A1 | 12/2009 | Stedman |
| 2010/0002002 A1 | 1/2010 | Lipsky et al. |
| 2010/0007623 A1 | 1/2010 | Kaneko et al. |
| 2010/0017734 A1 | 1/2010 | Cummins et al. |
| 2010/0031203 A1 | 2/2010 | Morris et al. |
| 2010/0053111 A1* | 3/2010 | Karlsson ................ 345/174 |
| 2010/0058238 A1 | 3/2010 | Ben Moshe |
| 2010/0088624 A1 | 4/2010 | Bligh et al. |
| 2010/0088641 A1 | 4/2010 | Choi |
| 2010/0090971 A1 | 4/2010 | Choi et al. |
| 2010/0095205 A1 | 4/2010 | Kinoshita |
| 2010/0095206 A1 | 4/2010 | Kim |
| 2010/0107101 A1 | 4/2010 | Shaw et al. |
| 2010/0134425 A1* | 6/2010 | Storrusten ................ 345/173 |
| 2010/0146436 A1 | 6/2010 | Jakobson et al. |
| 2010/0156813 A1 | 6/2010 | Duarte et al. |
| 2010/0162105 A1 | 6/2010 | Beebe et al. |
| 2010/0185949 A1 | 7/2010 | Jaeger |
| 2010/0214571 A1 | 8/2010 | Luo |
| 2010/0218100 A1 | 8/2010 | Simon et al. |
| 2010/0228746 A1 | 9/2010 | Harada |
| 2010/0231533 A1 | 9/2010 | Chaudhri |
| 2010/0235794 A1 | 9/2010 | Ording |
| 2010/0283743 A1 | 11/2010 | Coddington |
| 2010/0283750 A1 | 11/2010 | Kang et al. |
| 2010/0302176 A1* | 12/2010 | Nikula et al. ................ 345/173 |
| 2010/0313125 A1 | 12/2010 | Fleizach et al. |
| 2010/0313126 A1 | 12/2010 | Jung et al. |
| 2010/0318904 A1 | 12/2010 | Hillis et al. |
| 2010/0325529 A1 | 12/2010 | Sun |
| 2010/0333044 A1 | 12/2010 | Kethireddy |
| 2011/0004830 A1 | 1/2011 | Von Kaenel et al. |
| 2011/0010672 A1 | 1/2011 | Hope |
| 2011/0012848 A1 | 1/2011 | Li et al. |
| 2011/0012856 A1 | 1/2011 | Maxwell et al. |
| 2011/0029927 A1 | 2/2011 | Lietzke et al. |
| 2011/0029934 A1 | 2/2011 | Locker et al. |
| 2011/0069017 A1 | 3/2011 | Victor |
| 2011/0069018 A1 | 3/2011 | Atkins et al. |
| 2011/0074710 A1 | 3/2011 | Weeldreyer et al. |
| 2011/0093812 A1 | 4/2011 | Fong |
| 2011/0109581 A1* | 5/2011 | Ozawa et al. ................ 345/173 |
| 2011/0128367 A1* | 6/2011 | Yoshioka et al. ............... 348/79 |
| 2011/0145759 A1 | 6/2011 | Leffert et al. |
| 2011/0163944 A1 | 7/2011 | Bilbrey et al. |
| 2011/0163968 A1 | 7/2011 | Hogan |
| 2011/0179368 A1 | 7/2011 | King et al. |
| 2011/0179373 A1 | 7/2011 | Moore et al. |
| 2011/0185316 A1 | 7/2011 | Reid et al. |
| 2011/0185321 A1 | 7/2011 | Capela et al. |
| 2011/0209104 A1 | 8/2011 | Hinckley et al. |
| 2011/0231796 A1 | 9/2011 | Vigil |
| 2011/0252370 A1 | 10/2011 | Chaudhri |
| 2011/0252380 A1 | 10/2011 | Chaudhri |
| 2011/0252381 A1 | 10/2011 | Chaudhri |
| 2011/0258537 A1 | 10/2011 | Rives et al. |
| 2011/0302519 A1 | 12/2011 | Fleizach et al. |
| 2012/0023453 A1 | 1/2012 | Wagner |
| 2012/0023459 A1 | 1/2012 | Westerman |
| 2012/0030569 A1 | 2/2012 | Migos et al. |
| 2012/0044150 A1 | 2/2012 | Karpin et al. |

FOREIGN PATENT DOCUMENTS

| | | |
|---|---|---|
| EP | 2 060 970 A1 | 5/2009 |
| EP | 2 068 237 A2 | 6/2009 |
| EP | 2 284 675 A2 | 2/2011 |
| WO | WO 00/16186 A2 | 3/2000 |
| WO | WO 2006/020305 A2 | 2/2006 |
| WO | WO 2007/008243 | 8/2007 |
| WO | WO 2008/138046 A1 | 11/2008 |

OTHER PUBLICATIONS

Angeil, "Is Bimanual the Future Paradigm for Human Computer Interaction?" University of Plymouth, 2006, 36 pages.

Apted et al., "Tabletop Sharing of Digital Photographs for the Elderly," CHI 2006 Proceedings, Apr. 2006, Montreal, Quebec, Canada, 10 pages.

Beaudouin-Lafon et al., "CPN/Tools: A Post-WIMP Interface for Editing and Simulating Coloured Petri Nets," Proceeding of 22nd International Conference on Applications and Theory of Petri Nets 2001, 10 pages.

Bederson, B., "PhotoMesa: A Zoomable Image Browser Using Quantum Treemaps and Bubblemaps," UIST 2001, Orlando, Florida, Nov. 2001, 10 pages.

Benko et al., "Precise Selection Techniques for Multi-Touch Screens," CHI 2006, Apr. 22-27, 2006, 10 pages.

Brandi, et al., "Combining and Measuring the Benefits of Bimanuai Pen and Direct-Touch Interaction on Horizontai Interfaces," AVI '08, May 2008, Naples, Italy, 8 pages.

Brandi, P. "Combining and Measuring the Benefits of Bimanuai Pen and Direct-Touch Interaction on Horizontal Interfaces," Media Interaction Lab: May 2008, siide presentation, 26 pages.

Butz et al., "Hybrid Wldgets on an Interactive Tabletop," Ubicomp '07, Sep. 2007, Innsbruck, Austria, 7 pages.

(56) References Cited

OTHER PUBLICATIONS

Buxton, W. et al., "A Study in Two-Handed Input," Proceedings of CHI '86, Apr. 1986, Boston, MA. 10 pages.
Buxton, W. et al., "Issues and Techniques in Touch-Sensitive Tablet Input." Computer Graphics 19(3), http://www.dgp.toronto.edu/OTP/papers/bill.buxton/touch.html, Proceedings of Siggraph'85, 15 pages.
Buxton, W. et al., "Multi-Touch Systems that I Have Known and Loved." Jan. 12, 2007, 14 pages, http://www,billbuxton.com/multitouchOverview.html.
Buxton, W., "Chapter 5: Case Study 1: Touch Tablets," Haptic Input, Jan. 4, 2009, 20 pages.
Buxton, W., "Chapter 11: Two-Handed input in Human-Computer Interaction," Aug. 22, 2008, 16 pages.
Chen et al., "Relative role of merging and two-handed operation on command selection speed," Int. J. Human-Computer Studies 66 (2008) 729-740 (12), Jun. 2008.
Cho et al., "Interaction for Tabletop Computing Environment: An Analysis and Implementation" Science and Technology(2005), ACM, pp. 11-18.
Couturier et al., "Pointing Fingers: Using Multiple Direct Interactions with Visual Objects to Perform Music," Proceedings of the 2003 Conference on New Interfaces for Musical Expression, May 2003, Montreal, Canada, 4 pages.
Derene, G., "Microsoft Surface: Behind-the-Scenes First Look," Popular Mechanics.com, Jul. 1, 2007, http://popularmechanics.com/technology/gadgets/news/4217348?page=3, 4 pages.
Guimbretière et al., "Benefits of Merging Command Selection and Direct Manipulation," ACM Transaction on Computer-Human Interaction, vol. 12, No. 3, Sep. 2005, 17 pages.
Guimbretière, F., "Curriculum Vitae," 2008, 5 pages.
Hinckley, K., "Haptic Issues for Virtual Manipulation," University of Virginia, Dissertation presented Dec. 1996, http://research.microsoft.com/en-us/um/people/kenh/all-published-papers/hinckley-thesis-haptic-issues-for-virtual-manipulation.pdf 216 pages.
Hinckley et al., "Interaction and Modefing Techniques for Desktop Two-Handed Input," UIST'98, San Francisco, CA, Nov. 1998, 10 pages.
Hodges et al., "ThinSight: Versatile Multi-touch Sensing for Thin Form-factor Displays," UIST'07, Oct. 7-10, 2007, Newport, Rhode Island, USA, 10 pages.
Inkscape, "Inkscape tutorial: Basic," Inkscape.org, Apr. 20, 2005, http://web.archive.org/web/20051225021958/http://inkscape.org/doc/basic/tutorial-basic.html, 6 pages.
Jin et al., "GIA: design of a gesture-based interaction photo album," Pers Ubiquit Comput, Jul. 1, 2004, 7 pages.
Kristensson et al., "InfoTouch: An Explorative Multi-Touch Visualization Interface for Tagged Photo Collections," Proceedings NordiCHI 2008, Oct. 2022, 2008, 4 pages.
Kurata et al., "Tanaible Tabletop Interface for an Expert to Collaborate with Remote Field Workers," CollabTech2005, Jul. 16, 2005, slides, 27 pages.
Kurata et al., "Tangible Tabletop Interface for an Expert to Collaborate with Remote Field Workes" CollabTech2005 Jul. 16, 2005, 6 pages.
Kurtenback et al., The Design of a GUI Paradigm based on Tablets, Two hands, and Transparency, Mar. 27, 1997, 8 pages.
Lee et al., "A Multi-Touch Three Dimensional Touch-Sensitive Tablet," CHI 85 Proceedings, Apr. 1985, pp. 21-25.
Malik, S. et al., "Visual Touchpad: A Two-handed Gestural Input Device," ICMI'04, Oct. 13-15, 2004, 8 pages.
markandtanya, "Imagining multi-touch in outook," May 2008, 3 pages.
Markusson, D., "Interface Development of a Multi-Touch Photo Browser," Umea University, Master's Thesis presented Apr. 18, 2008, 76 pages.
Matsushita et al., "Dual Touch: A Two-Handed Interface for Pen-Based PDSs," UIST '00, Nov. 2000, San Diego, California 2 pages.
Matsushita et al., "HoloWall: Designing a Finger, Hand, Body, and Object Sensitive Wall," UIST '97 Banff, Aiberta, Canada, Oct. 1997, 2 pages.
Media Interaction Lab, "Bimanual Pen & Touch," Nov. 2008. http://mi-lab org/projects/bimanual-pen-touch 5 pages.
Moscovich et al., "Indirect Mappings of Multi-touch Input Using One and Two Hands," CHI 2008, Apr. 2008, Florence, Italy, 9 pages.
Moscovich et al., "Muiti-finger Cursor Techniques," GI '06 Proceedings of Graphics Interface 2006, Jun. 2006, Quebec City, Quebec, Canada, 7 pages.
Moscovich, T., "Muiti-touch Interaction," CHI 2006, Montréal, Canada, Apr. 2006, 4 pages.
Moscovich, T., "Principles and Applications of Multi-touch Interaction," Brown University, Dissertation presented May 2007, 114 pages.
Raskin, A., "Enso 2.0 Design Thoughts," Aza's Thoughts, Dec. 6, 2008, http://www.azarask.in/blog/post/enso-20-design-thoughts/, 16 pages.
Raskin, A., "Visual Feedback : Why Modes Kill," Humanized. Dec. 2006, 18 pages.
Sahlin et al., "Flash® CS4 All-in-One For Dummies® " Dec. 3 2008, John Wiley & Sons, 4 pages.
Shen, C., "Interactive tabletops: User Interface, Metaphors and Gestures," SIGGRAPH2007, Aug. 2007, 14 pages.
Shen et al., "Informing the Design of Direct-Touch Tabletops," IEEE Sep./Oct. 2006, pp. 36-45.
Tse et al., "Enabiing Interaction with Single User Applications through Speech and Gestures on a Muiti-User Tabletop," Mitsubishi Electric Research Laboratories, Dec. 2005. 9 pages.
Ullmer et al., "The metaDESK: Models and Prototypes for Tangible User Interfaces," UIST '97, Oct. 1997. Banff, Alberta, Canada, 10 pages.
Wison, A., "Robust Computer Vision-Based Detection of Pinching for One and Two Handed Gesture Input," UIST '06, Oct. 2006, Montreux, Switzesland, 4 pages.
Wu, et al., "Multi-Finger and Whole Hand Gestural Interaction Techniques for Multi-User Tabletop Displays" UIST '03, Nov. 5-7; 2003, Vancouver, BC, Canada, © ACM 2003, 10 pages.
Yee, K. "Two-Handed Interaction on a Tablet Display," SIGCHl 2004, Apr. 2004, Vienna, Austria, 4 pages.
YouTube, "A Multi-Touch Three Dimensionai Touch Sensitive Tablet," 3 minute video uploaded to YouTube by wasbuxton on Nov. 18, 2009, http://www.youtube.com/watch?v=Arrus9CxUiA, 3 pages.
YouTube, "3d desktop," 6:50 minute video uploaded to YouTube by frankode on Sep. 18, 2006, http://www.youtube.com/watch?v=j_lxBwvf3Vk&feature=related, 2 pages.
YouTube, "Auto Design on Jeff Han's Perceptive Pixel Multi-Touch," 2:11 minute video uploaded to YouTube by AutodeskLabs on Jul. 27, 2007. http://www.youtube.com/watch?v=O7ENumwMohs&feature=related, 2 pages.
YouTube, "Cubit—Open Source Multi-touch Display," 5:04 minute video uploaded to YouTube by Krisharava on May 2, 2008, http://www.youtube.com/watch?v=RJTVULGnZQ0, 3 pages.
YouTube, "Gesture Registration. Relaxation, and Reuse for Multi-Point," 4:22 minute video uploaded to YouTube by tabletopresearch201 on May 19, 2008, http://www.youtube.com/watch?v=dT4dXuah2yM, 2 pages.
YouTube, "HP TouchSmart tx2—Multi-Touch Part 2," 0:15 minute video uploaded to YouTube by unwirelife on Dec. 19, 2008, http://www.youtube.com/watch?v=Yon3vRwc94A, 3 pages.
YouTube, "I3 MultiTouch Interactive Table," 2;15 minute video uploaded by i3pgroup on Nov. 16, 2007, http://www.youtube.com/watch?v=M2oijV-bRrw&feature=related, 2 pages.
YouTube, "IdentityMine's multitude of Multi-Touch apps," 3:27 minute video uploaded to YouTube by ContinuumShow on Nov. 6, 2008, http://www.youtube.com/watch?v=HcpdNb9LHns 3 pages.
YouTube, "Jeff Han's 8 ft Multi-Touch Display Wall," 4:39 minute video uploaded to YouTube by aiai6666 on May 16, 2007, http://www.youtube.com/watch?v=jfFwgPuEdSk&feature=related, 2 pages.
YouTube, "LG.Philips 52-inch multi-touch display," 1:36 minute video uploaded to YouTube by engadget on Jan. 8, 2008 http://www.youtube.com/watch?v=9qO-diu4jq4&feature=related, 2 pages.

(56) References Cited

OTHER PUBLICATIONS

YouTube, "Lucid Touch: a See-Through Multi-Touch Mobile Device." 3:29 minute video upload by dwigdor Aug. 21, 2007, http://www.youtube.com/watch?v=qbMQ7urAvuc, 2 pages.
YouTube, "Microsoft Surface Demo," 2:10 minute video uploaded to YouTube by zac96 on Aug. 17 2007, http://www.youtube.com/watch?v=rKgU6ubBgJA&feature=related, 2 pages.
YouTube, "Microsoft Surface Demo .@CES 2008," 9.58 minute video uploaded to YouTube by GerbiBod7 on Jan. 8, 2008, http://www.youtube.com/watch?v=Zxk_WywMTzc&feature=related, 2 pages.
YouTube, "Minority Report Interface Prototype," 1:52 minute video uploaded to YouTube by alevalli on Jul. 12, 2006, http://www.youtube.com/watch?v=3bn-zZX9kdc, 3 pages.
YouTube, "Multi-touch Interaction: Browser Control," 1:12 minute video uploaded to YouTube by HCiKonstanz on Sep. 12. 2008, http://www.youtube.com/watch?v=jTOK5Zbfm4U, 2 pages.
YouTube, "Multi-touch interface (from Adobe TED)," 9:33 minute video uploaded to YouTube by f0xmuld3r on Aug. 3, 2006, http://youtube.com/watch?v=UcKqyn-gUbY, 2 pages.
YouTube "Multi Touch (new touchscreen technology)," 3:31 minute video uploaded to YouTube by chanfrado on Mar. 17, 2006, http://www.youtube.com/watch?v=1ftJhDBZqss&feature=related, 2 pages.
YouTube, "Muiti-touch Time and Geo Tagoina Photosharing with IntuiFace," 2:21 minute video uploaded to YouTube by IntuILab on Jan. 31, 2008, http://www.youtube.com/watch?v=ftsx21liFvo, 3 pages.
YouTube. "PhotoApp (Multi-Touch)," 1:45 video uploaded to YouTube by NePsihus on Dec. 30, 2007http://www.youtube.com/watch?v=RJTVULGnZQ0, 3 pages.
YouTube, "Photoshop MT-Desktop Digitai Imaging on FTIR multitouch," 5:38 minute video uploaded to YouTube by thomasglaeser on Feb. 7, 2007, http://www.youtube.com/watch?v=JmHNr9EH1/U&feature=related, 2 pages.
YouTube, "Photo Touch: Multi-touch Photo Organization for your Mac," 8:03 minute video uploaded to YouTube by cocoadex on Mar. 30, 2008, http.//www.youtube.com/watch?v=D7x7jV3P1-0, 3 pages.
YouTube, "Smart Surface Beta," 1:56 minute video uploaded to YouTube by vanderlin on Mar. 29, 2008, http://youtube.com/watch?v=68wFqxdXENw&feature=related, 3 pages.
YouTube"TDesk Multiuser," 1:11 minute video uploaded to YouTube by bestsheep1 on Sep. 6, 2007, http.youtube.com/watch?v=PjsO-lbll34&feature=related, 2 pages.
YouTube, "Wii Multi-touch Photo Gallery," 1:25 minute video uploaded, to YouTube by darthstoo on Apr. 10, 2008, http://www.youtube.com/watch?v=0CYVxQ2OM9s, 3 pages.
Invitation to Pay Additional Fees dated Apr. 29, 2010, in International Application No. PCT/US2009/057899, which corresponds to U.S. Appl. No. 12/507,405, 8 pages (Victor).
International Search Report and Written Opinion dated Jun. 14, 2010, in international Application No. PCT/US2009/057899, which corresponds to U.S. Appl. No. 12/567,405, 23 pages (Victor).
International Search Report and Written Opinion dated Dec. 13, 2011, in International Patent Application No. PCT/US2011/045552, which corresponds to U.S. Appl. No. 12/848,067, 12 pages (Migos).
Office Action dated May 17, 2012, in U.S. Appl. No. 12/567,405, 21 pages (Victor).
Office Action dated Jul. 6, 2012, in U.S. Appl. No. 12/567,171, 13 pages (Missig).
Office Action dated Aug. 4, 2011, in U.S. Appl. No. 12/567,460, 14 pages (Victor).
Notice of Allowance dated Jan. 18, 2012, in U.S. Appl. No. 12/567,460, 8 pages (Victor).
Notice of Allowance dated Aug. 10, 2012, in U.S. Appl. No. 12/567,460, 14 pages (Victor).
Office Action dated Sep. 16, 2011, in U.S. Appl. No. 12/567,553, 12 pages (Victor).
Final Office Action dated Mar. 12, 2012, in U.S. Appl. No. 12/567,553, 15 pages (Victor).
Notice of Allowance dated Jun. 12, 2012, in U.S. Appl. No. 12/567,553, 8 pages (Victor).
Notice of Allowance dated Aug. 10, 2012, in U.S. Appl. No. 12/567,553, 13 pages (Victor).
Office Action dated Nov. 7, 2012, in U.S. Appl. No. 12/790,508, 33 pages (Capela).
Office Action dated Aug. 9, 2012, in U.S. Appl. No. 12/848,063, 14 pages (Migos).
Office Action dated Jun. 6, 2012, in U.S. Appl. No. 12/848,067, 17 pages (Migos).
Office Action dated Jun. 29, 2012, in U.S. Appl. No. 12/848,074, 12 pages (Migos).
Apple.com, "Pages Keyboard Shortcuts," Apple.com, downloaded Jan. 18, 2010, http://www.apple.com/support/pages/shortcuts/, 6 pages.
Baudisch, P., "The Cage: Efficient Construction in 3D using a Cubic Adaptive Grid," Proceedings of the 9th Annual ACM Symposium on User Interface Software and Technology, Nov. 6, 1996, 2 pages.
Cutedraw, "Moving, Rotating, Resizing and Flipping Shapes," Cutedraw.com, 2007, http://www.cutedraw.com/Moving,%20Rotating,%20Resizing%20Flipping%20Shapes.php, 5 pages.
Faas, R., "Spaces: A look at Apple's take on virtual desktops in Leopard," Computerworld, Nov. 21, 2006, http://www.computerworld.com/s/article/print/9005267/Spaces_A_...tual_desktops_in_Leoparad?taxonomyName. . . , 3 pages.
FingerWorks, "Installation and Operation Guide for the TouchStream" Copyright© 2002, 14 pages, www.fingerworks.com.
FingerWorks, "Quick Reference Guide for iGesture Products," Copyright© 1999-2002,4 pages, www.fingerworks.com.
FingerWorks, "Quick Reference Guide for TouchStream ST/LP," Copyright © 2001-2003, 4 pages, www.fingerworks.com.
FingerWorks, "Installation and Operation Guide for Igesture. Products w/Keys," Copyright© 2002, 10 pages, www.fingerworks.com.
FingerWorks, "TouchStrearn LP Silver" Apr. 27, 2005, 18 pages, http://www.fingerworks.com.
FingerWorks Forums, "Finger works Support Forums—Product Comments—TouchStream KeyBoards—Is the Multitouch Lemur," Dec. 24, 2004: http://64233.167.104/search?q=cache:sjVdtyFBvRMJ;forums.finger, 2 pages.
Google docs. "Drawings: Moving, resizing and rotating objects," Google.com, downloaded Jan. 18, 2010, http://docs.google.com/support/bin/answer.py?hl=en&answer=141914, 1 pages.
Hudson, S., "Adaptive Semantic Snapping—A technique for Semantic Feedback at the Lexical Level," Proceedings of the ACM CHI 90 Human Factors in Computing Systems Conference Apr. 1990, Seattle, Washington, 6 pages.
IBM, "Resizing shapes by dragging sizing handles," IBM WebSphere Help System, 1999, http://publib.boulder.ibm.com/infocenter/wsadhelp/v5r1m2/index.jsp?topic=/com.rationai.xtools.umivisualizer.doc/topics/tresizedrag.html, 1 pages.
Kane et al., "Slide Rule; Making Mobile Touch Screens Accessibie to Blind People Using Multi-Touch Interaction Techniques," Proceedings of ACM SIGACCESS Conference on Computers and Accessibility, Halifax, Nova Scotia, Canada, Oct. 2008, 8 pages.
Karsenty et al., "Inferring Graphical Constraints with Rookit," Digital-Paris Research Laboratory, Mar. 1992, www.hpl.hp.com/techreports/Compaq-DEC/PRL-RR-17.pdf, 30 pages.
Microsoft.com, "Quickly copy formatting with the Format Painter," Microsoft.com, 2003, http://office.microsoft.com/enus/help/HA012176404033.aspx, 1 page.
Microsoft.com, "Resize an object," Microsoft Office Online, 2010, http://office.microsoft.com/en-us/publisher/HP051139751033.aspx, 2 pages.
Mueller et al., "Visio 2007 for Dummies" John Wiley & Sons, Dec. 2006, pp. 178-181.
Murphy, P., "Review: SBSH Calendar Touch," justanothermobilemonday.com. Dec. 8, 2008, http://justanothermobilemonday.com/Wordpress/2008/12/08/review-sbsh-calendar-touch/. 7 pages.

(56) References Cited

OTHER PUBLICATIONS

Westerman, W., "Hand Tracking Finger Identification and Chordic Manipulation on a Multi-touch Surface," Doctoral Dissertation, submitted Spring 1999, 363 pages.
Wikipedia, "Spaces (software)," Wikipedia, the free encyclopedia, Jul. 15, 2009, http://en.wilipedia.org/wiki/Spaces_(software), 3 pages.
Wikipedia, "Virtual desktop," Wikipedia, the free encyclopedia, Jul. 20 2009, http://en.wikipedia.org/wiki/Virtual_desktop, 3 pages.
International Search Report and Written Opinion dated Apr. 27, 2011, in International Application No. PCT/US2011/022525, which corresponds to U.S. Appl. No. 12/790,508.
International Search Report and Written Opinion dated May 24, 2011, in International Application No. PCT/US2011/022532, which corresponds to U.S., Appl. No. 12/790,524, 18 pages (Capela).
International Preliminary Report on Patentability dated Feb. 14, 2013, in International Application No. PCT/US2011/045552, which corresponds to U.S. Appl. No. 12/848,067, 8 pages (Migos).
Final Office Action dated Dec. 17, 2012, in U.S. Appl. No. 12/567,405, 19 pages (Victor).
Final Office Action dated Jan. 3, 2013, in U.S. Appl. No. 12/567,171, 20 pages (Missig).
Office Action dated Aug. 30, 2012, in U.S. Appl. No. 12/567,206, 13 pages (Missig).
Final Office Action dated Apr. 4, 2013, in U.S. Appl. No. 12/567,206, 30 pages (Missig).
Office Action dated Jun. 7, 2012, in U.S. Appl. No. 12/768,623, 12 pages (Weeldreyer).
Final Office Action dated Jan. 22, 2013, in U.S. Appl. No. 12/768,623, 37 pages (Weeldreyer).
Office Action dated May 30, 2013, in U.S. Appl. No. 12/768,623, 34 pages (Weeldreyer).
Notice of Allowance dated Dec. 24, 2012, in U.S. Appl. No. 12/567,460, 17 pages (Victor).
Notice of Allowance dated Apr. 10, 2013, in U.S. Appl. No. 12/567,460, 11 pages (Victor).
Notice of Allowance dated Dec. 24, 2012, in U.S. Appl. No. 12/567,553, 12 pages (Victor).
Notice of Allowance dated Apr. 2, 2013, in U.S. Appl. No. 12/567,553, 11 pages (Victor).
Notice of Allowance dated Dec. 19, 2012, in U.S. Appl. No. 12/567,570, 10 pages (Victor).
Notice of Allowance dated Mar. 27, 2013, in U.S. Appl. No. 12/567,570, 11 pages (Victor).
Office Action dated Feb. 2, 2012, in U.S. Appl. No. 12/790,516, 11 page (Capela).
Office Aciton dated Aug. 27, 2012, in U.S. Appl. No. 12/790,516, 10 pages (Capela).
Notice of Allowance dated May 15, 2013, in U.S. Appl. No. 12/790,516, 21 pages (Capela).
Office Action dated Sep. 24, 2012, in U.S. Appl. No. 12/790,524, 23 pages (Capela).
Notice of Allowance dated Feb. 5, 2013, in U.S. Appl. No. 12/790,524, 9 pages (Capela).
Notice of Allowance dated May 13, 2013, in U.S. Appl. No. 12/790,524, 19 pages (Capela).
Office Action dated Mar. 29, 2013, in U.S. Appl. No. 12/848,063, 21 pages (Migos).
Office Action dated Mar. 7, 2013, in U.S. Appl. No. 12/848,087, 27 pages (Migos).
Final Office Action dated Jan. 10, 2013, in U.S. Appl. No. 12/848,067, 43 (Migos).
Final Office Action dated Apr. 3, 2013, in U.S. Appl. No. 12/848,074, 25 pages (Migos).

* cited by examiner

| | |
|---|---|
| In response to detecting the second contact on the second user interface object, resize the currently selected user interface object to match one or more dimensions of the second user interface object | 710 |
| Resizing the currently selected user interface object to match one or more dimensions of the second user interface object comprises matching a height of the currently selected user interface object to a height of the second user interface object | 714 |
| Resizing the currently selected user interface object to match one or more dimensions of the second user interface object comprises matching a width of the currently selected user interface object to a width of the second user interface object | 716 |
| Resizing the currently selected user interface object to match one or more dimensions of the second user interface object comprises matching a height of the currently selected user interface object to a height of the second user interface object and matching a width of the currently selected user interface object to a width of the second user interface object | 718 |
| Resizing the currently selected user interface object to match one or more dimensions of the second user interface object comprises, when the currently selected user interface object has a constrained height-to-width ratio:<br>matching a height of the currently selected user interface object to a height of the second user interface object when a first predefined condition is satisfied; and<br>matching a width of the currently selected user interface object to a width of the second user interface object when a second predefined condition is satisfied. | 720 |
| When the currently selected user interface object has a constrained height-to-width ratio, resize the currently selected user interface object, while maintaining the constrained height-to-width ratio, so as to satisfy a predefined size relationship to a bounding box for the second user interface object | 722 |

902 — Simultaneously display on a touch-sensitive display:
　　a plurality of user interface objects, wherein at least some of the user interface objects are configured to be resizable;
　　a currently selected user interface object in the plurality of user interface objects, the currently selected user interface object having a center; and
　　a plurality of resizing handles for the currently selected user interface object 904 — Detect a first contact on a first resizing handle in the plurality of resizing handles 906 — When a second contact is not detected on the touch-sensitive display while detecting movement of the first contact across the touch-sensitive display, resize the currently selected user interface object by moving the first resizing handle in accordance with the movement of the first contact 908 — When the second contact is detected on the touch-sensitive display:

910 — When the second contact is detected on a second user interface object, distinct from the currently selected user interface object, in the plurality of user interface objects, resize the currently selected user interface object to match one or more dimensions of the second user interface object 912 — When the second contact is not detected on another user interface object, distinct from the currently selected user interface object, in the plurality of user interface objects, while detecting movement of the first contact, resize the currently selected user interface object about the center of the currently selected user interface object

Figure 9

DEVICE, METHOD, AND GRAPHICAL USER INTERFACE FOR RESIZING OBJECTS

RELATED APPLICATIONS

This application claims priority to U.S. Provisional Application Ser. No. 61/298,513, filed Jan. 26, 2010, entitled "Device, Method, and Graphical User Interface for Resizing Objects," which is incorporated herein by reference in its entirety.

This application is also related to U.S. patent application Ser. No. 12/790,508, filed May 28, 2010, entitled "Device, Method, and Graphical User Interface for Resizing Objects,", which is incorporated herein by reference in its entirety.

TECHNICAL FIELD

This relates generally to electronic devices with touch-sensitive surfaces, including but not limited to electronic devices with touch-sensitive surfaces that manipulate the sizes of user interface objects.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the size (i.e., resizing) of one or more user interface objects. Exemplary user interface objects include digital images, video, text, icons, and other graphics. A user may need to perform such manipulations on user interface objects in a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), or a spreadsheet application (e.g., Numbers from Apple Inc. of Cupertino, Calif.).

But existing methods for resizing objects are cumbersome and inefficient. For example, existing keyboard-based methods require memorizing particular keys sequences for performing different resizing operations, which creates a significant cognitive burden on a user. In addition, existing keyboard-based methods take longer than necessary, thereby wasting energy. This latter consideration is particularly important in battery-operated devices.

SUMMARY

Accordingly, there is a need for computing devices with faster, more efficient methods and interfaces for resizing user interface objects that do not require the use of a keyboard. Such methods and interfaces may complement or replace conventional methods for resizing user interface objects. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a computing device with a touch-sensitive display. The method includes simultaneously displaying on the touch-sensitive display: a currently selected user interface object having a center; and a plurality of resizing handles for the currently selected user interface object. The method also includes: detecting a first contact on a first resizing handle in the plurality of resizing handles; and detecting movement of the first contact across the touch-sensitive display. The method further includes, in response to detecting movement of the first contact: when a second contact is not detected on the touch-sensitive display while detecting movement of the first contact, resizing the currently selected user interface object by moving the first resizing handle in accordance with the movement of the first contact; and, when a second contact is detected on the touch-sensitive display while detecting movement of the first contact, resizing the currently selected user interface object about the center of the currently selected user interface object.

In accordance with some embodiments, a method is performed at a computing device with a touch-sensitive display. The method includes simultaneously displaying on the touch-sensitive display: a plurality of user interface objects, wherein at least some of the user interface objects are configured to be resizable; a currently selected user interface object in the plurality of user interface objects; and a plurality of resizing handles for the currently selected user interface object. The method also includes: detecting a first contact on a first resizing handle in the plurality of resizing handles; and, while detecting the first contact on the first resizing handle, detecting a second contact on a second user interface object, distinct from the currently selected user interface object, in the plurality of user interface objects. The method further includes, in response to detecting the second contact on the second user interface object, resizing the currently selected user interface object to match one or more dimensions of the second user interface object.

In accordance with some embodiments, a method is performed at a computing device with a touch-sensitive display. The method includes simultaneously displaying on the touch-sensitive display: a plurality of user interface objects, wherein at least some of the user interface objects are configured to be resizable; a currently selected user interface object in the plurality of user interface objects; and a plurality of resizing handles for the currently selected user interface object. The method also includes detecting a first contact on a first resizing handle in the plurality of resizing handles. The method further includes, while detecting the first contact: detecting a second contact on a second user interface object, distinct from the currently selected user interface object, in the plurality of user interface objects; detecting movement of the first contact across the touch-sensitive display; displaying one or more indicia for the currently selected user interface object that show when a height and/or width of the currently selected user interface object matches a height and/or width of the second user interface object; and resizing the currently selected user interface object in accordance with the movement of the first contact across the touch-sensitive display.

In accordance with some embodiments, a method is performed at a computing device with a touch-sensitive display. The method includes simultaneously displaying on the touch-sensitive display: a plurality of user interface objects, wherein at least some of the user interface objects are configured to be resizable; a currently selected user interface object in the plurality of user interface objects, the currently selected user interface object having a center; and a plurality of resizing handles for the currently selected user interface object. The method also includes detecting a first contact on a first resizing handle in the plurality of resizing handles. The method further includes, when a second contact is not detected on the touch-sensitive display while detecting movement of the first contact across the touch-sensitive display, resizing the currently selected user interface object by moving the first resizing handle in accordance with the movement of the first contact. The method further includes, when the second contact is detected on the touch-sensitive display: when the second contact is detected on a second user interface object, distinct from the currently selected user interface object, in the plurality of user interface objects, resizing the currently selected user interface object to match one or more dimensions of the second user interface object; and, when the second contact is not detected on another user interface object, distinct from the currently selected user interface object, in the plurality of user interface objects, while detecting movement of the first contact, resizing the currently selected user interface object about the center of the currently selected user interface object.

In accordance with some embodiments, a computing device includes a touch-sensitive display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a computing device with a touch-sensitive display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a computing device with a touch-sensitive display, cause the device to perform the operations of any of the methods described above. In accordance with some embodiments, a computing device includes: a touch-sensitive display; and means for performing the operations of any of the methods described above. In accordance with some embodiments, an information processing apparatus, for use in a computing device with a touch-sensitive display, includes means for performing the operations of any of the methods described above.

Thus, computing devices with touch-sensitive displays are provided with faster, more efficient methods and interfaces for resizing user interface objects, thereby increasing the effectiveness, efficiency, and user satisfaction with such devices. Such methods and interfaces may complement or replace conventional methods for resizing user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7B are flow diagrams illustrating a method of performing size matching of user interface objects in accordance with some embodiments.

FIG. 9 is a flow diagram illustrating a method of performing side/corner resizing, center-resizing, or size matching in accordance with some embodiments.

DESCRIPTION OF EMBODIMENTS

Figure 1A:
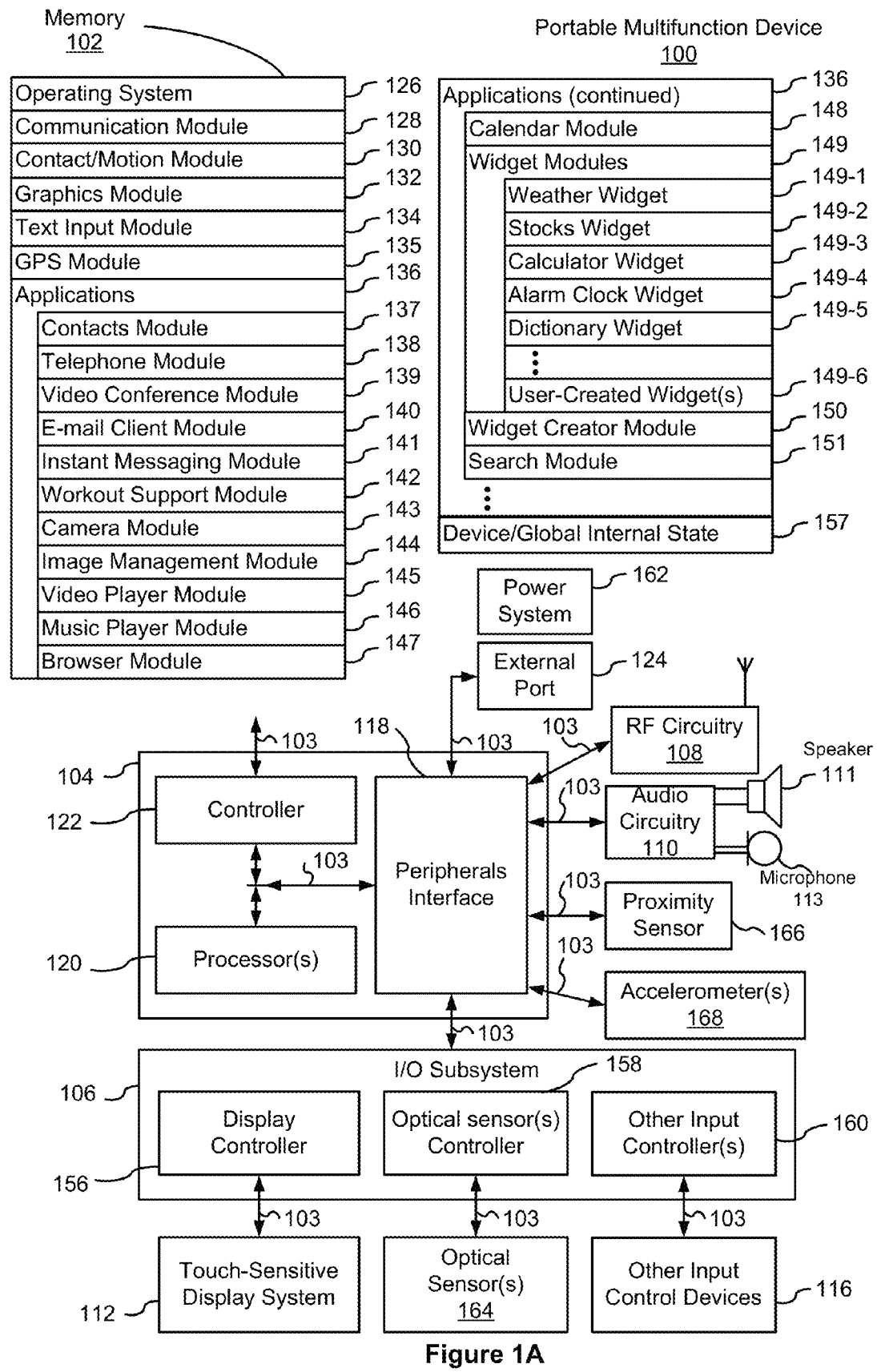
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
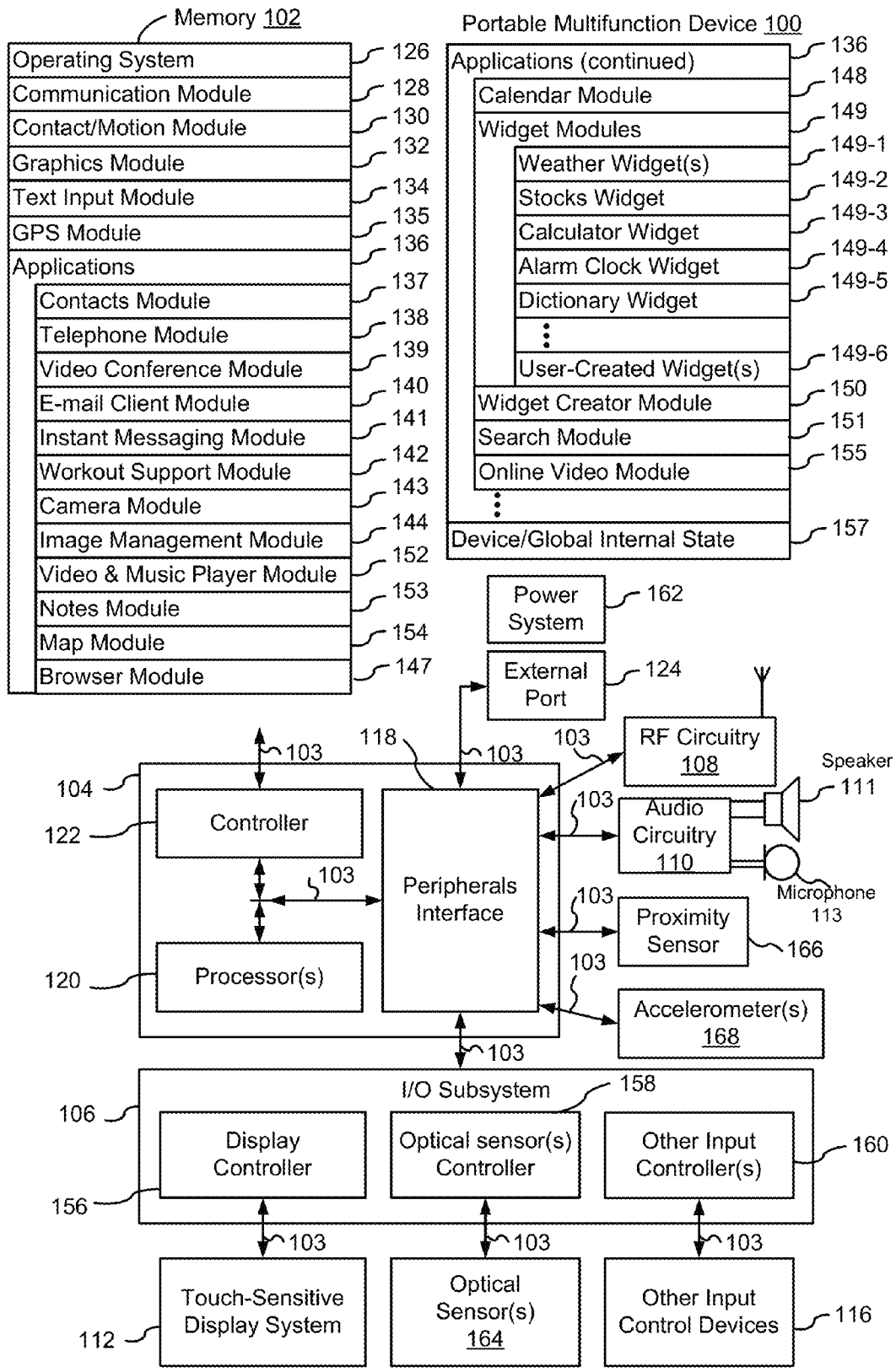

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; Ser. No. and 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S.

Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
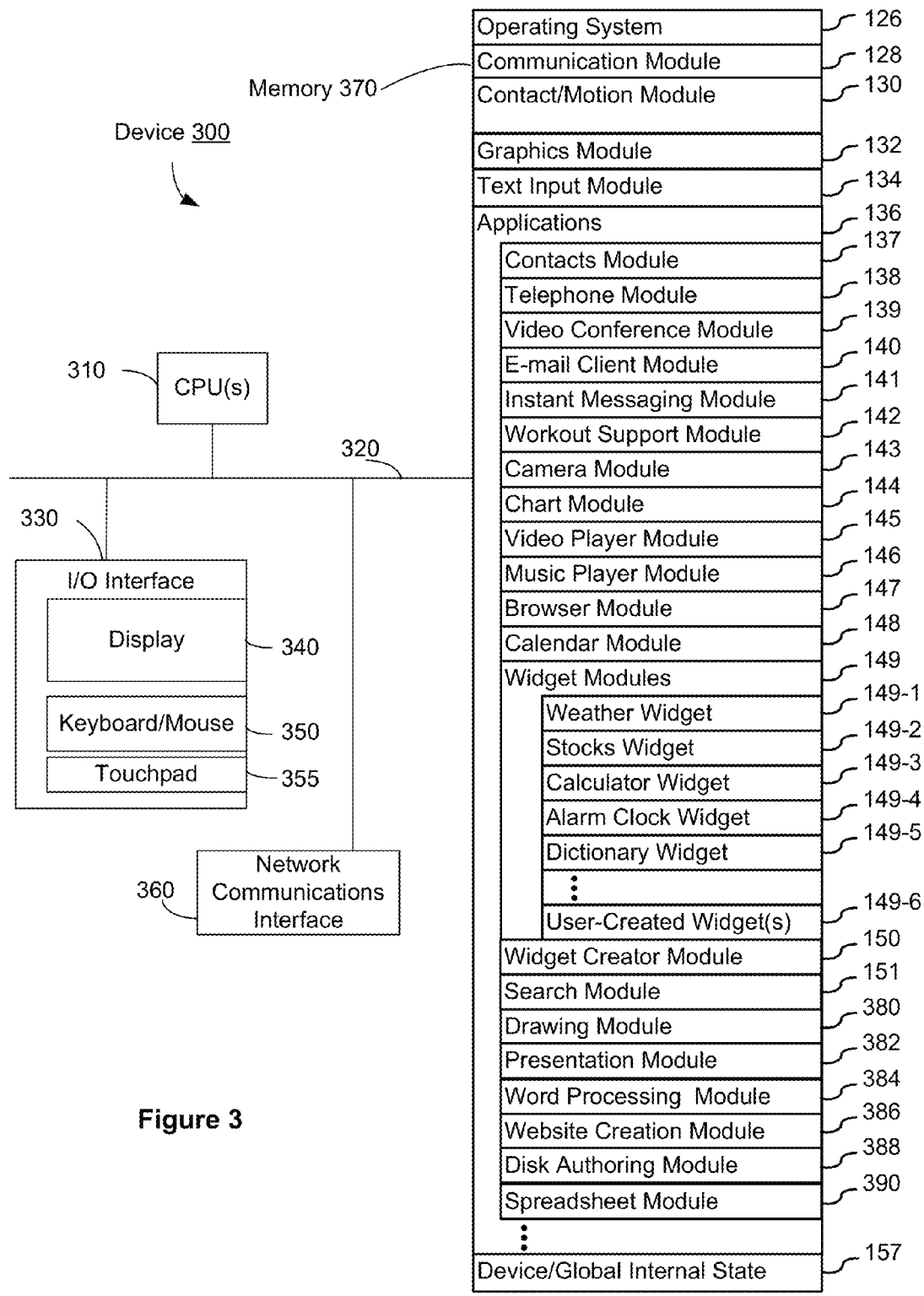
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;

video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
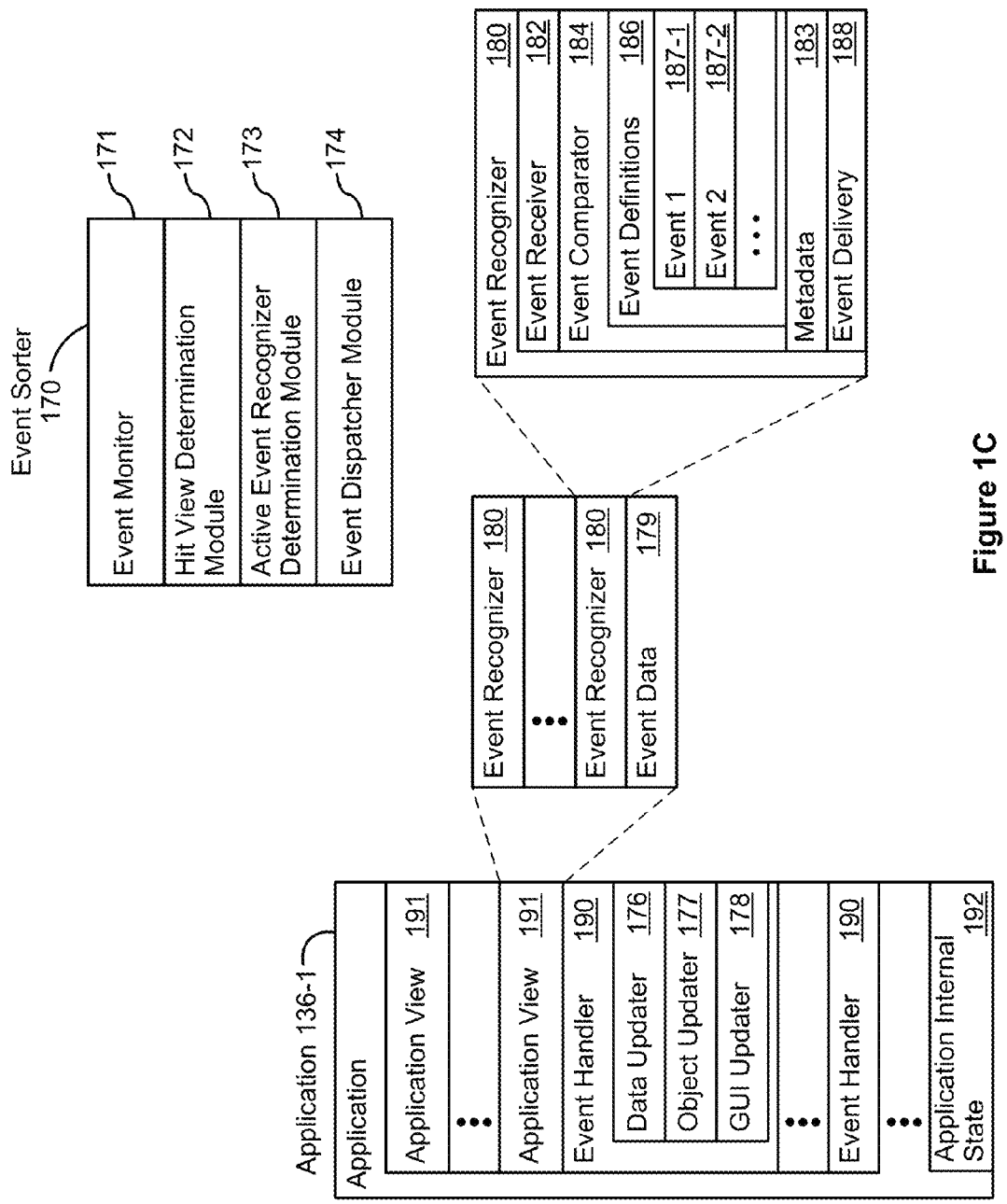
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
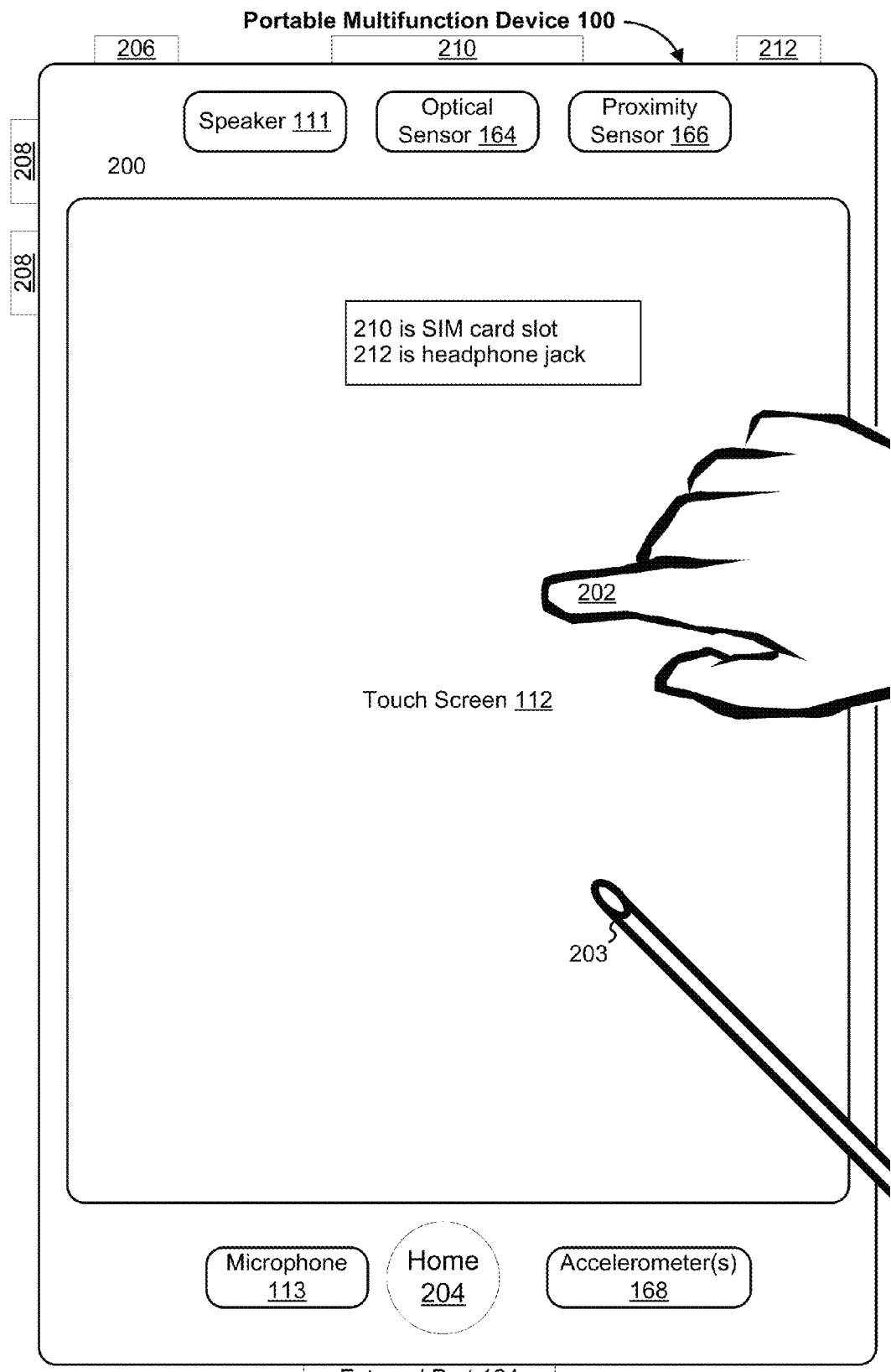
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
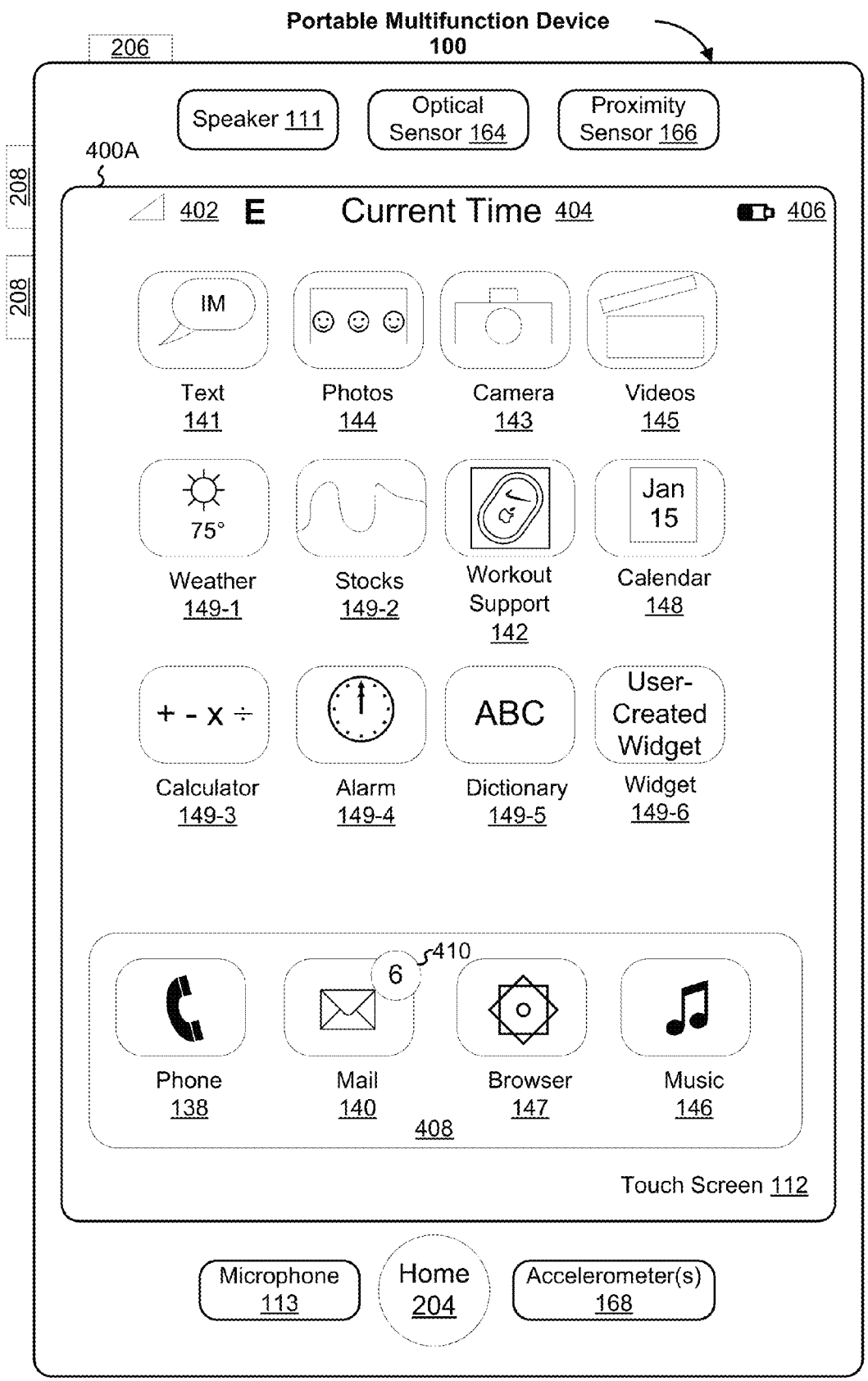
FIGS. 4A and 4B illustrate exemplary user interfaces for a menu of applications on a portable multifunction device in accordance with some embodiments.
Figure 4B:
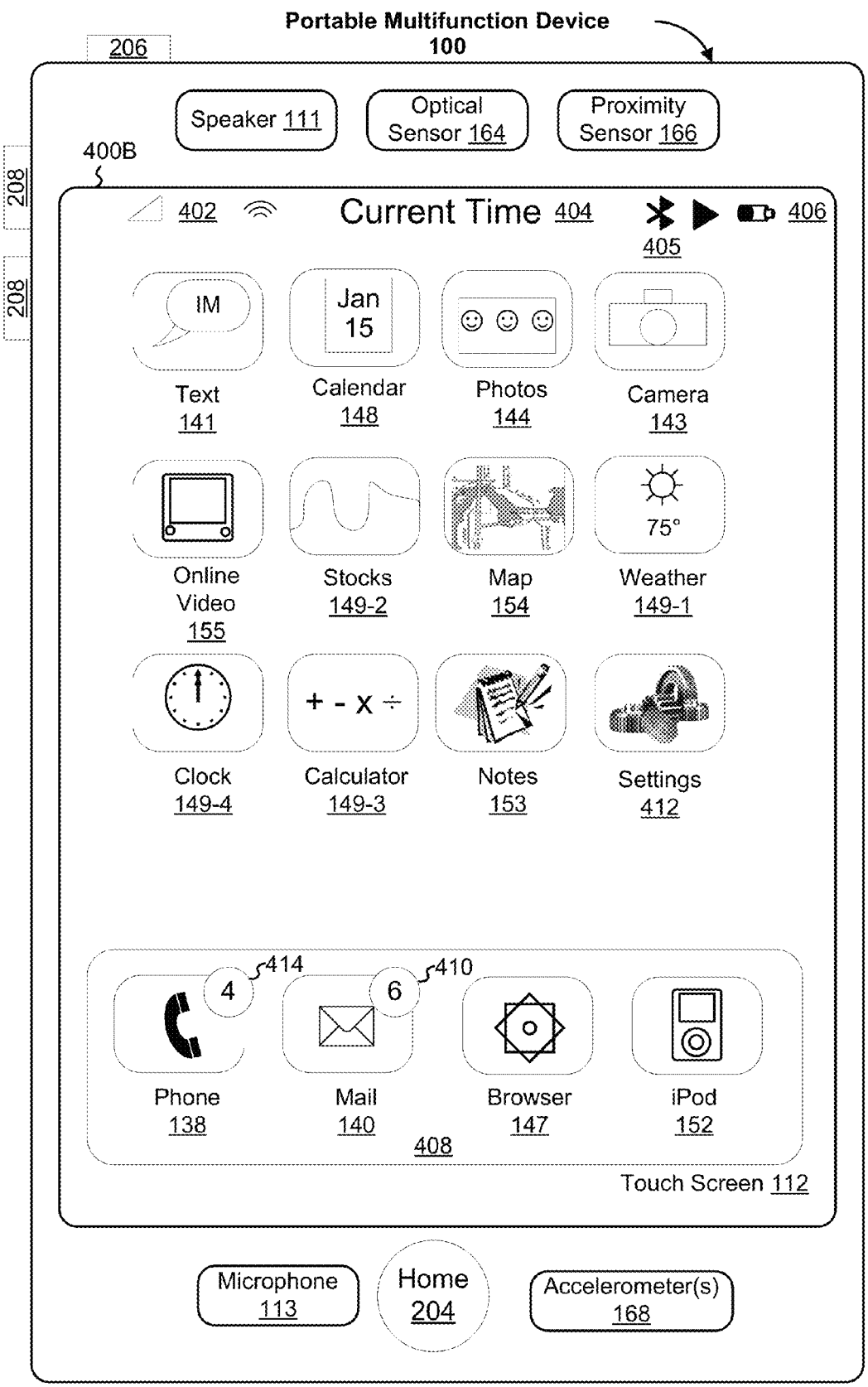

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for device 100 and its various applications 136, as described further below;
  Video and music player module 152, also referred to as iPod (trademark of Apple Inc.) module 152; and
  Online video module 155, also referred to as YouTube (trademark of Google Inc.) module 155.

Figure 4C:
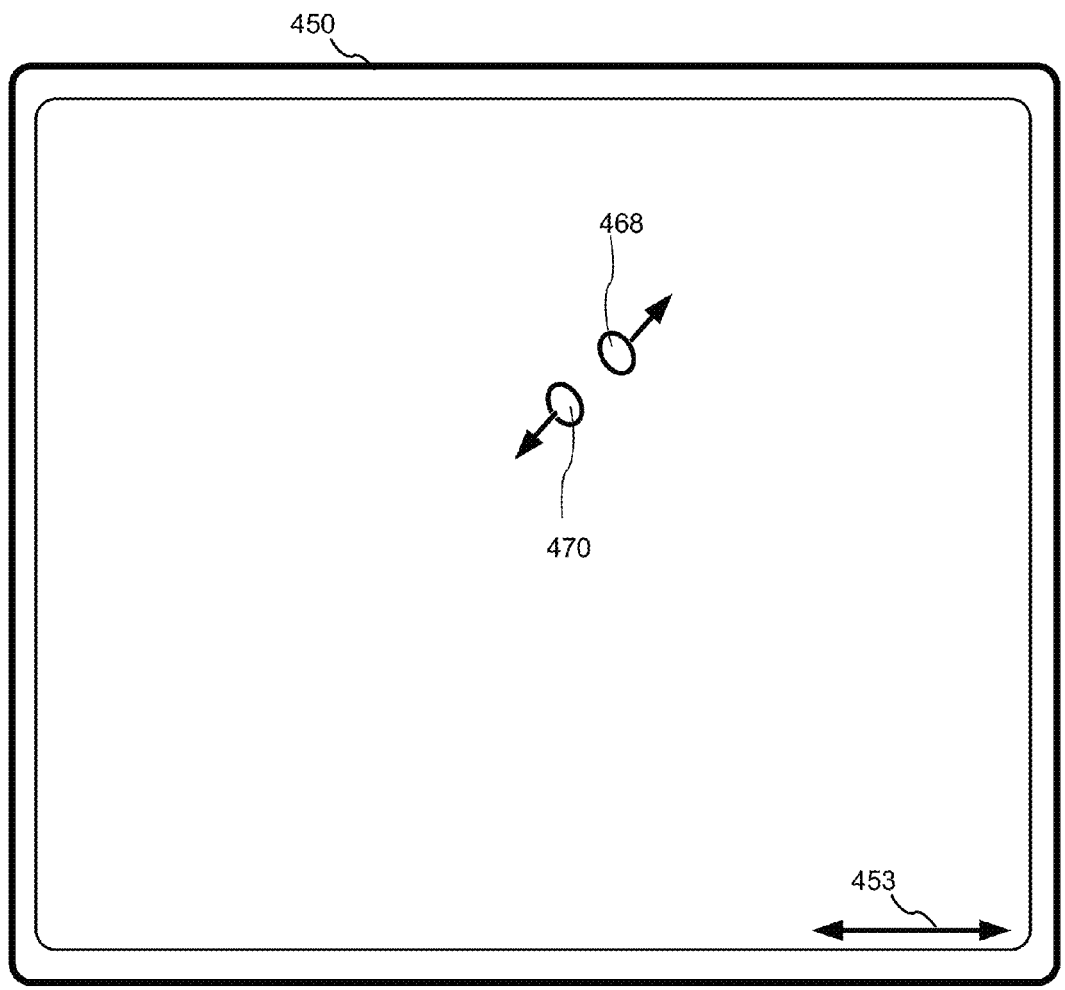
FIG. 4C illustrates an exemplary user interface for a multifunction device with a touch-sensitive surface that is separate from the display in accordance with some embodiments.
Figure 4C:
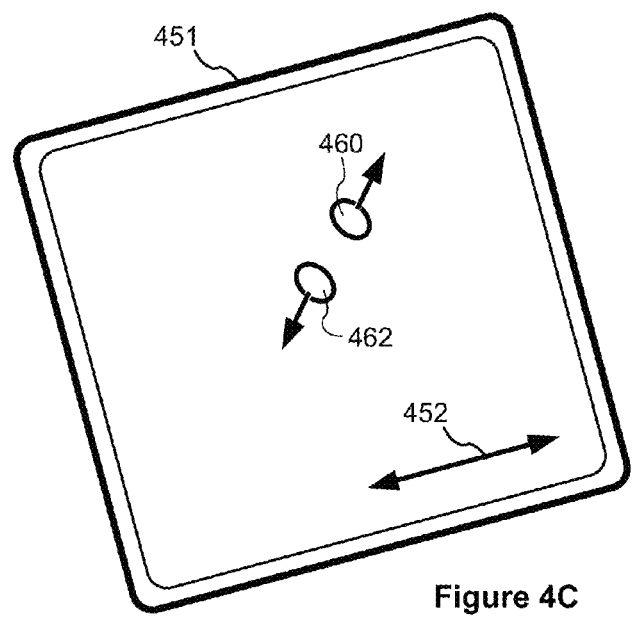

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Attention is now directed towards embodiments of user interfaces ("UI") and associated processes that may be implemented on a multifunction device with a display and a touch-sensitive surface, such as device 300 or portable multifunction device 100.

FIGS. 5A-5GG illustrate exemplary user interfaces for resizing objects in accordance with some embodiments. The user interfaces in these figures are used to illustrate the processes described below, including the processes in FIGS. 6, 7A-7B, 8, and 9.

Although FIGS. 5A-5GG illustrate exemplary user interfaces containing graphical objects (e.g., shapes and images), the illustrative discussions below are not intended to be exhaustive or to limit the invention to the precise forms disclosed. For example, similar user interfaces can be used to resize other objects (e.g., text boxes, tables, charts, diagrams, figures, pictures, photographs, pages, documents, etc.).

In FIGS. 5A-5GG, some finger contact movement sizes may be exaggerated for illustrative purposes. No depiction in the figures bearing on finger contact movements should be taken as a requirement or limitation for the purpose of understanding sizes and scale associated with the methods and devices disclosed herein.

FIG. 5A-5M illustrates exemplary user interface associated with "center-resizing" of an object.

Figure 5A:
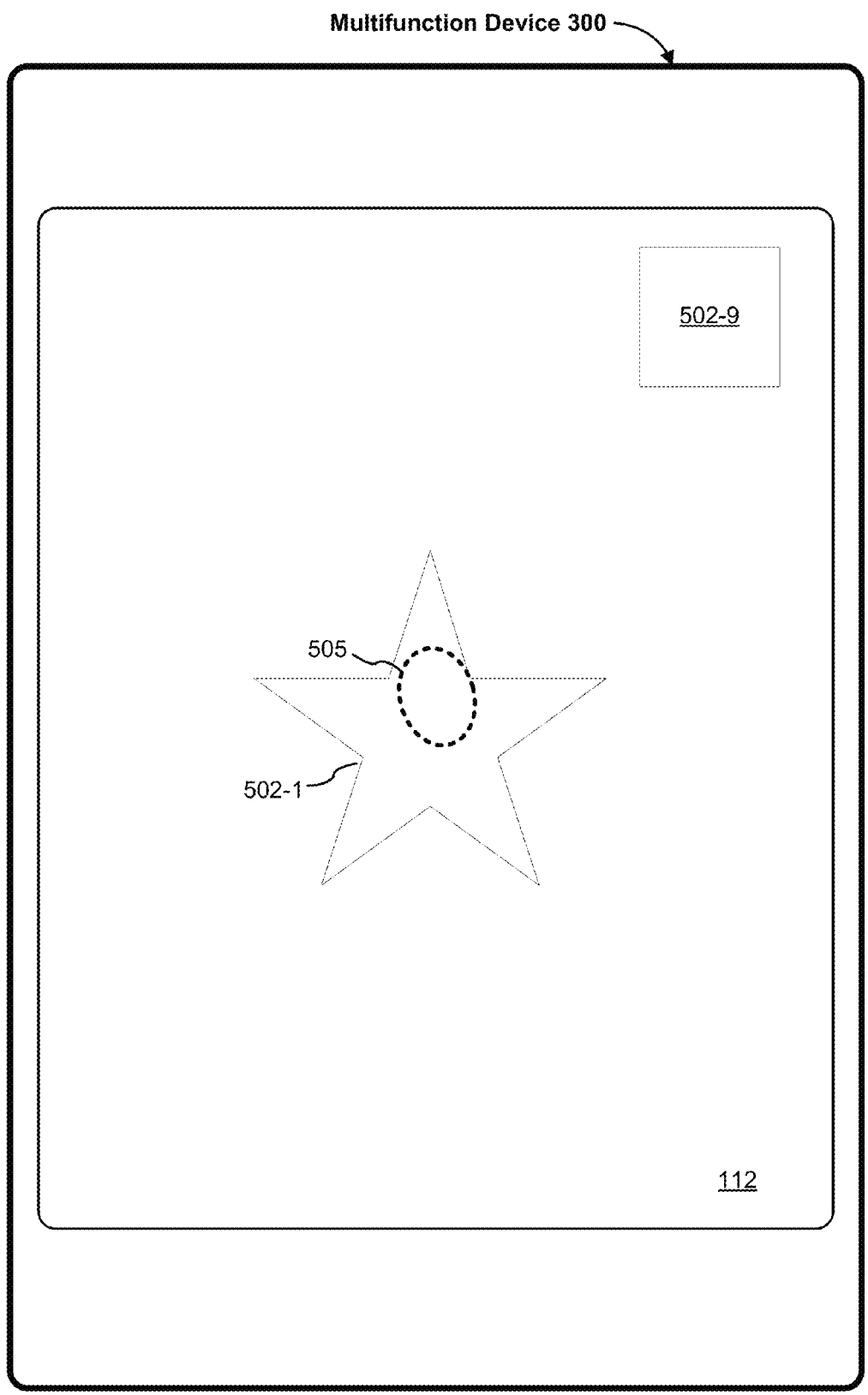
FIGS. 5A-5GG illustrate exemplary user interfaces for resizing objects in accordance with some embodiments.

FIG. 5A depicts an exemplary user interface displaying objects 502-1 and 502-9 on touch screen 112 of multifunction device 300. FIG. 5A also illustrates a detection of tap 505 at a location on touch screen 112 corresponding to the location of object 502-1, thereby selecting object 502-1.

Figure 5B:
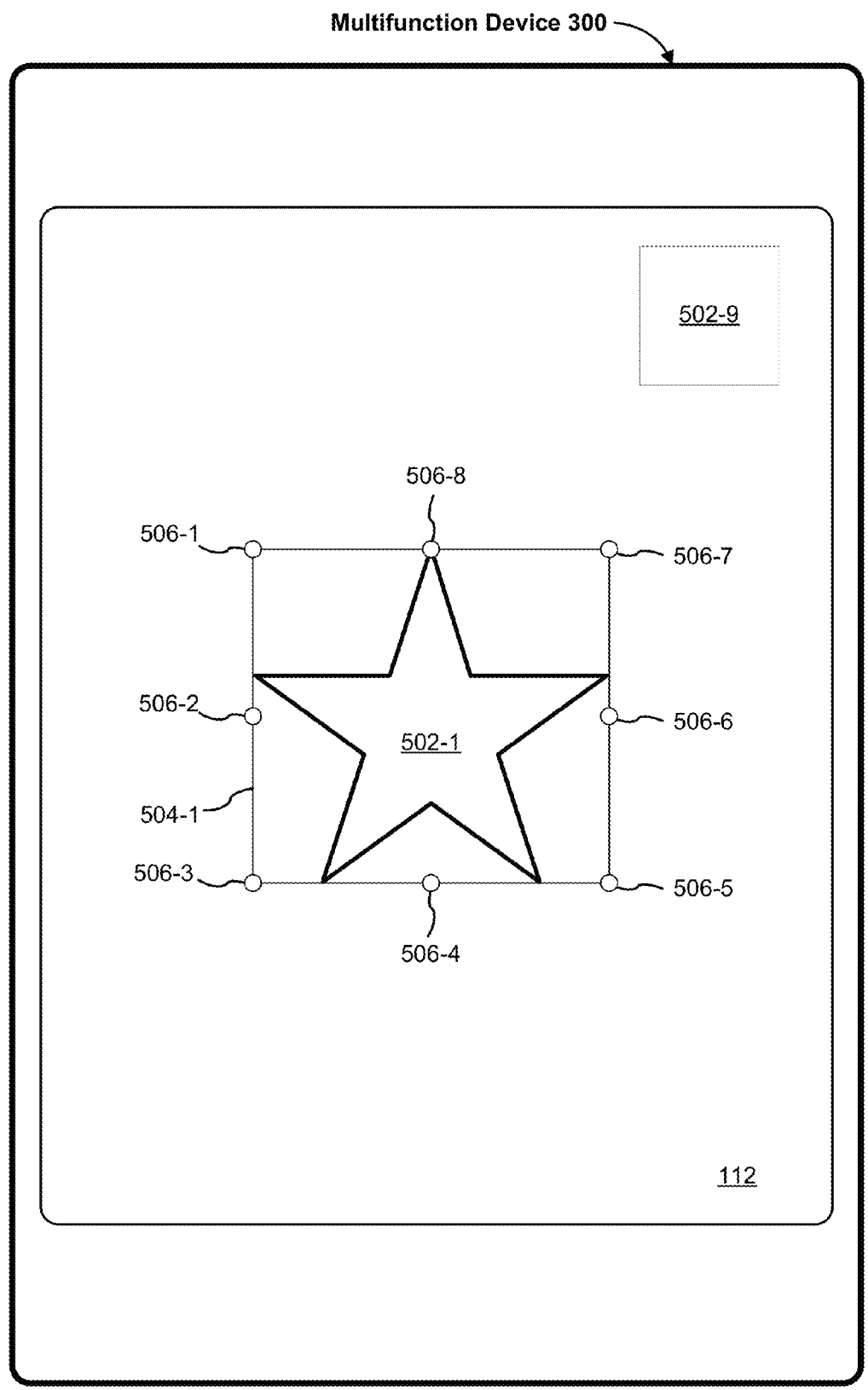

FIG. 5B illustrates that object 502-1 is selected. In this example, selected object 502-1 is visually distinguished (e.g., the selected object has a thicker border than when unselected). Also bounding box 504-1 is displayed around selected object 502-1. In this example, bounding box 504-1 is a rectangle that fits selected object 502-1, and the width and height of bounding box 504-1 matches the width and height of object 502-1. In some embodiments, a bounding box includes a predetermined margin around the object it contains. In some embodiments, the predetermined margin is a user-selected value (e.g., in pixels or in length). Bounding box 504-1 includes a plurality of handles 506, which when activated (e.g., by a finger contact) initiate the resizing of the selected object in a "side/corner resizing". In this "side/corner resizing" mode, the side(s)/corner of the bounding box of the currently selected object that include a first sizing handle (e.g., 506-5) move in concert with the movement of the first contact, while the sides of the bounding box that do not include the first sizing handle remain stationary. For example, in FIG. 5C, the top and left sides (which do not include handle 506-5) of bounding box 504-1 remain stationary, and the bottom-right corner and the bottom and right sides (which include handle 506-5) of bounding box 504-1 move in concert with the movement of contact 507. While being resized, the object scales in accordance with the bounding box.

Figure 5C:
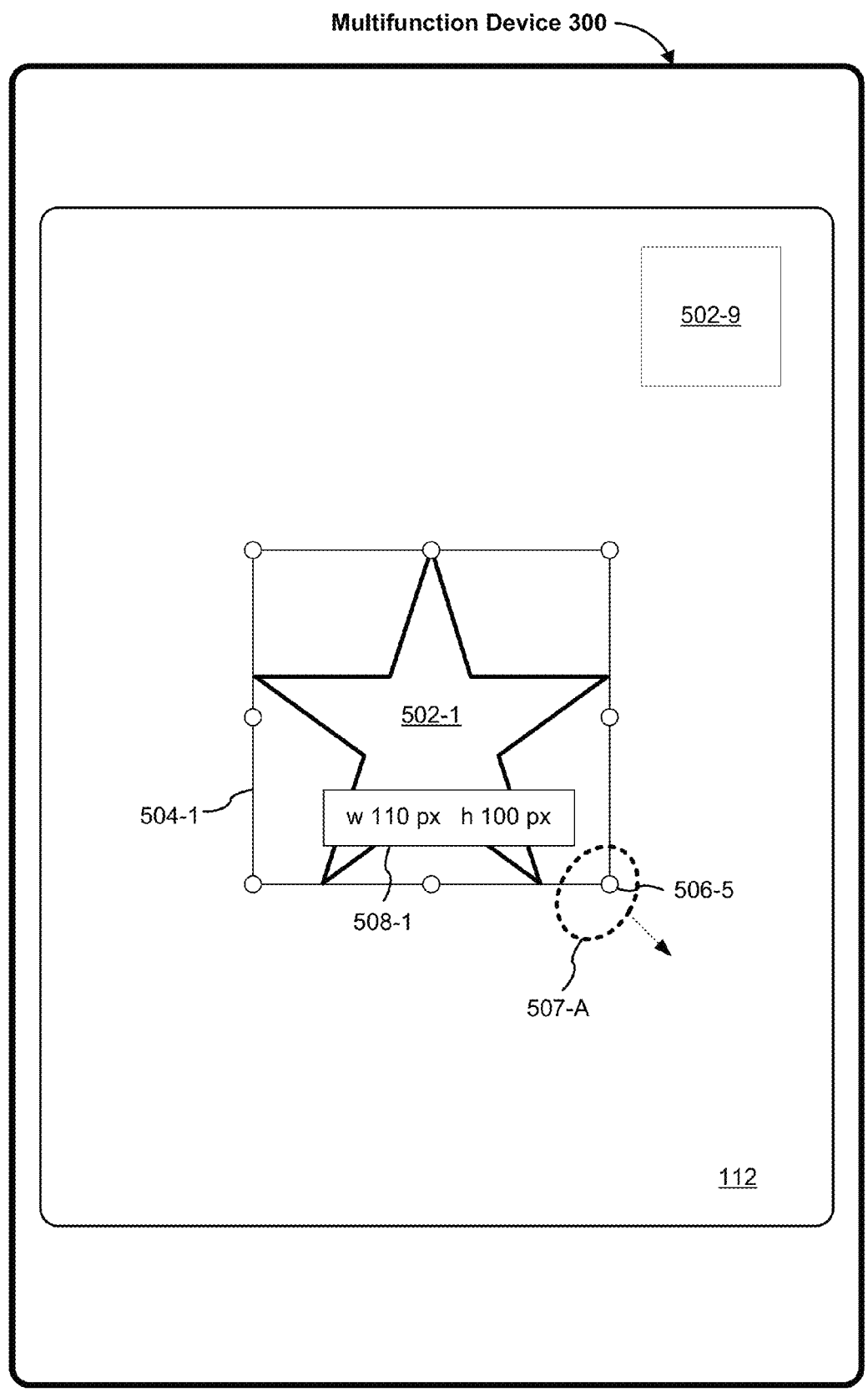

In FIG. 5C, contact 507 (e.g., a finger contact) is detected at location 507-A on touch screen 112 corresponding to handle 506-5. FIG. 5C also illustrates that callout 508-1 is displayed, indicating the width and height of object 502-1 (e.g., the width of 110 pixels and the height of 100 pixels).

Figure 5D:
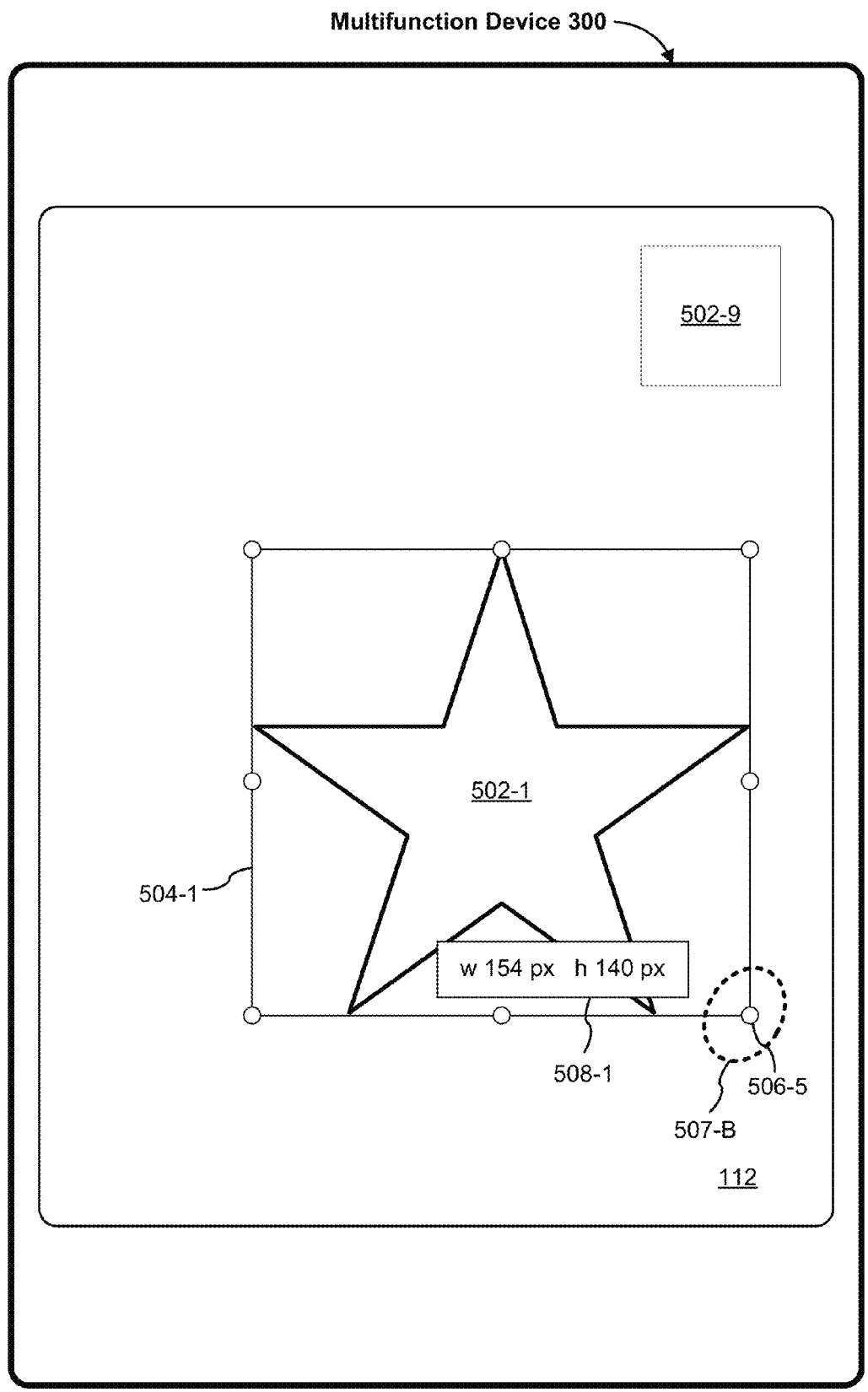

FIG. 5D illustrates that contact 507 (e.g., a finger contact) has moved across touch screen 112 to location 507-B. Object 502-1 and bounding box 504-1 scale in accordance with the movement of contact 507.

Figure 5E:
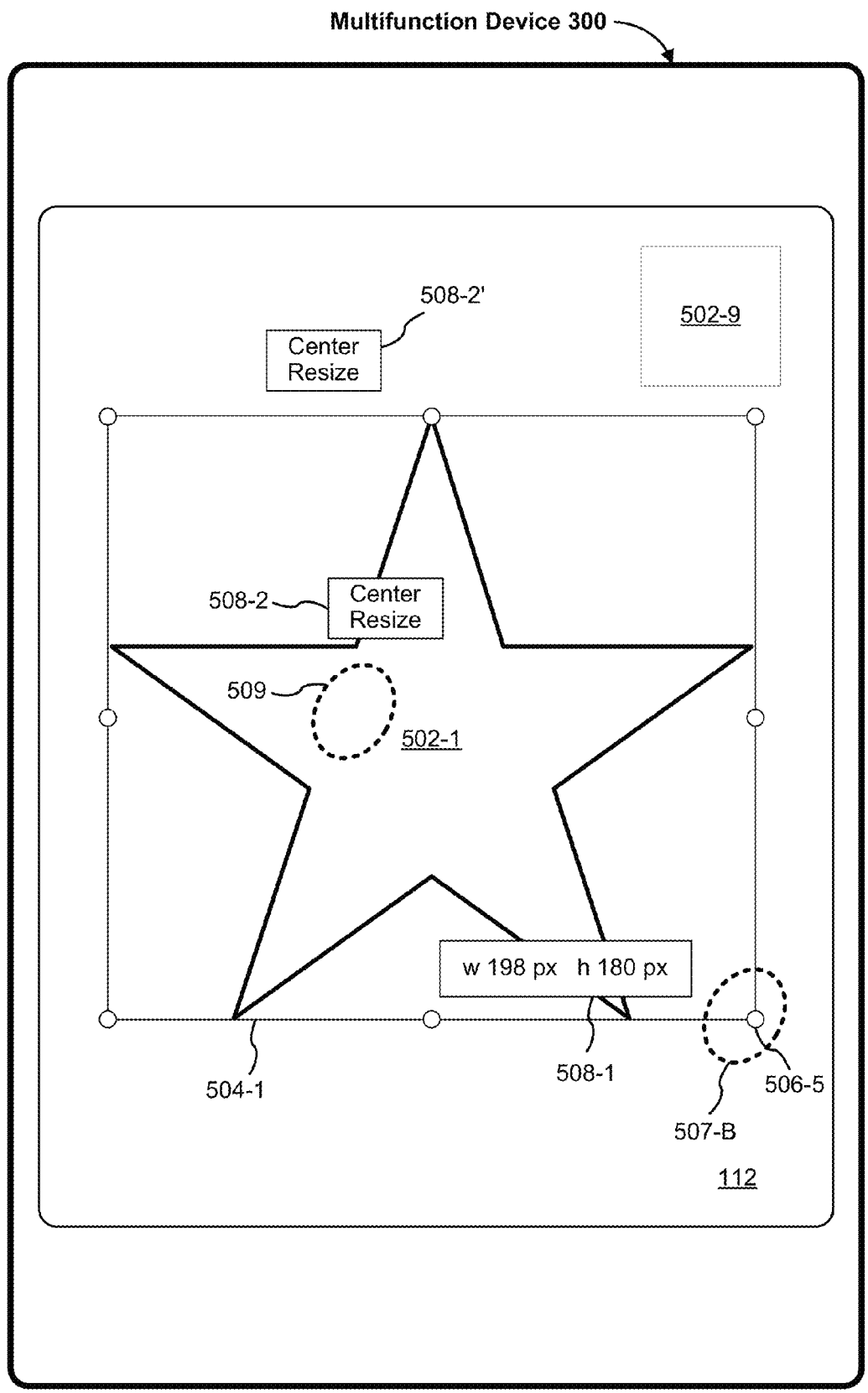

In FIG. 5E, contact 509 (e.g., a finger contact) is detected at a location on touch screen 112 corresponding to object 502-1. Also in FIG. 5E, callout 508-2 indicates that object 502-1 is in a "center-resizing" mode. In this example, callout 508-2 is displayed proximate to contact 509. In some embodiments, callout 508-2 is displayed above (e.g., callout 508-2'), below, or adjacent to object 502-1. In other embodiments, callout 508-2 is displayed on top, at the bottom, or at a predetermined location on touch screen 112 (e.g., top or bottom of touch screen 112 or near a menu bar).

In the "center-resizing" mode, the resized object scales symmetrically while maintaining its center location. In some embodiments, the center location of an object corresponds to the center of the bounding box. In some embodiments, the resized object scales while maintaining horizontal and vertical symmetry, while maintaining its center location. For horizontal symmetry, the horizontal distance from the center of the object to the left-most point of the object matches the horizontal distance from the center of the object to the right-most point of the object. Similarly, for vertical symmetry, the vertical distance from the center of the object to the top-most point of the object matches the vertical distance from the center of the object to the bottom-most point of the object.

In some embodiments, instead of the three step process of detecting a contact to select an object (e.g., FIG. 5A), detecting another contact to resize the selected object (e.g., FIG. 5C), and detecting yet another contact to enter into the "center-resizing" mode (e.g., FIG. 5E), fewer steps can achieve the same result. For example, a first contact is detected at a location on touch screen 112 corresponding to an object, and while detecting the first contact, a second contact is detected on one of the handles associated with the object, thereby initiating the "center-resizing" mode for the object.

Figure 5F:
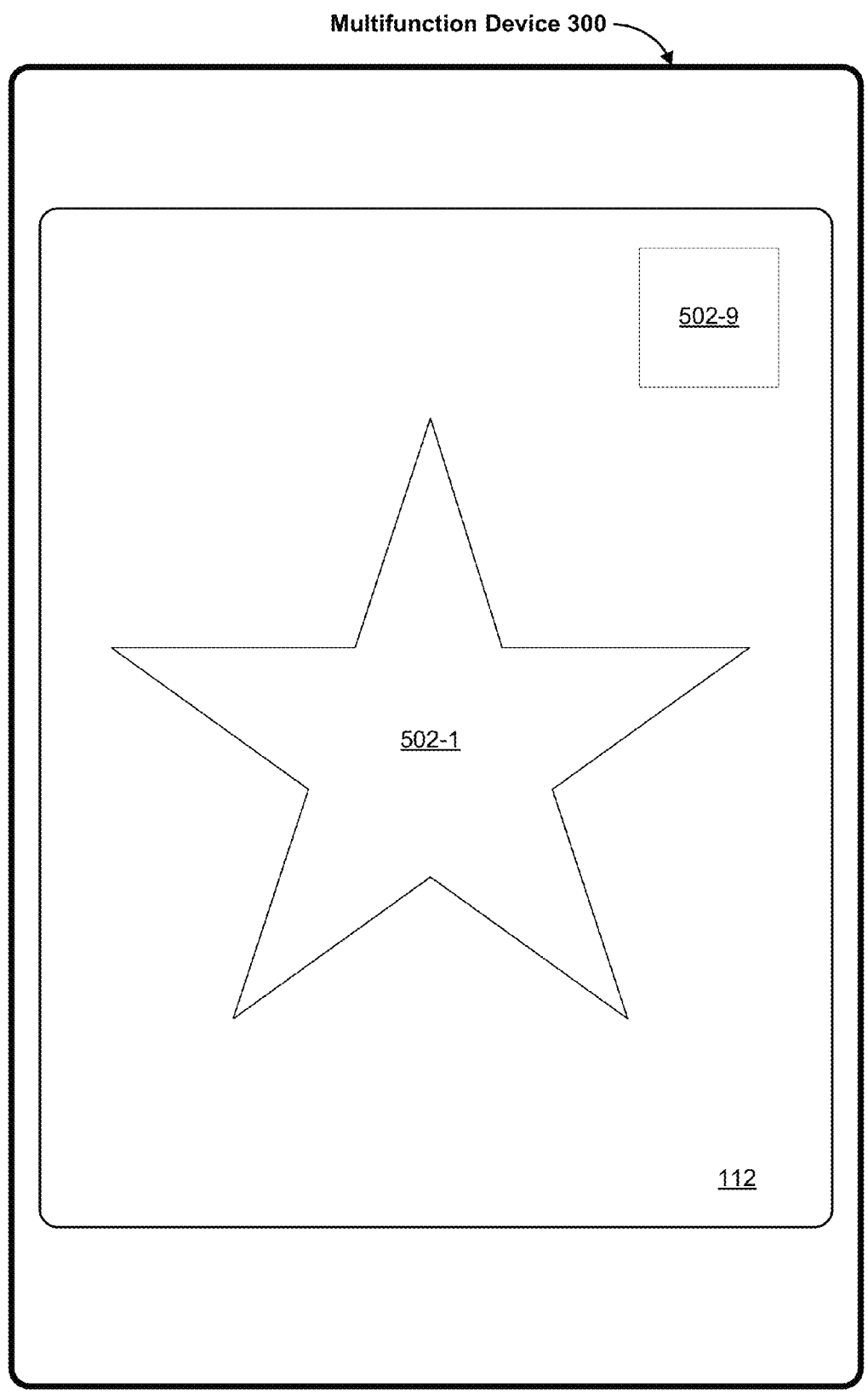
Figure 5G:
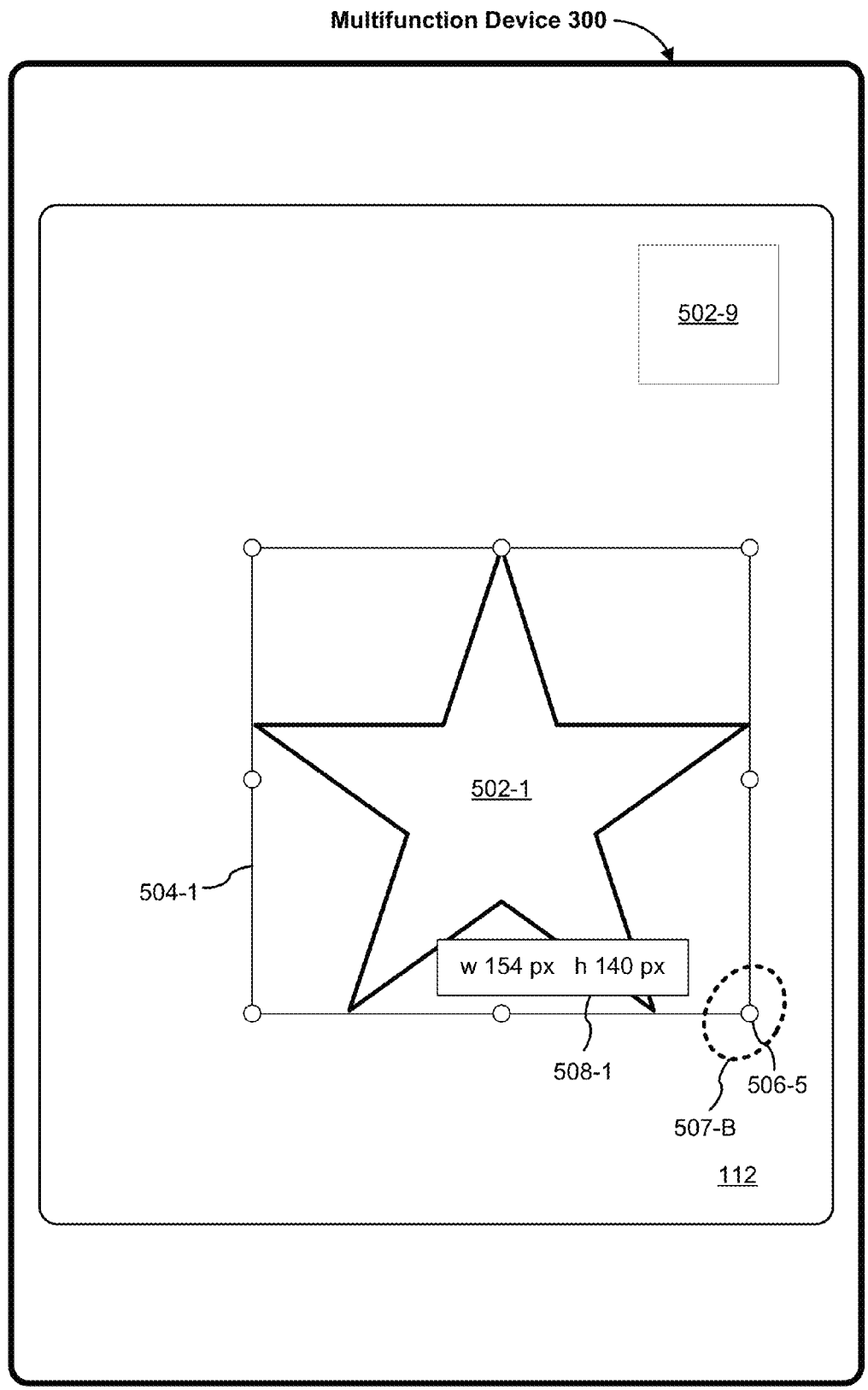

FIGS. 5F-5G illustrates two exemplary user interfaces in response to detecting the lift-off of contact 509. FIG. 5F illustrates the user interface after the completion of the "center-resizing." The device detects termination (e.g., lift off) of contacts 507 and 509. Object 502-1 maintains its size from the center resizing. In this example, object 502-1 is no longer selected after the completion of the center resizing. As a result, the visual distinction (e.g., a thicker border) and bounding box 504-1 cease to be displayed (or removed). In some embodiments, lifting off of contact 509 immediately before or after lifting off of contact 507 (e.g., within 0.01-1 seconds, preferably within 0.1-0.2 seconds) achieves the same result. In other embodiments, object 502-1 remains selected after detecting termination of contacts 507 and 509 (not shown).

FIG. 5G illustrates a result when contact 509 is lifted off of touch screen 112 without lifting off contact 507. The device switches from the "center-resizing" mode to the "side/corner resizing" mode and the size of object 502-1 changes accordingly. Callout 508-2 ceases to be displayed, indicating that object 502-1 is no longer in the "center-resizing" mode. Top-left corner of bounding box 504-1 returns to its original position (before the center-resizing starts, as depicted in FIGS. 5C-5D).

Figure 5H:
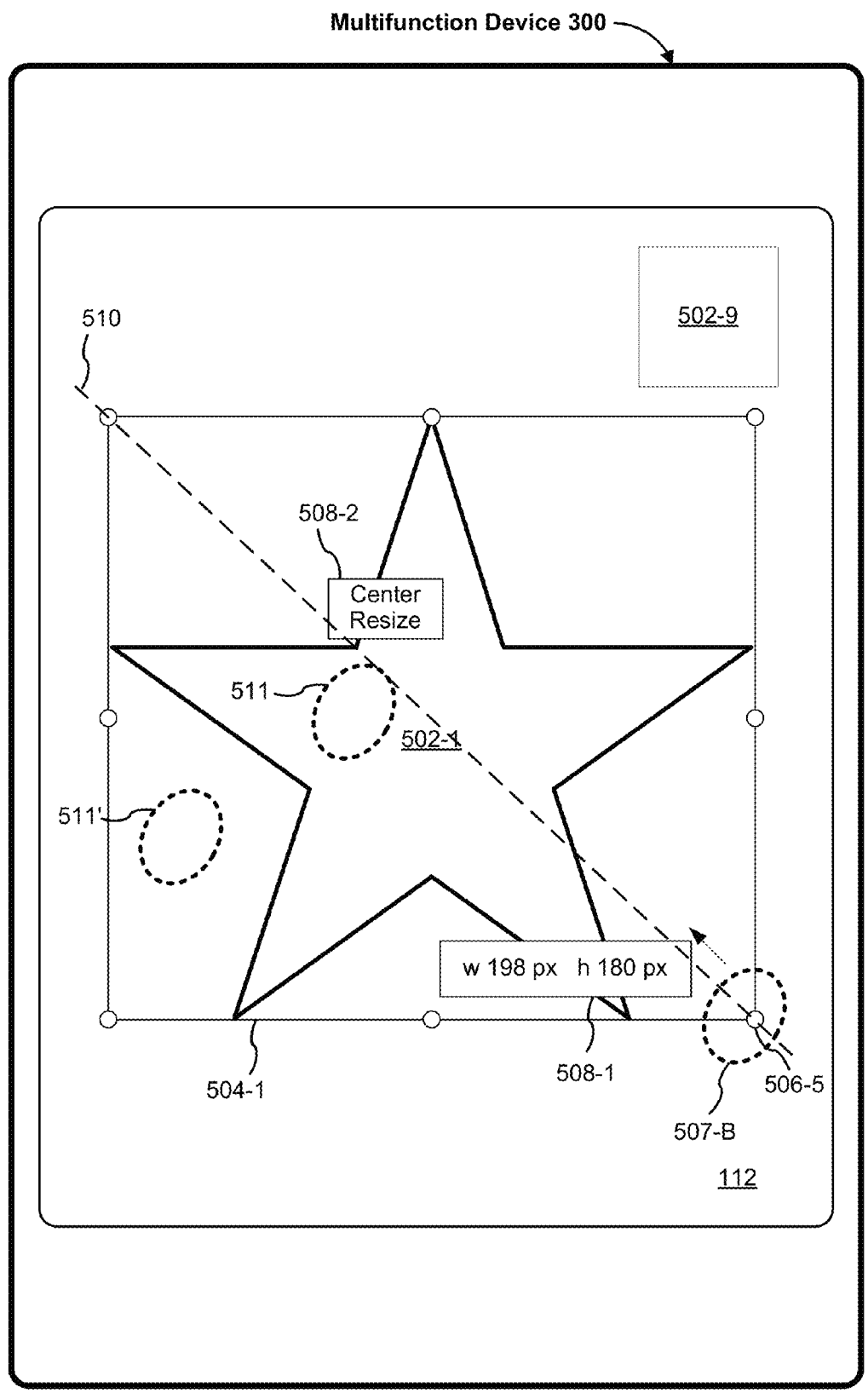

FIG. 5H illustrates an exemplary user interface including proportion guide 510. In FIG. 5H, contact 511 is detected at a location on touch screen 112 corresponding to object 502-1. In some embodiments, concurrent detection of contact 511 and third contact 511' displays proportion guide 510. In some other embodiments, when the location of contact 507-B lines up with a diagonal line of original bounding box 504-1 (before scaling or resizing), proportion guide 510 is displayed. While proportion guide 510 is displayed, the currently selected user interface object (e.g., object 502-1) is resized while maintaining its height-to-width ratio. In some embodiments, a "snapping" effect is provided with proportion guide 510. For example, when contact 507 is detected adjacent to proportion guide 510 (e.g., less than twenty pixels, preferably less than five pixels; alternatively, less than one inch, preferably less than a quarter of an inch), a location on proportion guide 510 closest to the location of contact 507 is used in place of the actual location of contact 507.

Figure 5I:
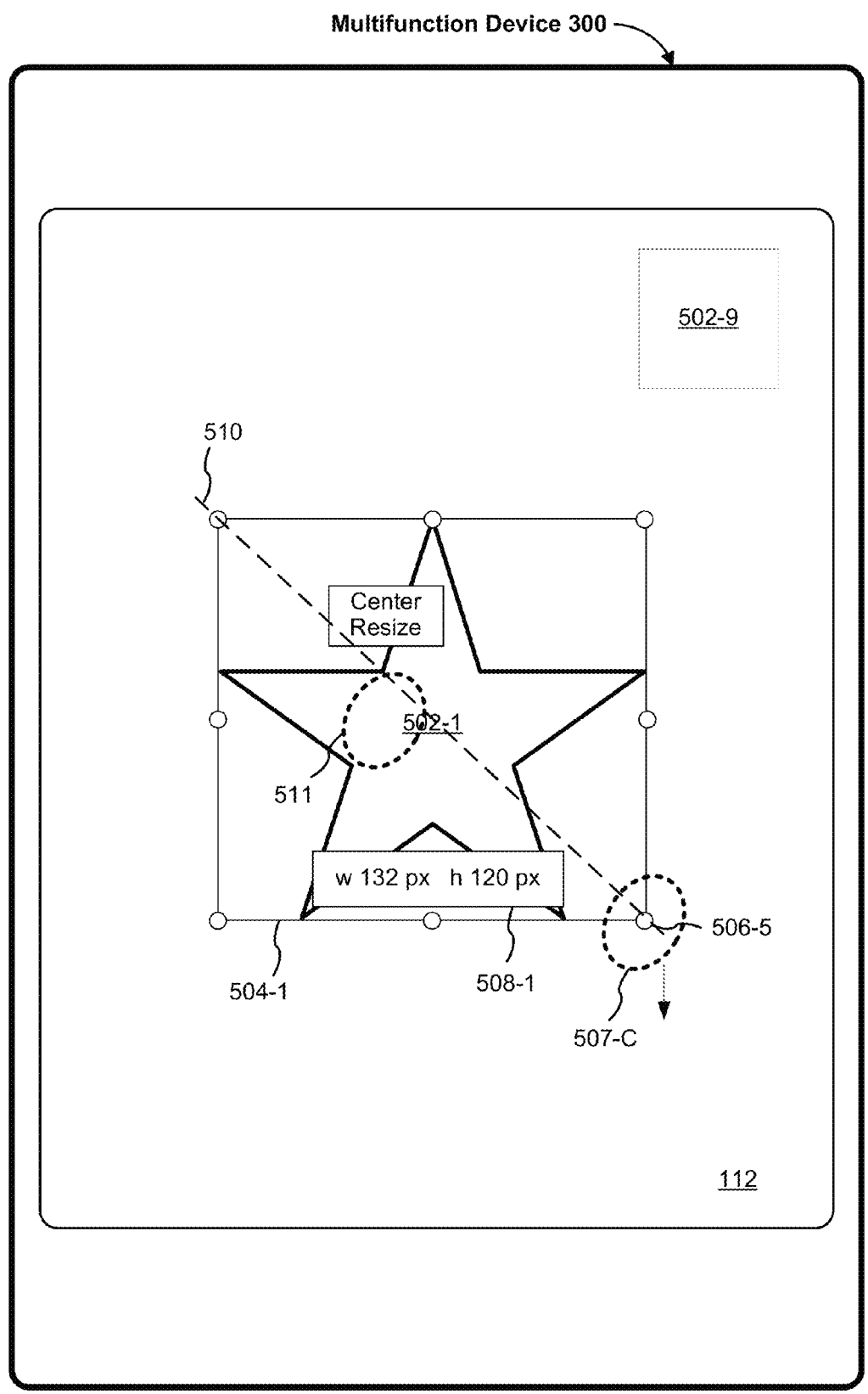

FIG. 5I illustrates that contact 507 has moved across touch screen 112 to location 507-C along proportion guide 510. Object 502-1 is resized, while maintaining its height-to-width ratio. The display of proportion guide 510 is maintained. Contact 511 remains on touch screen 112 and object 502-1 remains in the "center-resizing" mode.

Figure 5J:
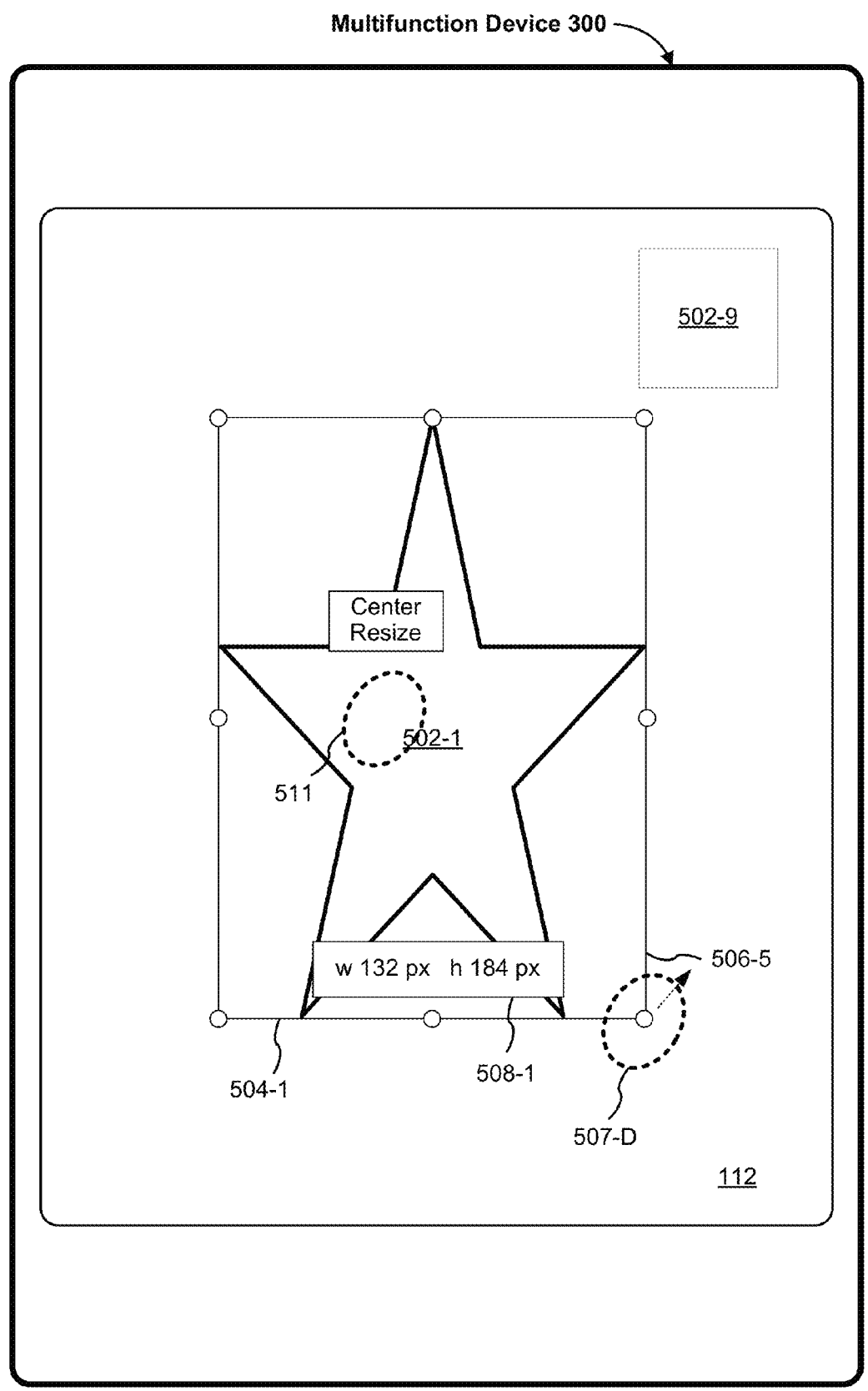

In FIG. 5J, contact 507 has moved to location 507-D across touch screen 112 away from proportion guide 510 (e.g., more than twenty pixels, or at least more than five pixels; or alternatively, more than one inch, or at least more than a quarter of an inch). In response, proportion guide 510 ceases to be displayed (or is hidden).

Figure 5K:
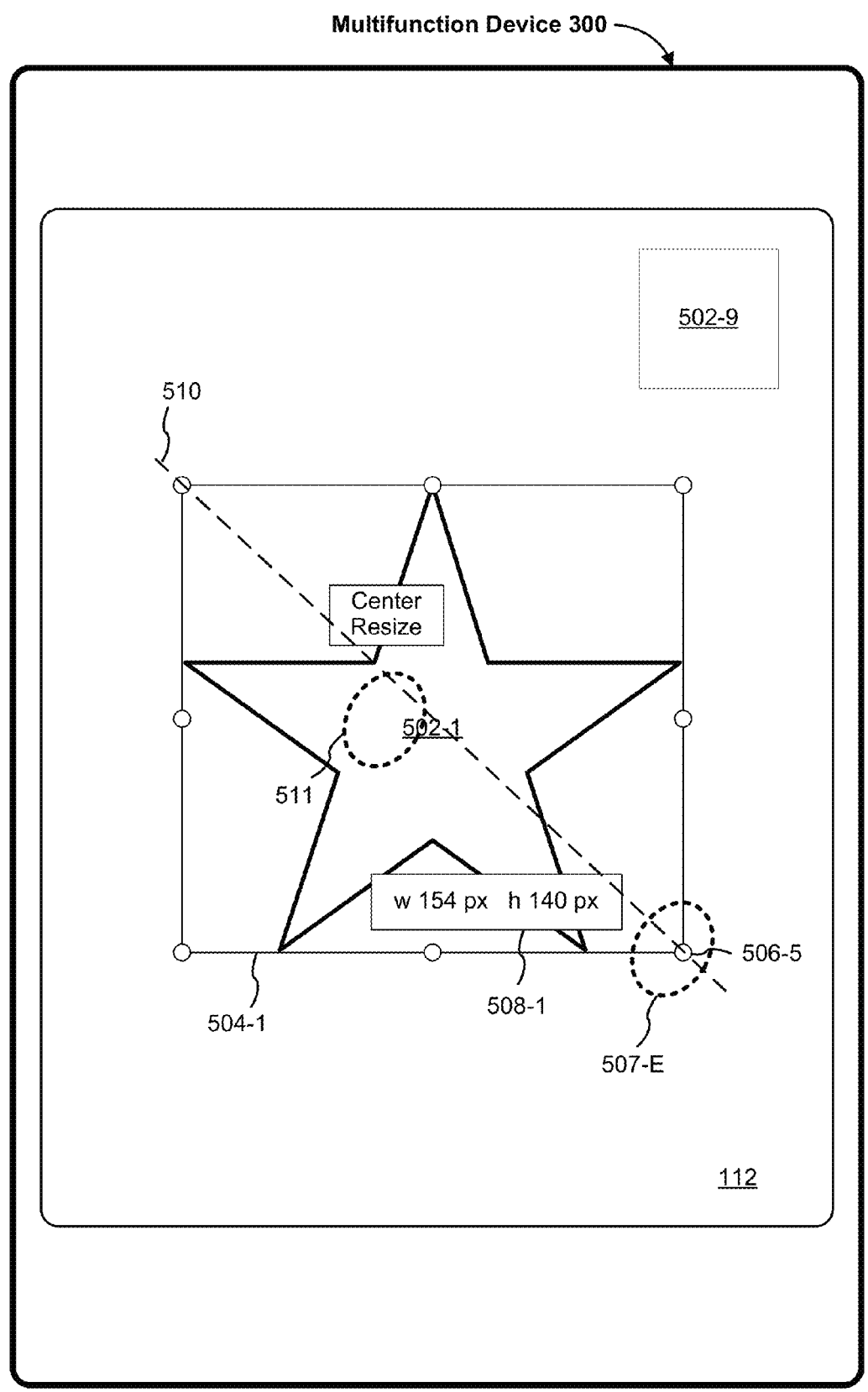

FIG. 5K illustrates that contact 507 has moved across touch screen 112 to location 507-E that is adjacent (e.g., less than twenty pixels, preferably less than five pixels; alternatively, less than one inch, preferably less than a quarter of an inch) to proportion guide 510. In response, proportion guide 510 is re-displayed. As discussed above, contact 507 may snap to proportion guide 510 in some embodiments.

Figure 5L:
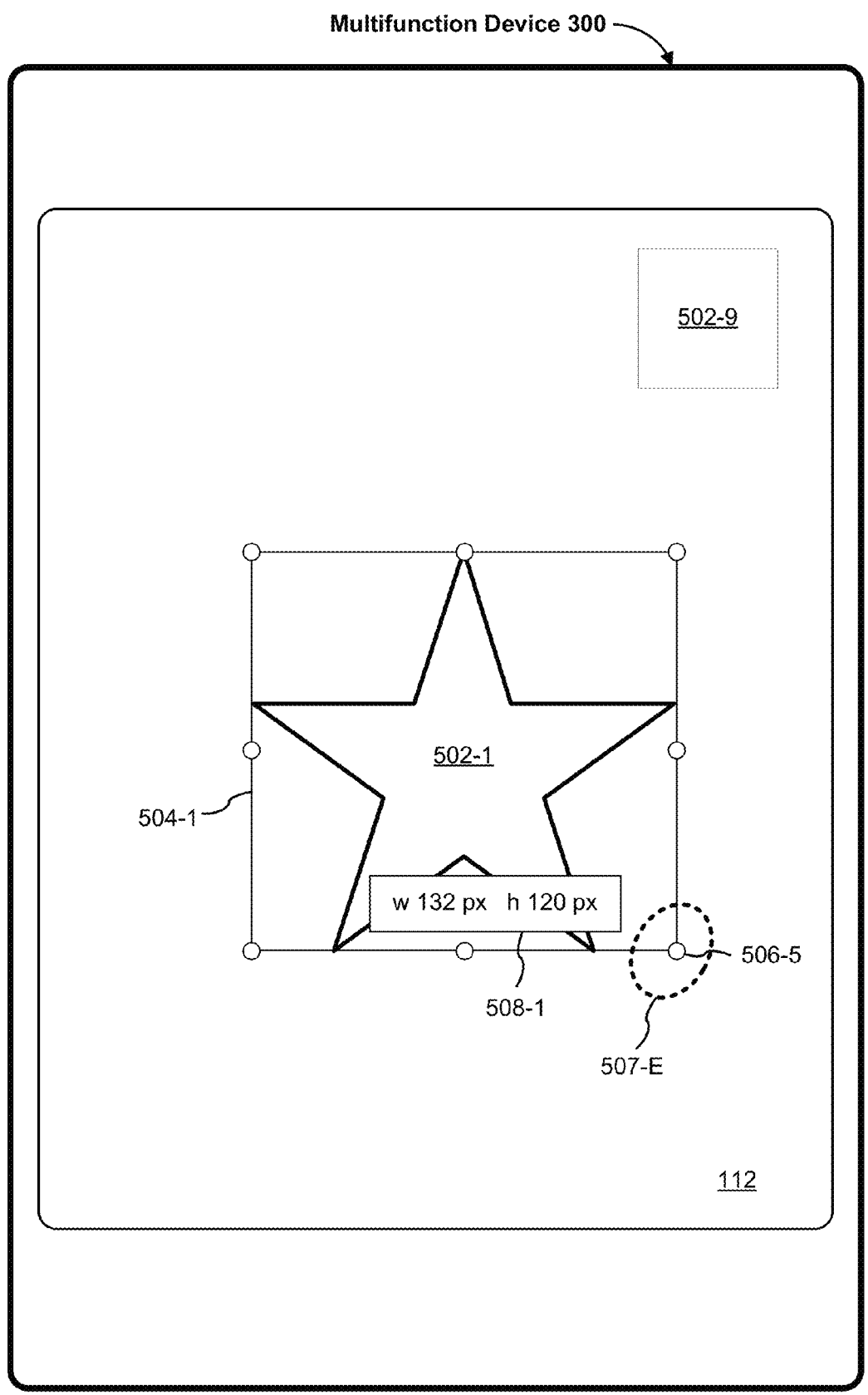

In FIG. 5L, contact 511 is lifted off of touch screen 112, and the device switches from the "center-resizing" mode to the "side/corner resizing" mode.

Figure 5M:
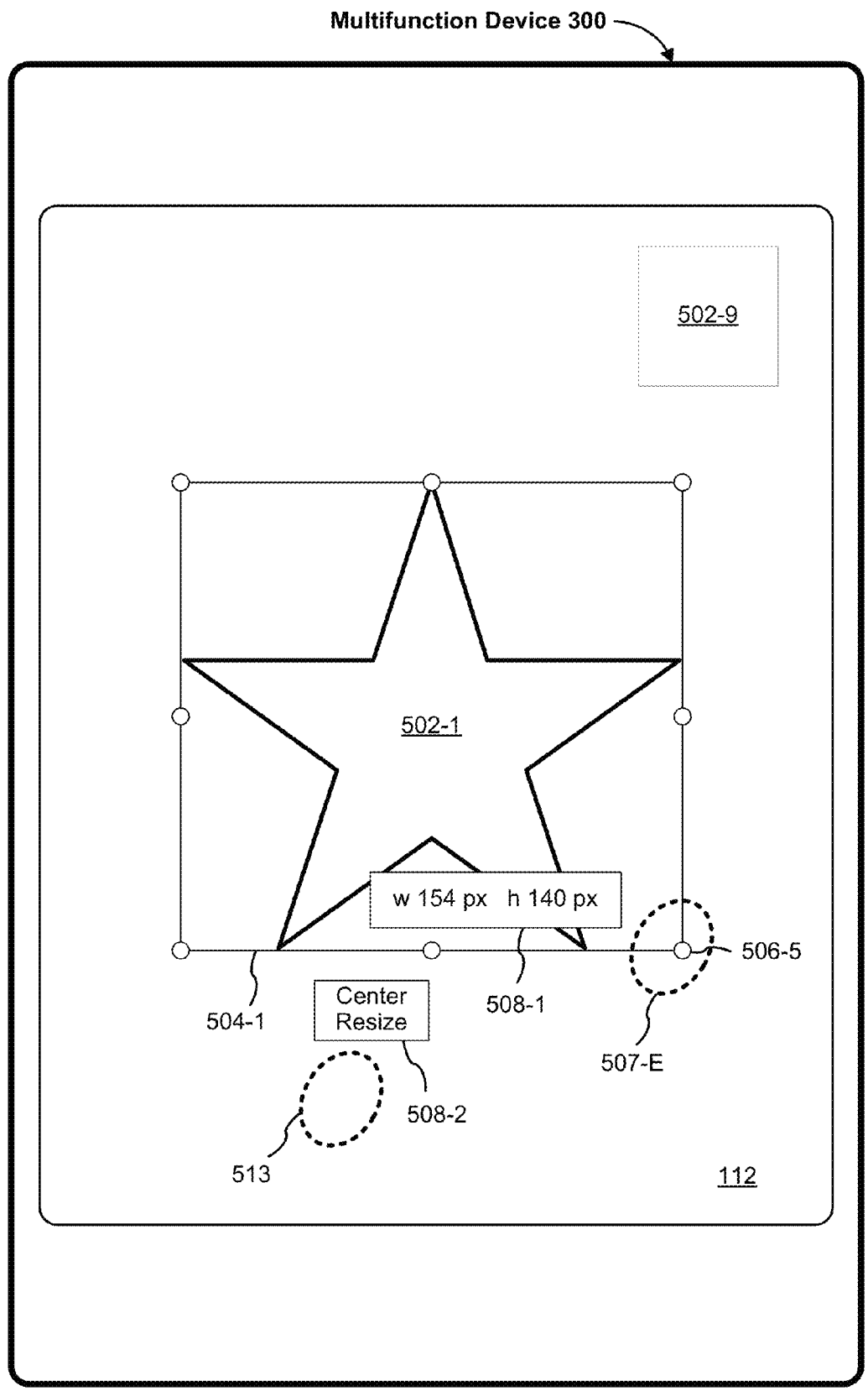

FIG. 5M illustrates a contact 513 that is detected at a location on touch screen 112 outside object 502-1. In some embodiments, object 502-1 enters into the "center-resizing" mode in response to contact 513 outside object 502-1. In some embodiments, object 502-1 enters into the "center-resizing" mode in response to contact 513 on a blank space (that does not correspond to any of displayed objects) on touch screen 112.

FIGS. 5N-5W illustrate exemplary user interfaces associated with size matching of an object.

Figure 5N:
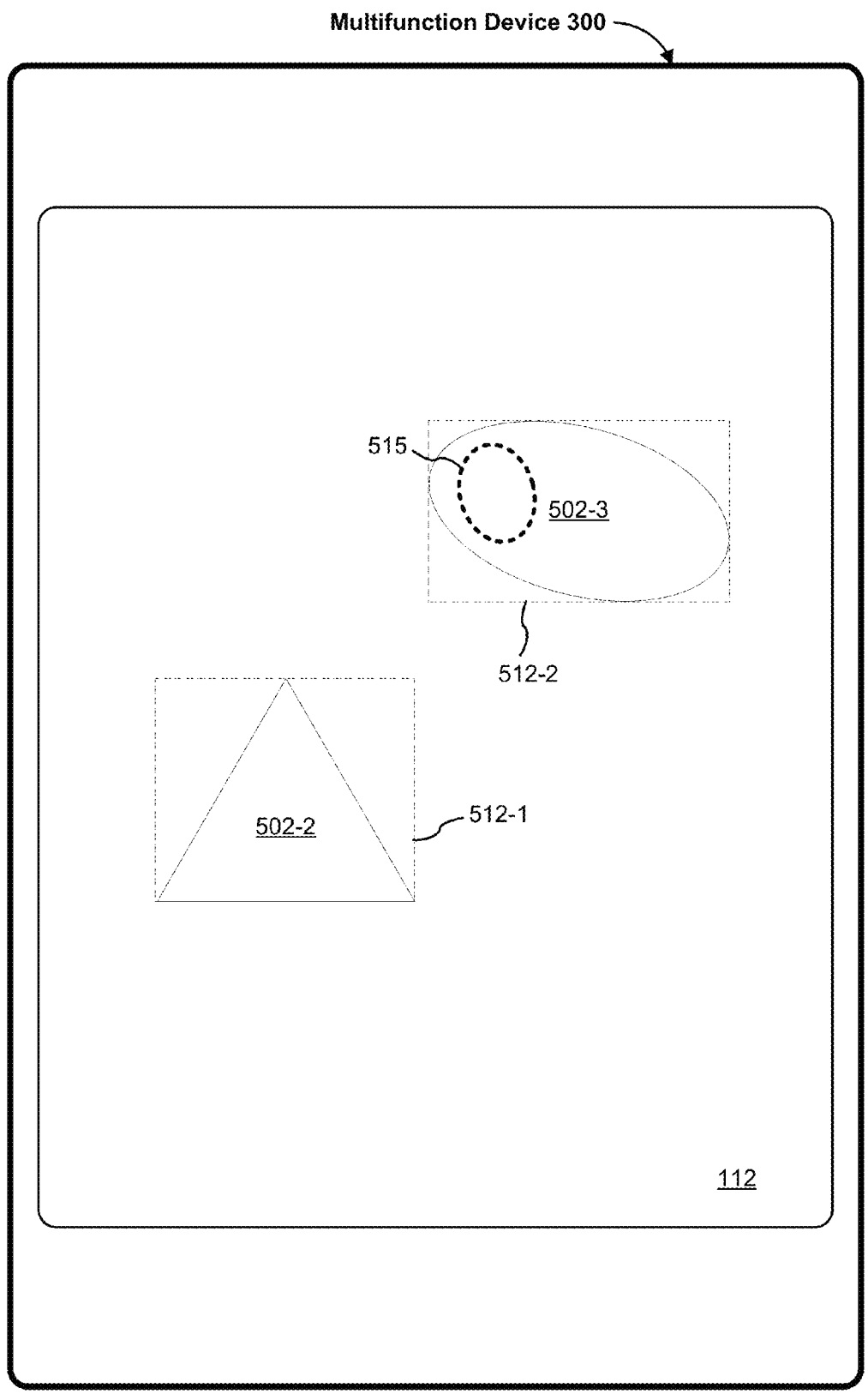

FIG. 5N depicts an exemplary user interface displaying objects 502-2 and 502-3 on touch screen 112 of multifunction device 300. Size boxes 512-1 and 512-2 are illustrated solely for the purpose of describing the size (e.g., the width and height) of each object. As depicted, objects 502-2 and 502-3 have different sizes (e.g., size boxes 512-1 and 512-2 have different sizes). FIG. 5N also illustrates detection of tap 515 at a location on touch screen 112 corresponding to the location of object 502-3, thereby selecting object 502-3.

Figure 5O:
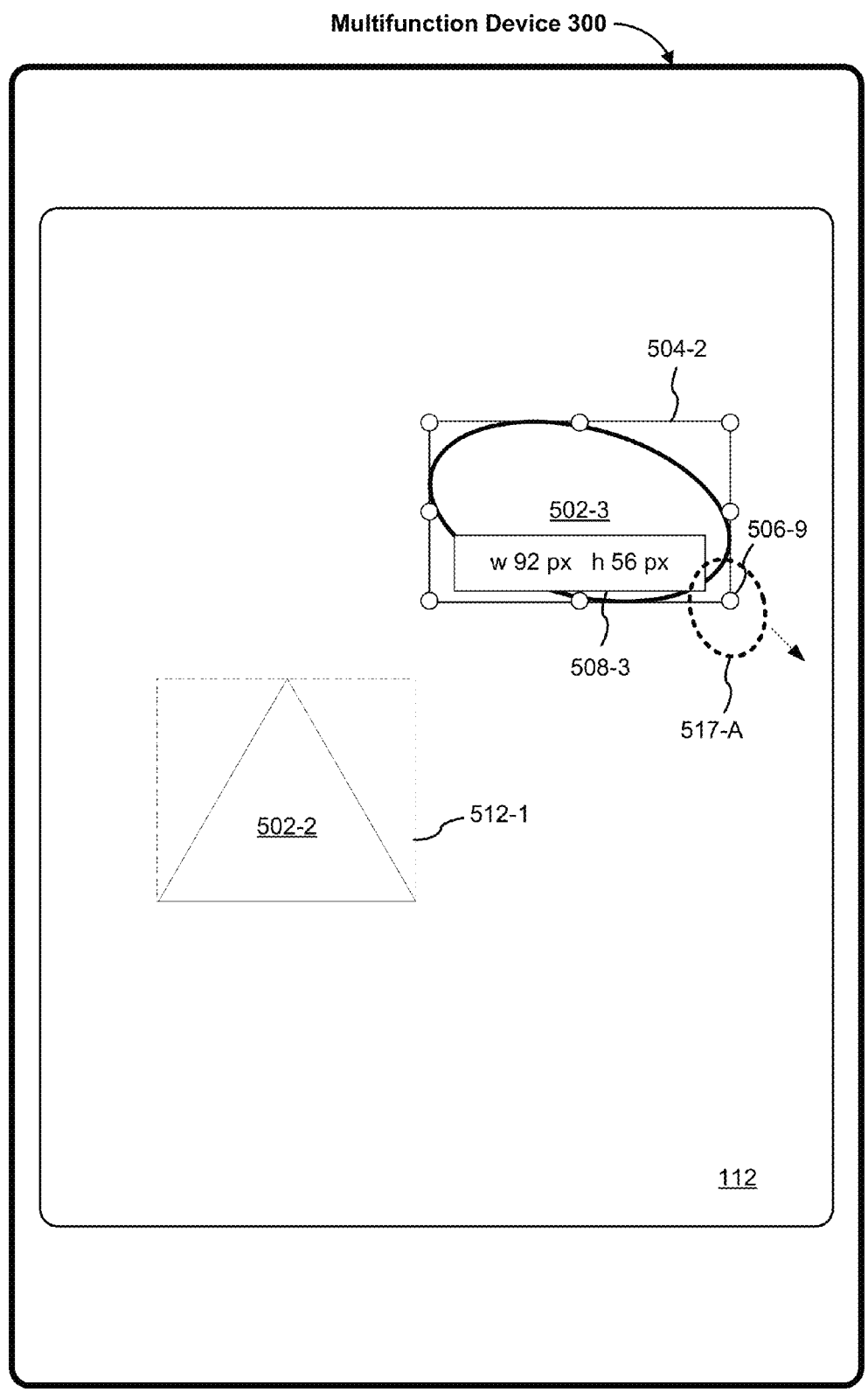

FIG. 5O illustrates that object 502-3 is selected. In this example, selected object 502-3 is visually distinguished (e.g., the selected object has a thicker border than when unselected). Also bounding box 504-2 is displayed around selected object 502-3. In this example, bounding box 504-2 is a rectangle that fits selected object 502-3, and the width and height of bounding box 504-2 matches the width and height of object 502-3. Bounding box 504-2 includes a plurality of handles (including handle 506-9), which when activated (e.g., by a finger contact) initiate the resizing of the selected object (e.g., in the "side/corner resizing" mode).

In FIG. 5O, contact 517 is detected at location 517-A on touch screen 112 corresponding to handle 506-9. FIG. 5O also illustrates that callout 508-3 is displayed, indicating the width and height of object 502-3.

Figure 5P:
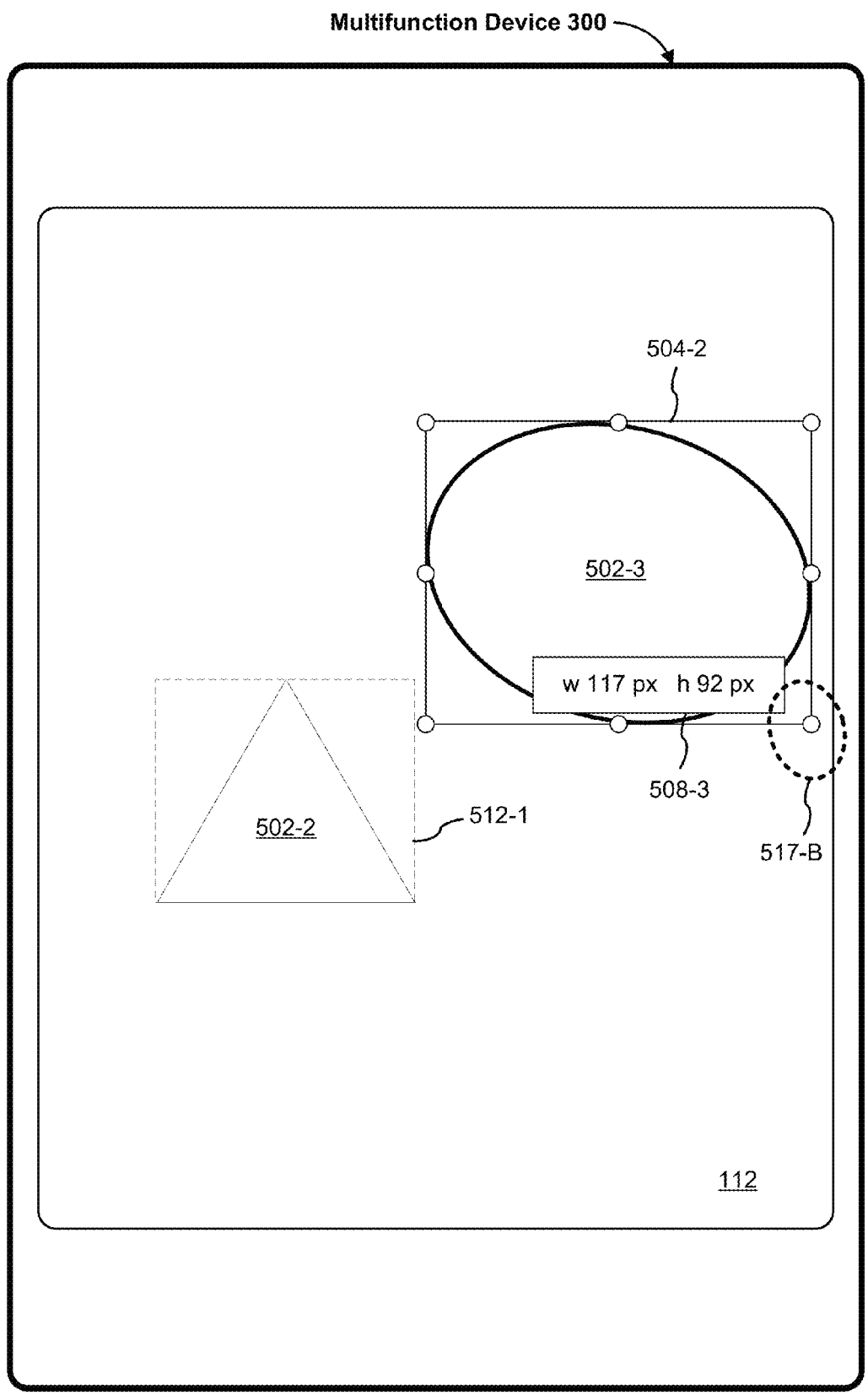

FIG. 5P illustrates that contact 517 (e.g., a finger contact) has moved across touch screen 112 to location 517-B. Object 502-3 and bounding box 504-2 scale in accordance with the movement of contact 517.

Figure 5Q:
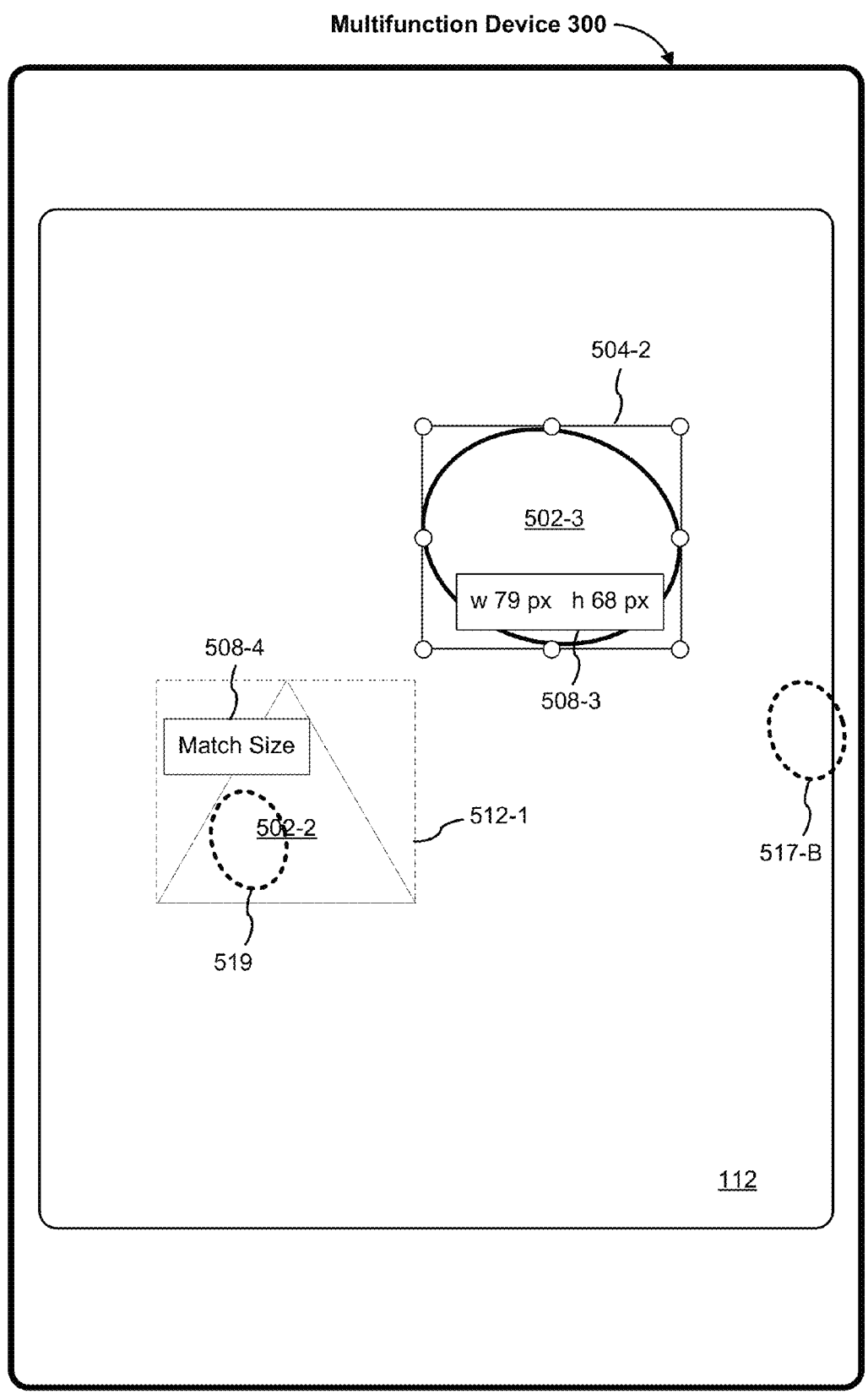

In FIG. 5Q, contact 519 is detected at a location on touch screen 112 corresponding to object 502-2. In response, the size of object 502-3 is scaled to match the size of object 502-2 (e.g., the size of bounding box 504-2 matches the size of size box 512-1). Callout 508-4 is displayed to indicate that the device is in a "size matching" mode, where another object will be matched to the size of object 502-2. In some embodiments, callout 508-4 is displayed proximate to contact 519. In other embodiments, callout 508-4 is displayed adjacent (e.g., above or below) to object 502-2, or at a predetermined location (e.g., top or bottom of touch screen 112 or near a menu bar).

Figure 5R:
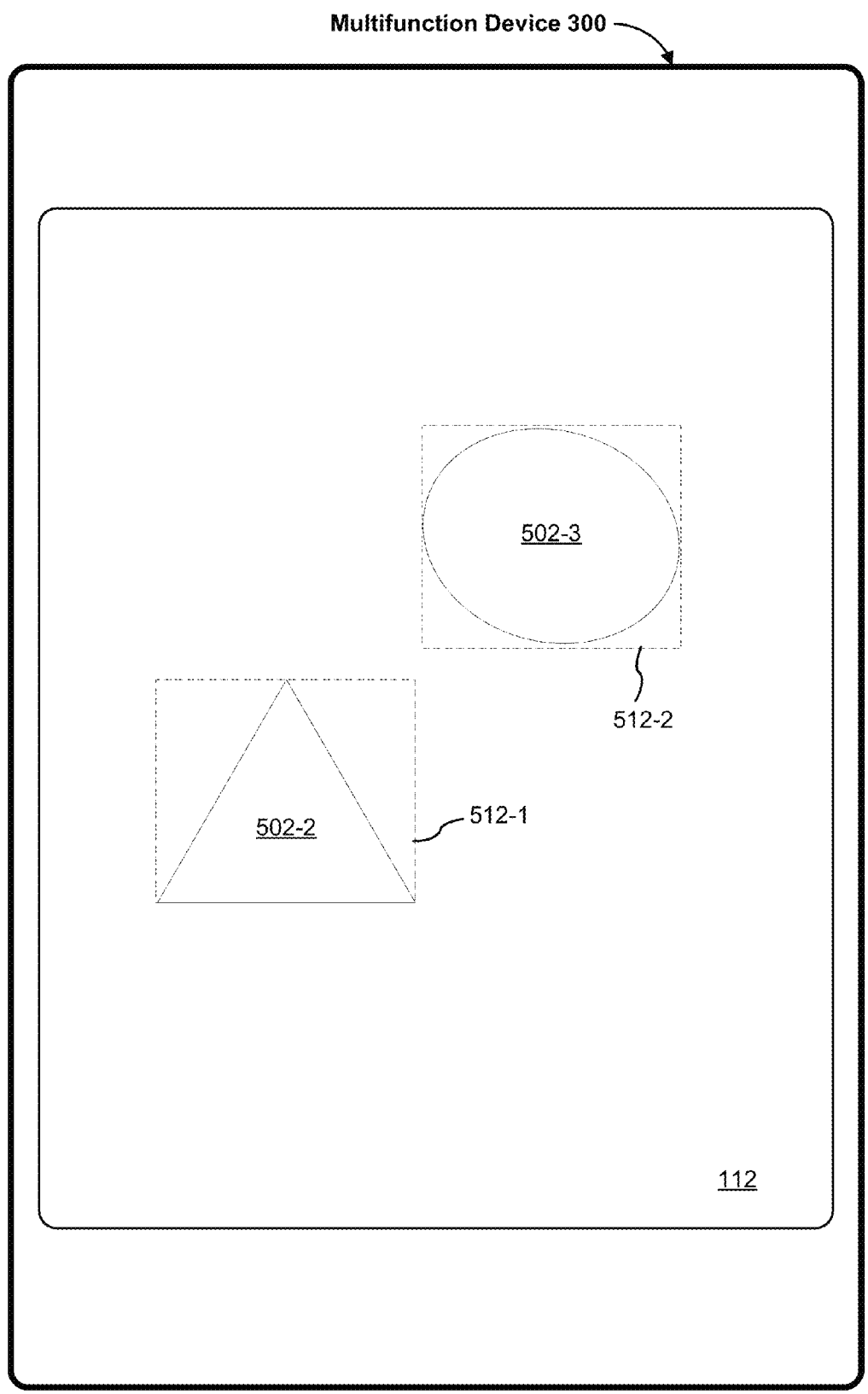

FIG. 5R illustrates the completion of size matching. Contacts 517 and 519 are lifted off of touch screen 112. Object 502-3 maintains its size from the size matching. In this example, object 502-3 is no longer selected after the completion of the size matching. As a result, the visual distinction (e.g., a thicker border) and bounding box 504-2 cease to be displayed (or removed). In some embodiments, lifting off of contact 519 immediately before or after lifting off of contact 517 (e.g., within 0.01-1 seconds, preferably within 0.1-0.2 seconds) achieves the same result. In other embodiments, object 502-3 remains selected after detecting termination of contacts 517 and 519 (not shown). In some embodiments, when contact 519 is lifted off of touch screen 112 without lifting off contact 517, the device returns to the "side/corner resizing" mode for object 502-3 (not shown).

FIGS. 5S-5X illustrate exemplary user interfaces associated with size matching of an object while maintaining the proportion (e.g., height-to-width ratio, also called aspect ratio) of the object (e.g., a digital image such as a digital photograph, picture, illustration; figures; chart; diagram; etc.).

Figure 5S:
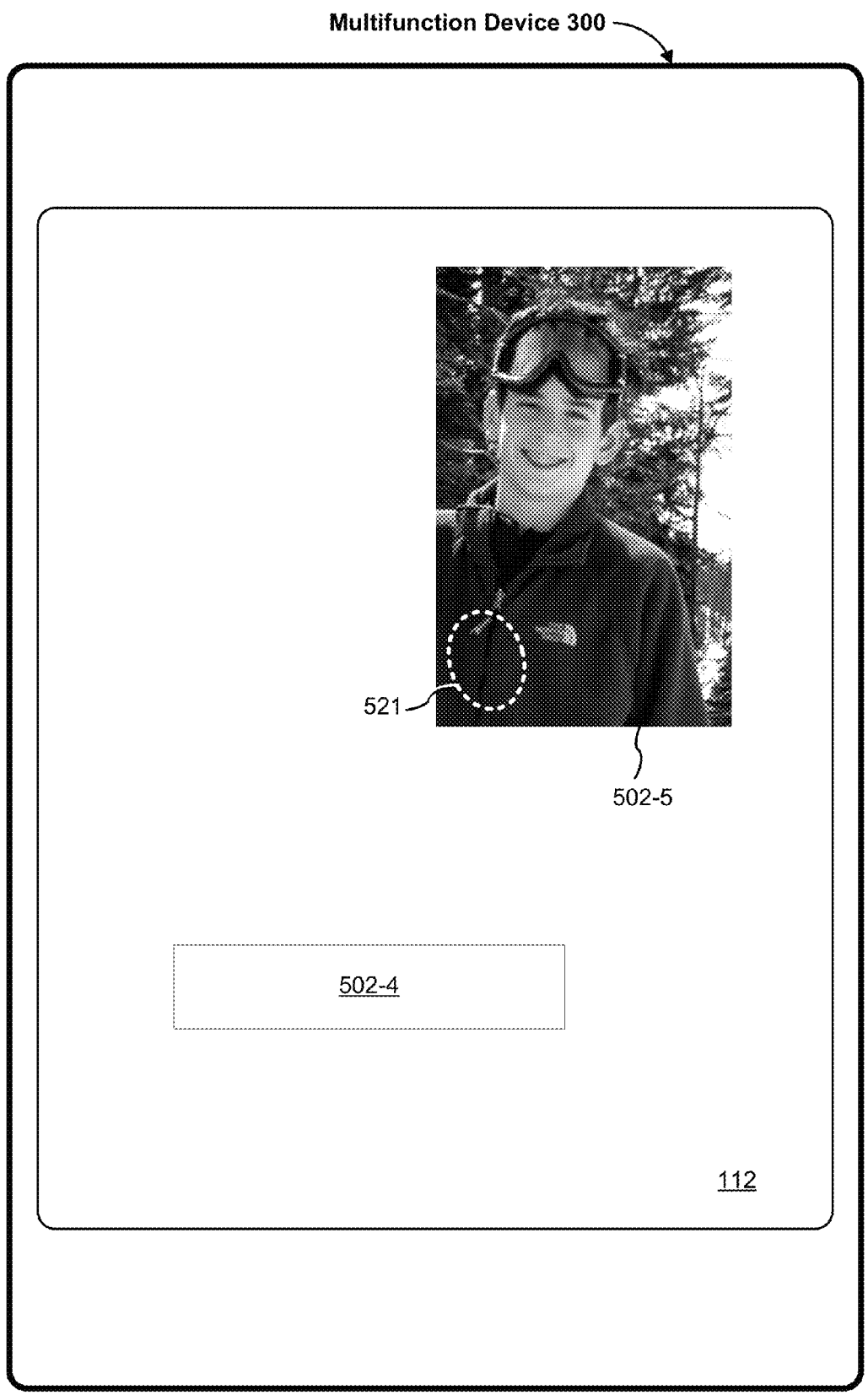

FIG. 5S depicts an exemplary user interface displaying objects 502-4 and 502-5 on touch screen 112 of multifunction device 300. Object 502-5 is a digital image, and has a constrained height-to-width ratio. In FIG. 5S, contact 521 is detected at a location on touch screen 112 corresponding to image object 502-5, thereby selecting image object 502-5.

Figure 5T:
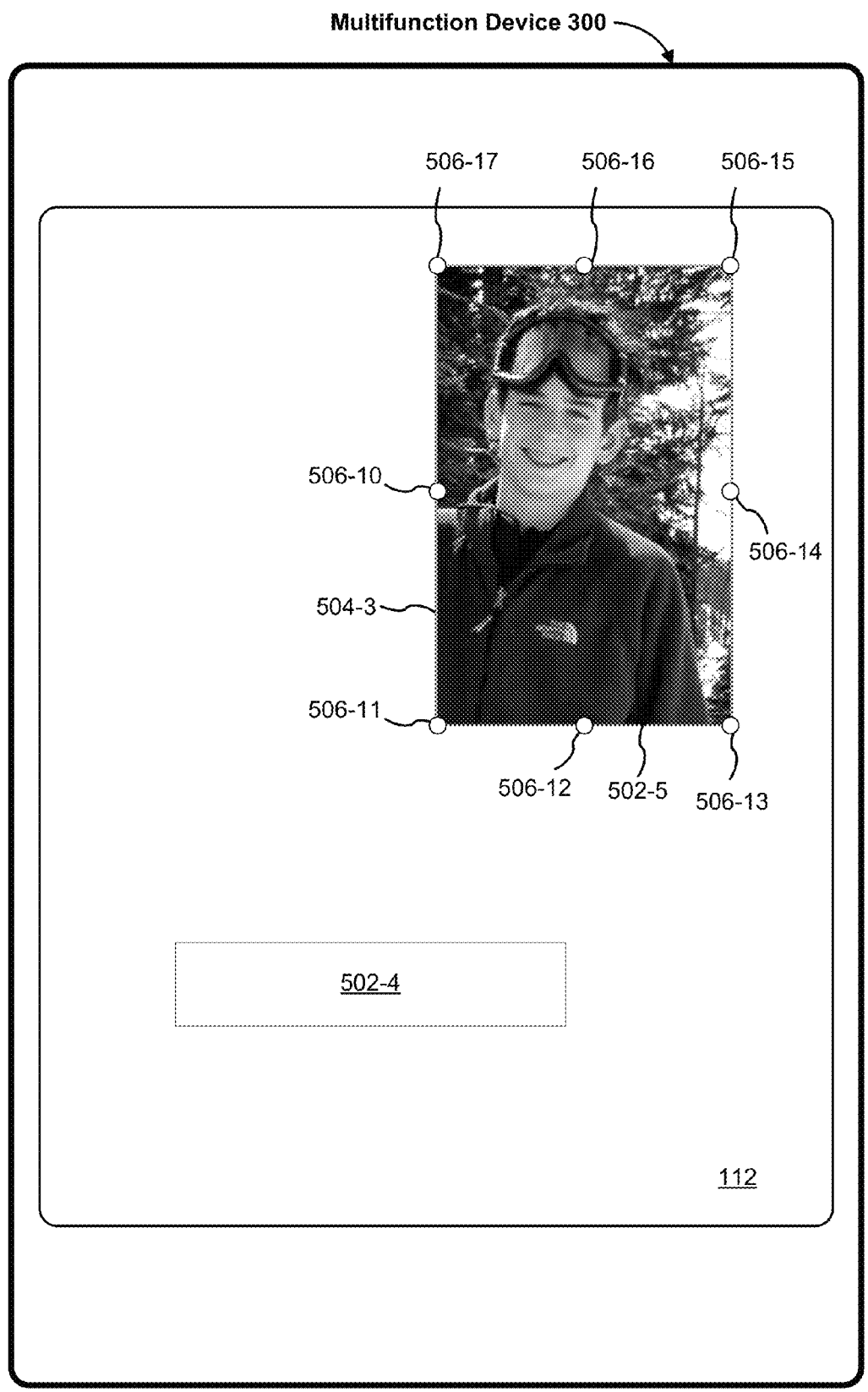

FIG. 5T illustrates that image object 502-5 is selected. In this example, selected object 502-5 is visually distinguished (e.g., the selected object has a thicker border than when unselected). Also bounding box 504-3 is displayed around selected object 502-5. In this example, bounding box 504-3 is a rectangle that fits selected object 502-5, and the width and height of bounding box 504-3 matches the width and height of object 502-5. Bounding box 504-3 includes a plurality of handles 506, which when activated (e.g., by a finger contact) initiate the resizing of the selected object (e.g., in the "side/corner resizing" mode). While being resized, the object scales in accordance with the bounding box.

Figure 5U:
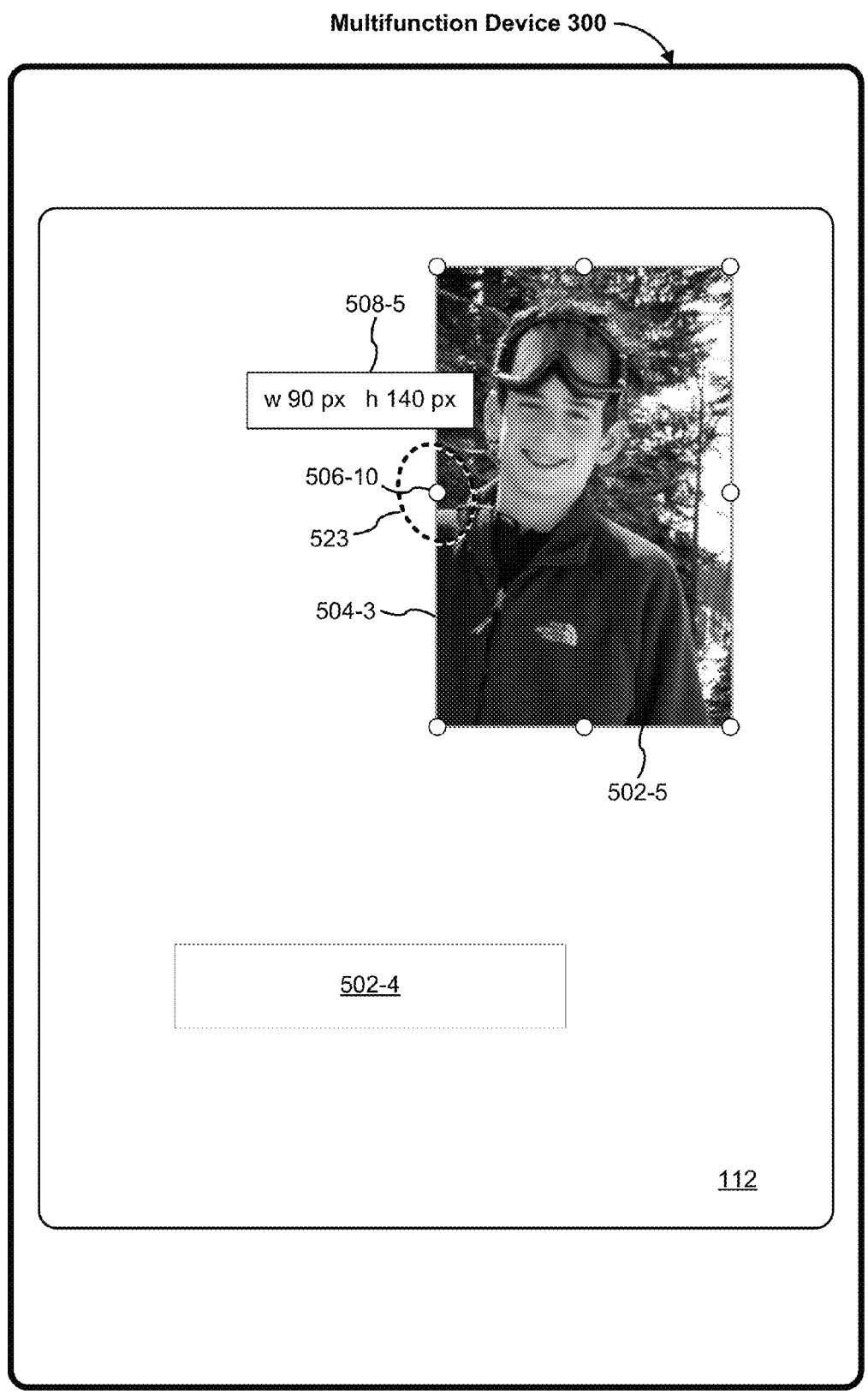

In FIG. 5U, contact 523 is detected at location on touch screen 112 corresponding to handle 506-10. FIG. 5U also illustrates that callout 508-5 is displayed, indicating the width and height of object 502-5.

Figure 5V:
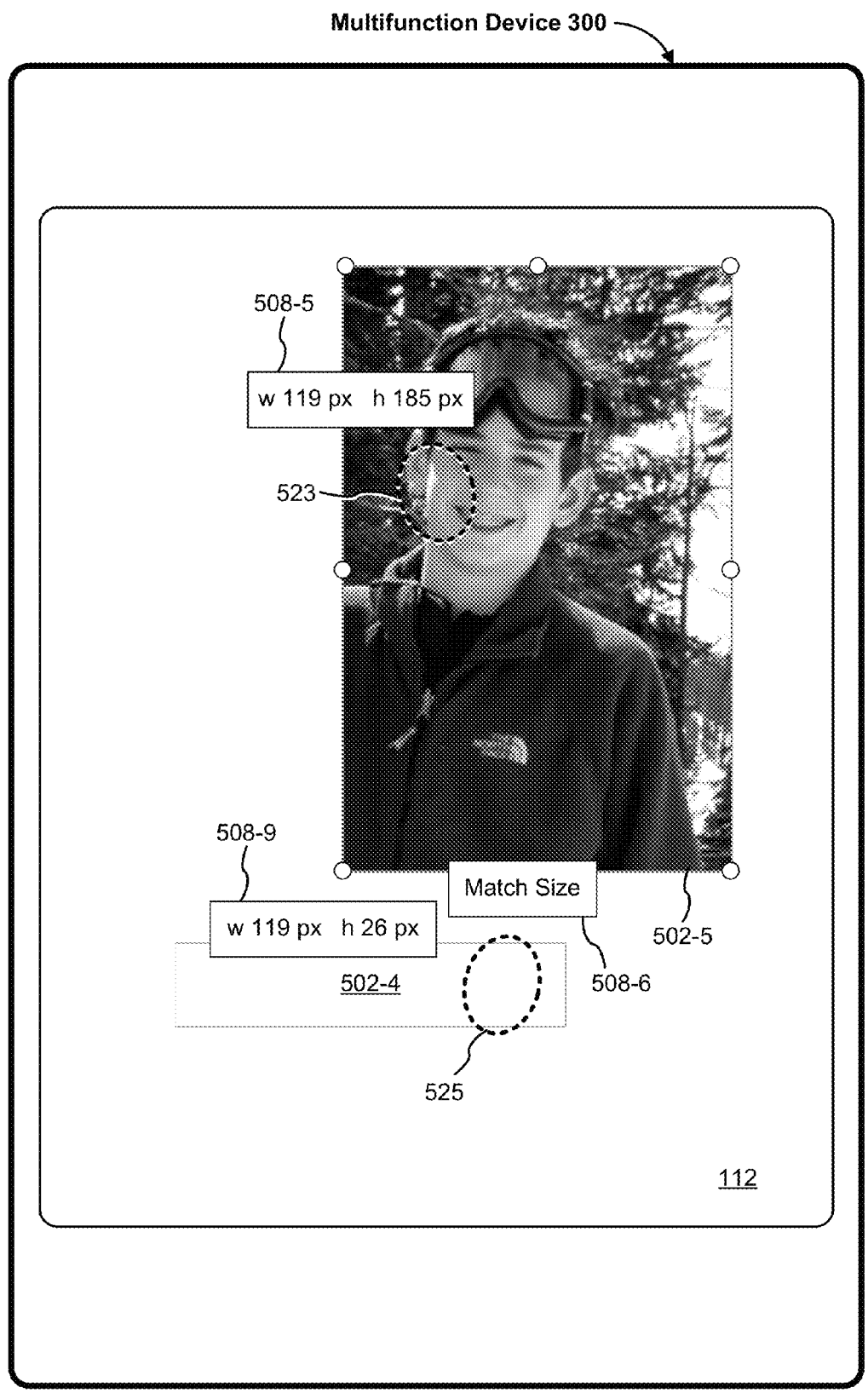

FIG. 5V illustrates a detection of contact 525 at a location on touch screen 112 corresponding to object 502-4. Object 502-5 is scaled proportionally (i.e., while maintaining its height-to-width ratio) such that the width of object 502-5 matches the width of object 502-4 (the width of bounding box 502-5 also matches the width of object 502-4). Callout 508-6 is displayed, indicating that the device is in the "size matching" mode, with another object (e.g., 502-5) being matched to at least one dimension of object 502-4. In some embodiments, callout 508-6 is displayed proximate to contact 525. In other embodiments, callout 508-6 is displayed adjacent (e.g., above or below) to object 502-4, or at a predetermined location (e.g., top or bottom of touch screen 112 or near a menu bar).

In some embodiments, object 502-5 is scaled proportionally such that the height (instead of the width) of object 502-5 matches the height (instead of the width) of object 502-4 (not shown).

Figure 5W:
Figure 5X:
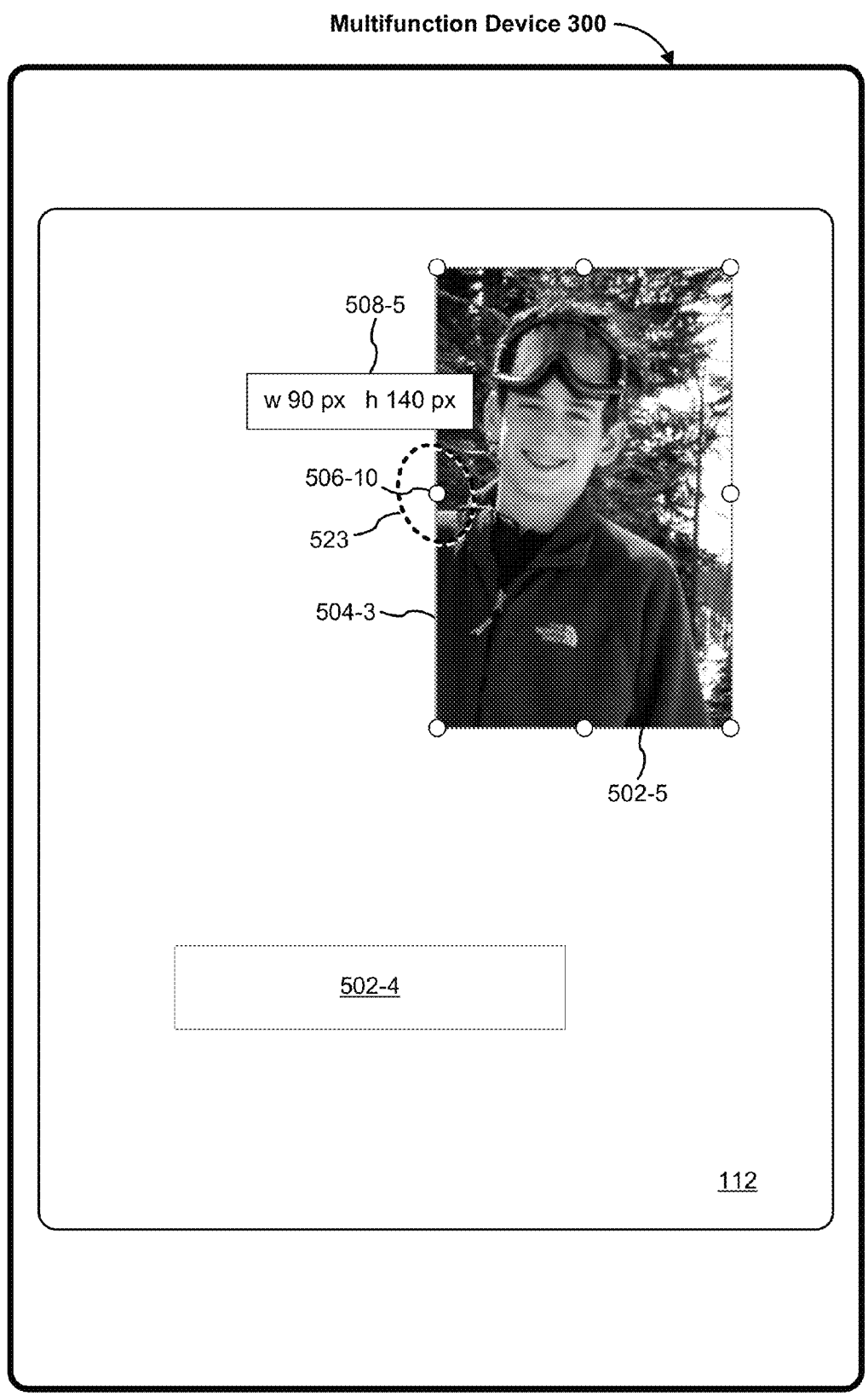

FIG. 5W illustrates the user interface after completion of size matching. The device detects termination (e.g., lift off) of contacts 523 and 525. Object 502-5 maintains the size (e.g., width and height) from the size matching. In this example, object 502-5 is no longer selected after the completion of the size matching. As a result, the visual distinction (e.g., a thicker border) and bounding box 504-2 cease to be displayed (or removed). In some embodiments, lifting off of contact 523 immediately before or after lifting off of contact 525 (e.g., within 0.01-1 seconds, preferably within 0.1-0.2 seconds) achieves the same result. In other embodiments, object 502-5 remains selected after detecting termination of contacts 523 and 525 (not shown). In some embodiments, when contact 525 is lifted off of touch screen 112 without lifting off contact 523, the device returns to the "side/corner resizing" mode for object 502-5 (FIG. 5X).

Figure 5Y:
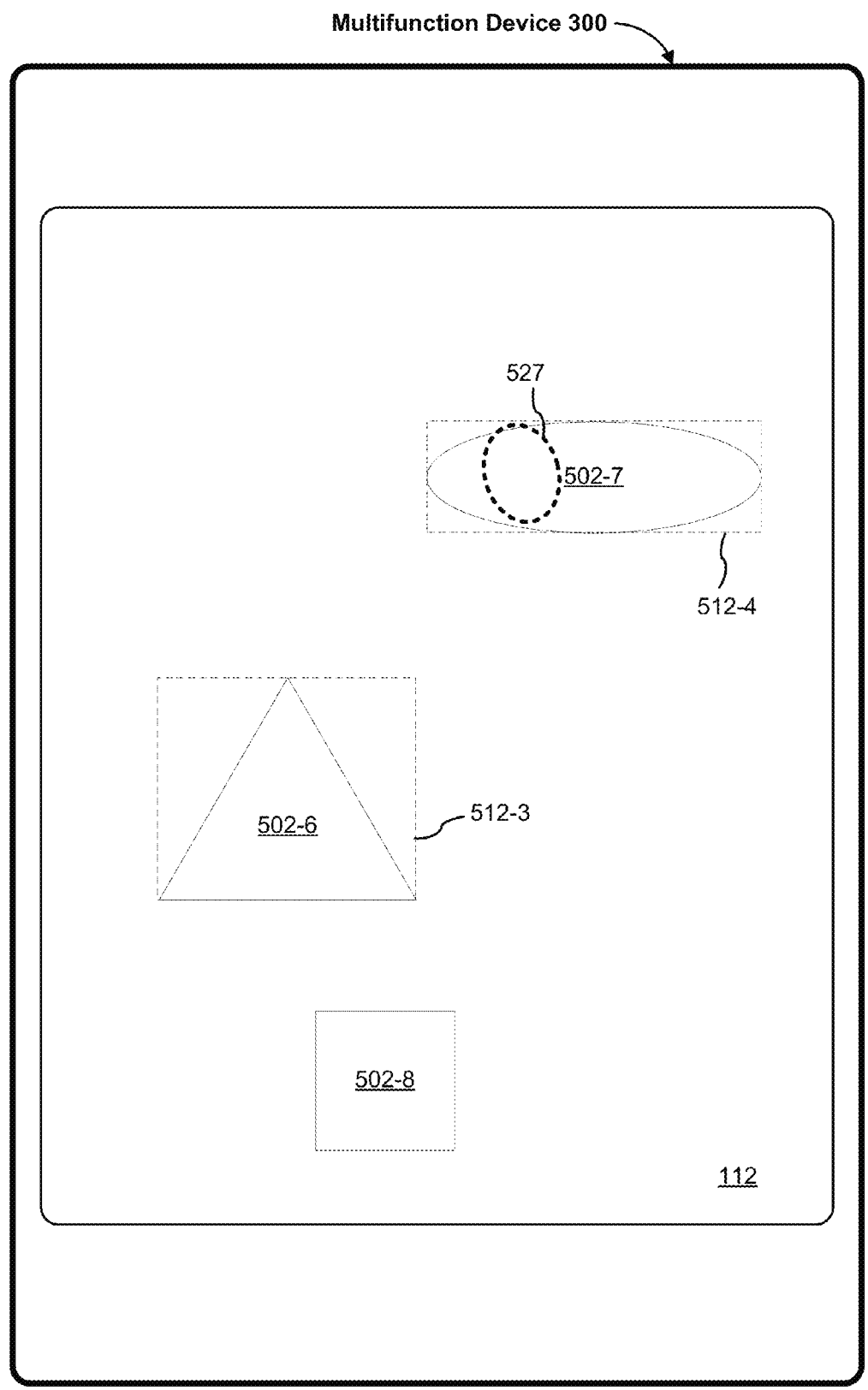

FIGS. 5Y-5GG illustrate exemplary user interfaces that include size-matching guides.

FIG. 5Y depicts an exemplary user interface displaying objects 502-6, 502-7, and 502-8. Size boxes 512-3 and 512-4 are illustrated solely for the purpose of describing the size (e.g., width and height) of each object. As depicted, objects 502-6 and 502-7 have different sizes (e.g., size boxes 512-3 and 512-4 have different sizes). FIG. 5X also illustrates detection of a tap 527 at a location on touch screen 112 corresponding to the location of object 502-7, thereby selecting object 502-7.

Figure 5Z:
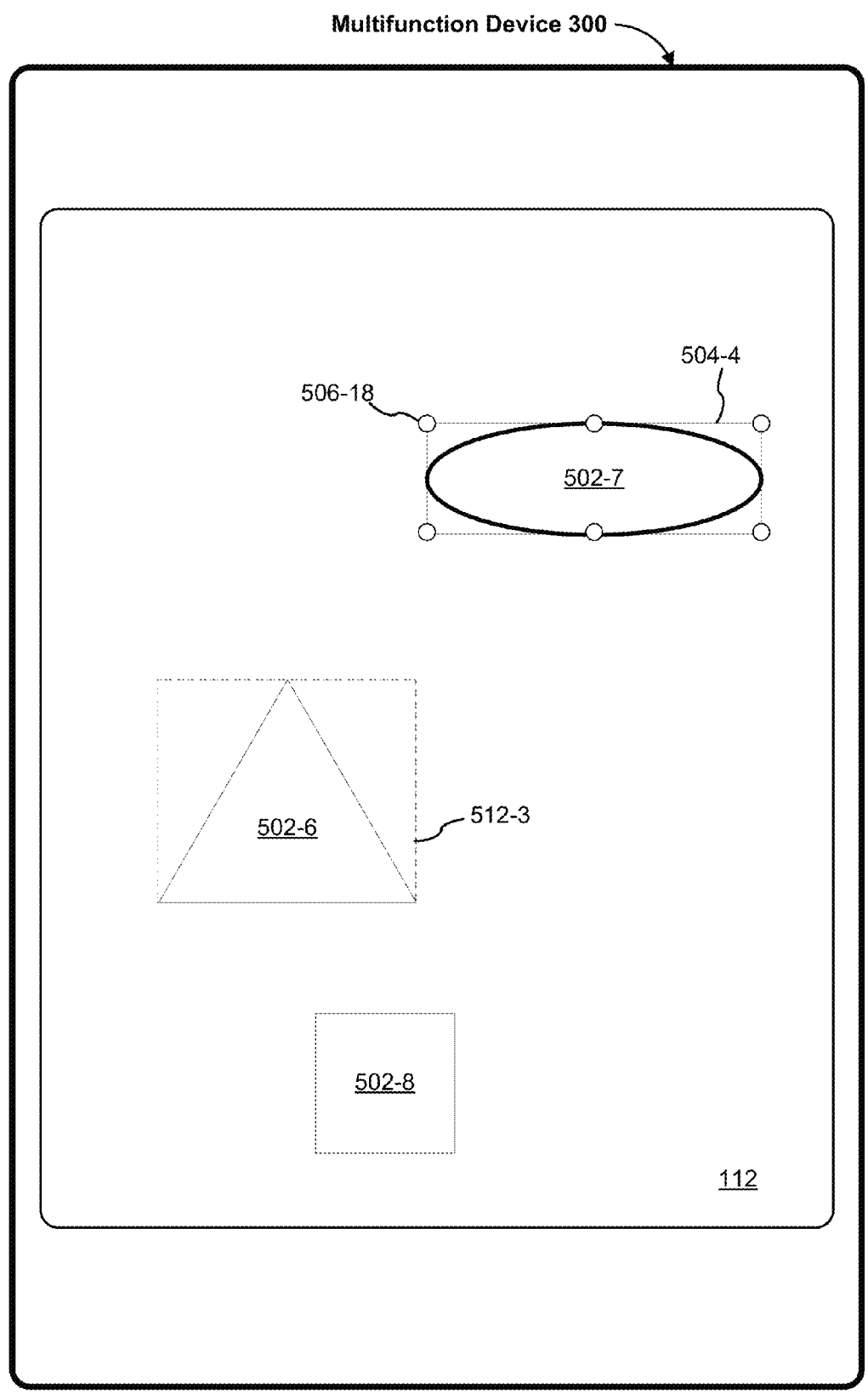
Figure 5A:
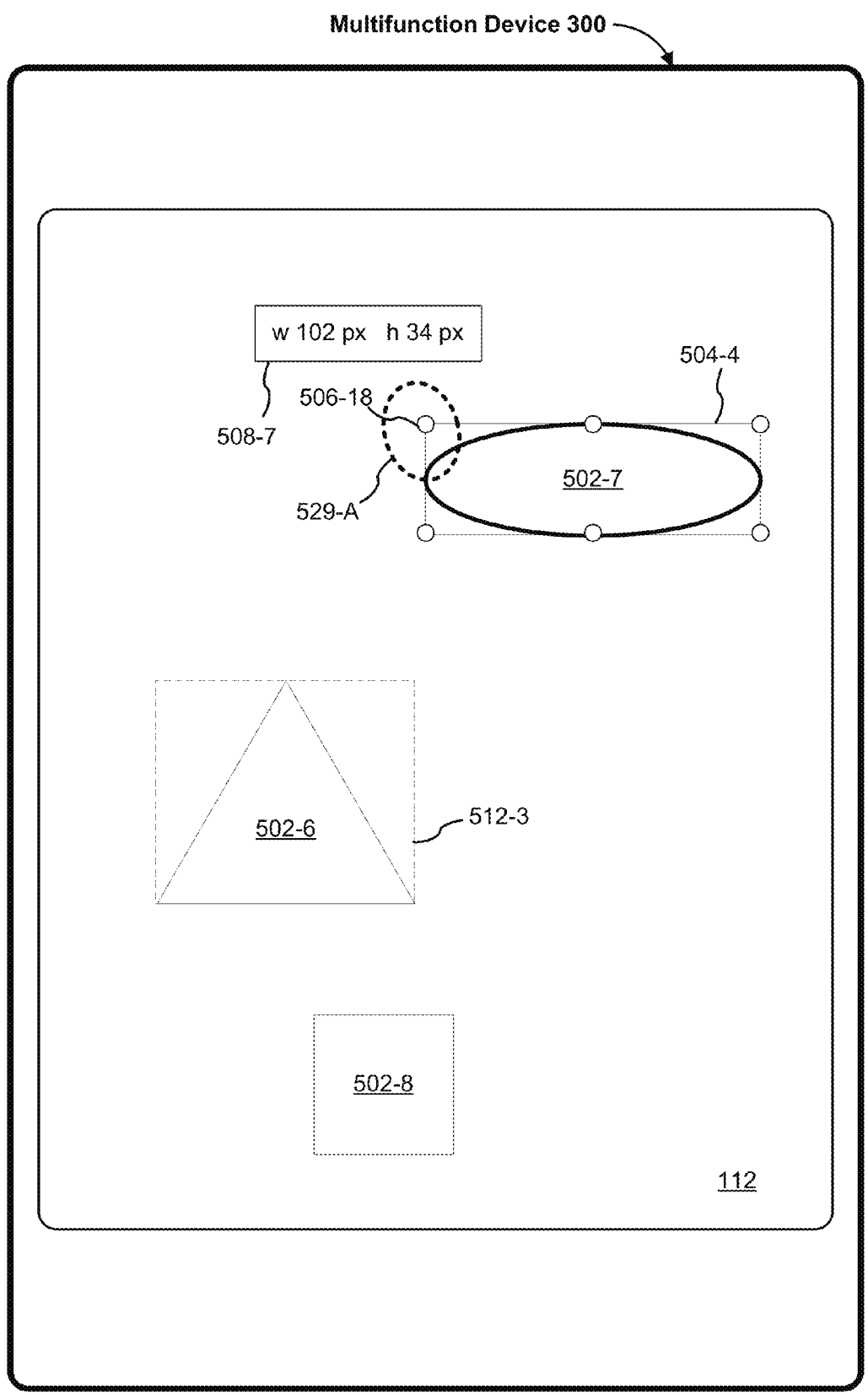
Figure 5B:
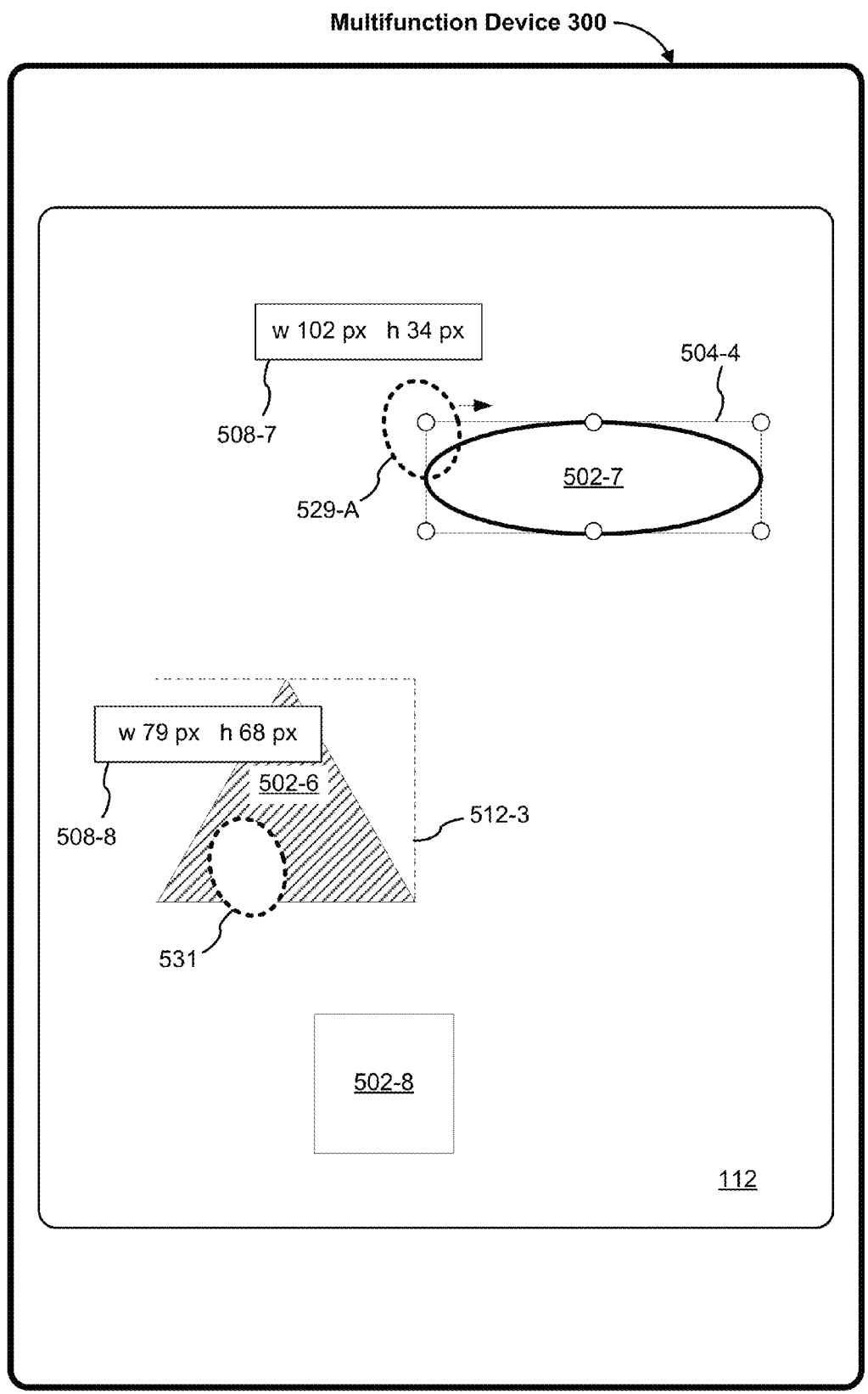
Figure 5C:
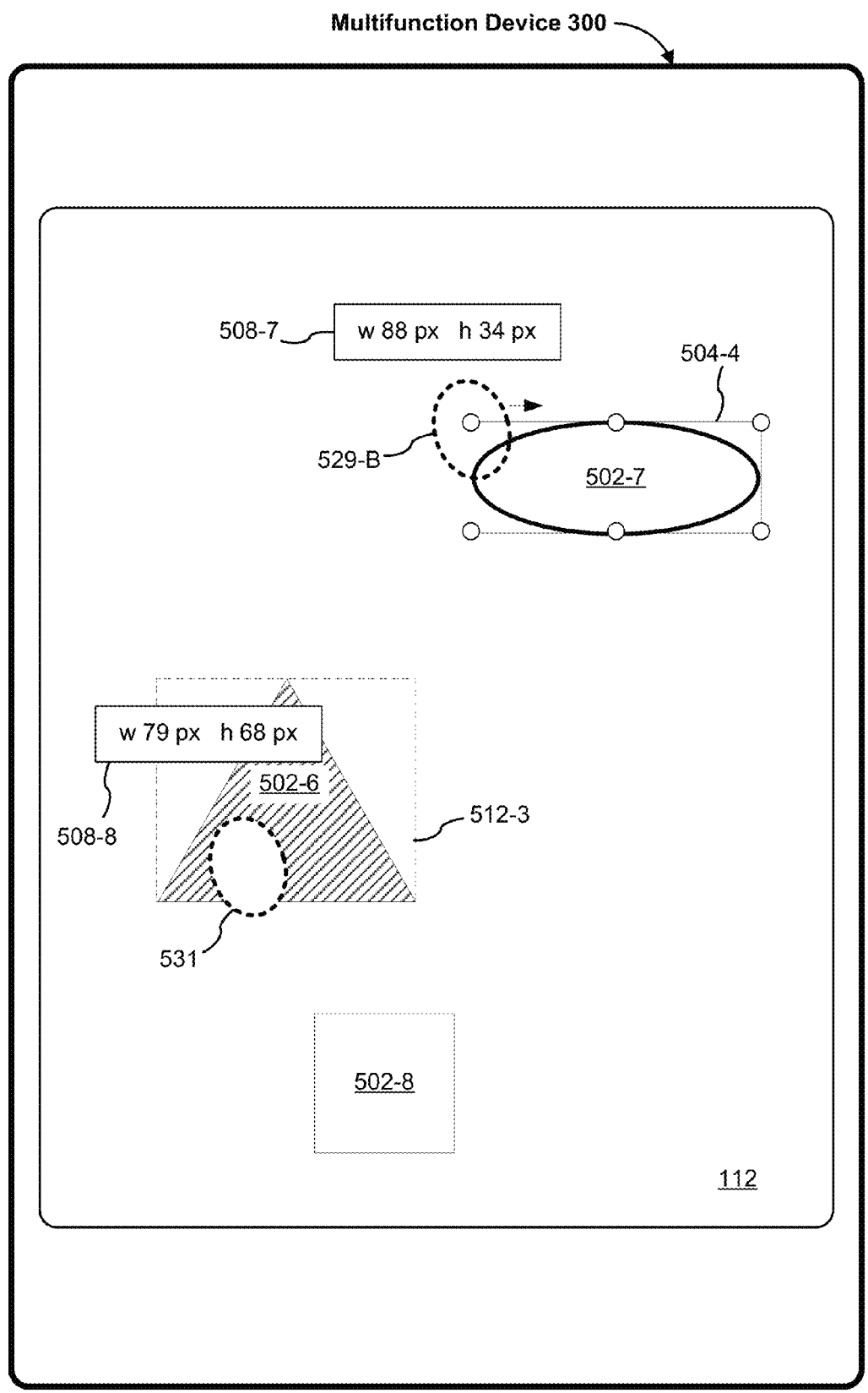
Figure 5D:
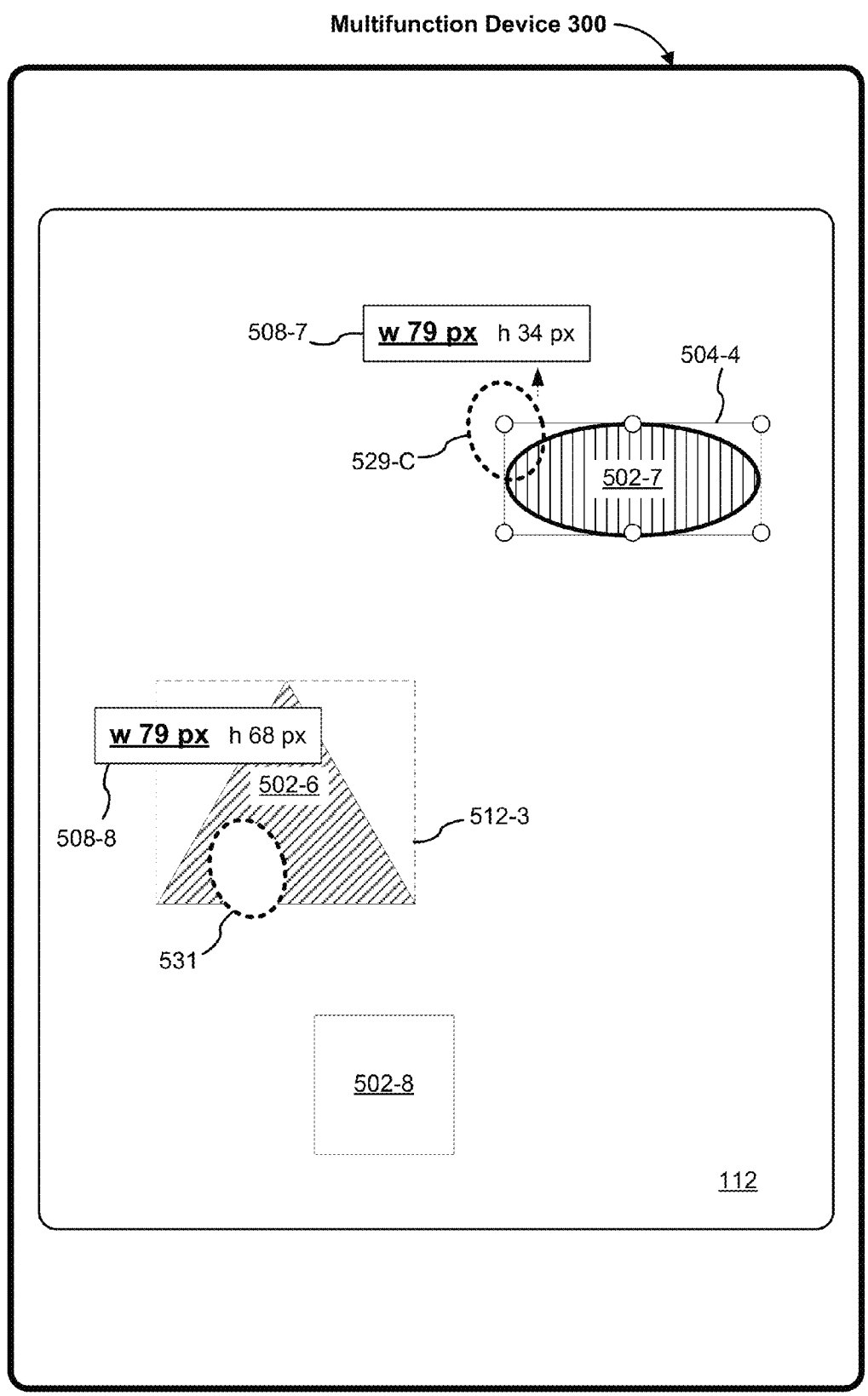
Figure 5E:
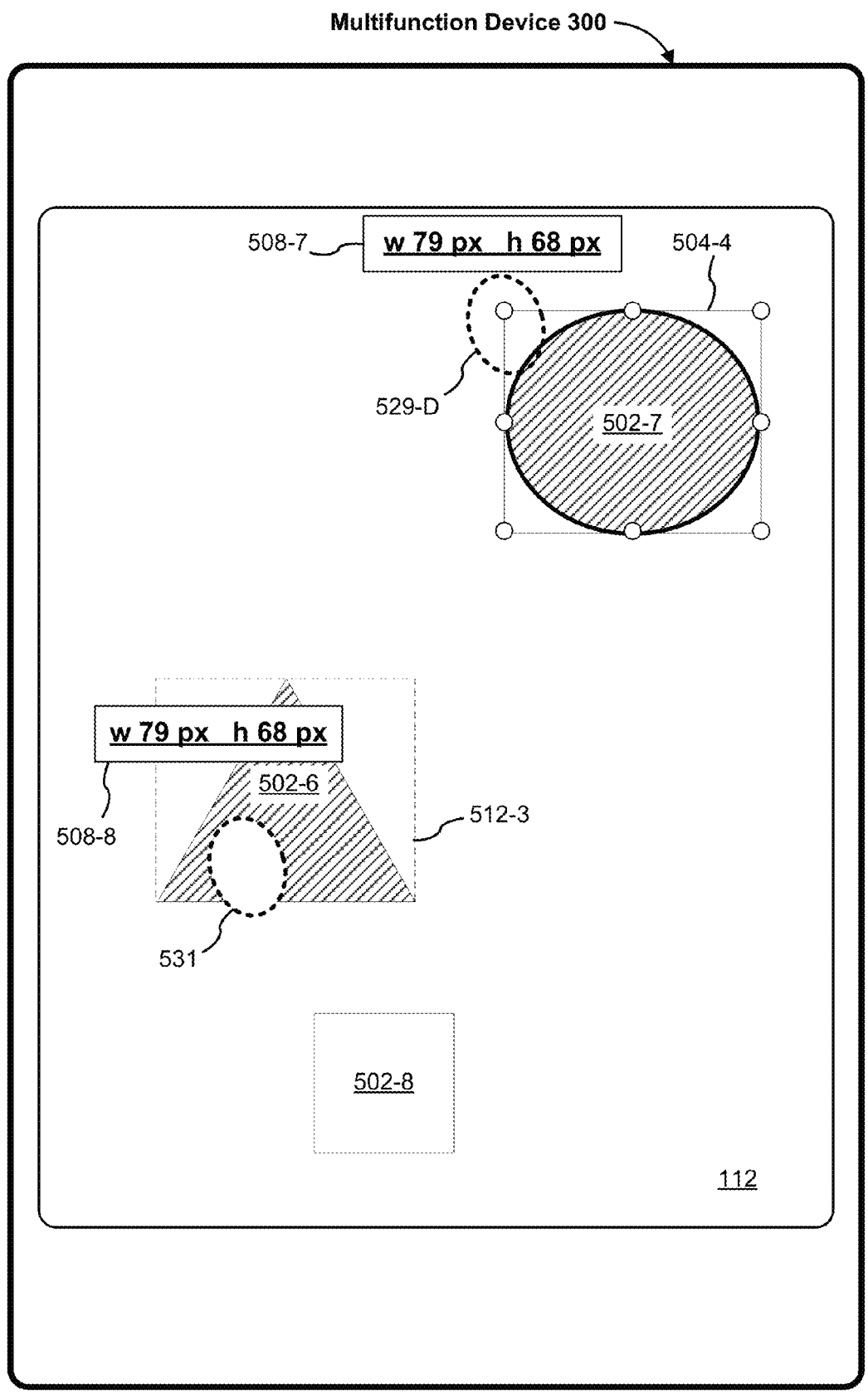
Figure 5F:
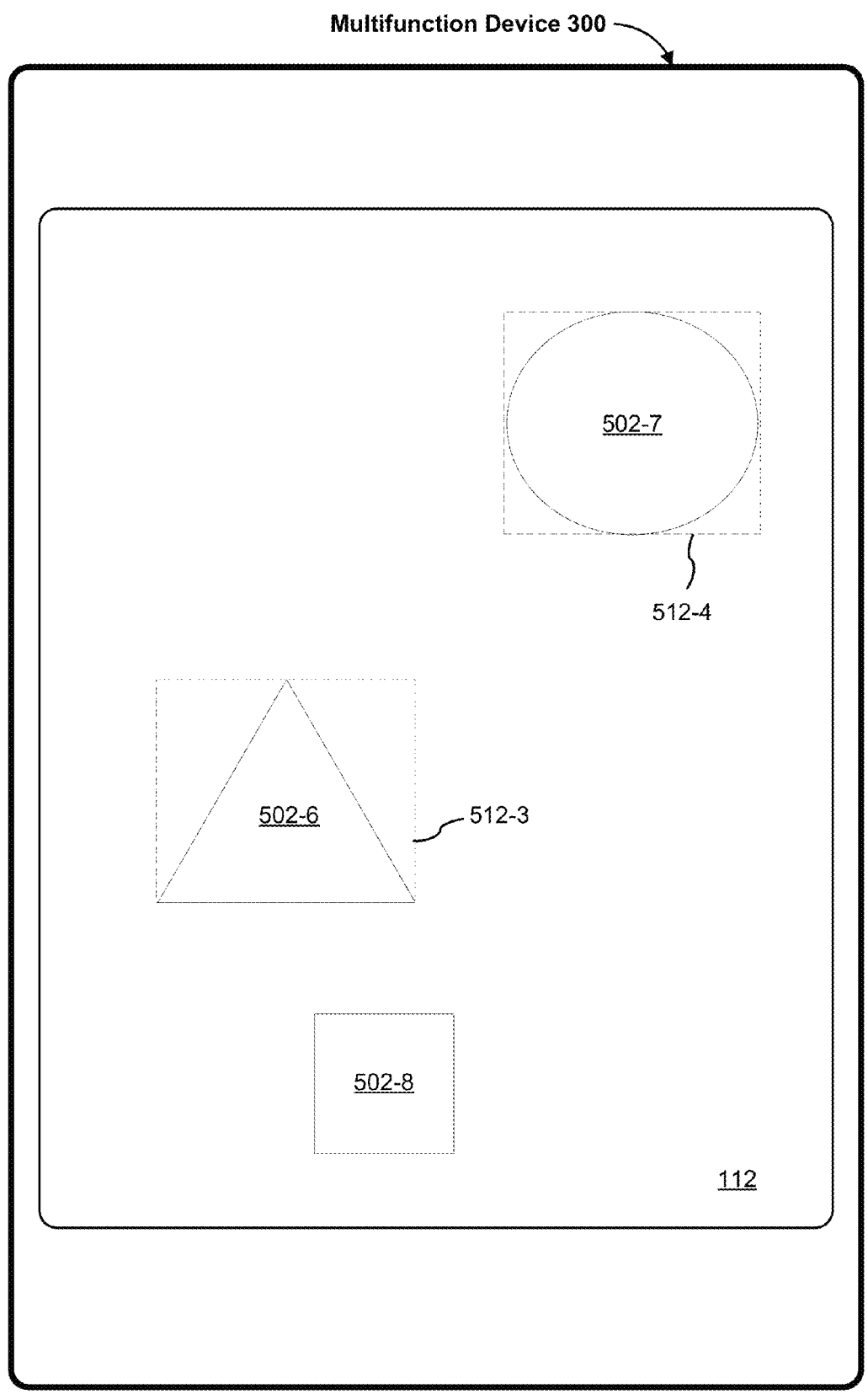
Figure 5G:
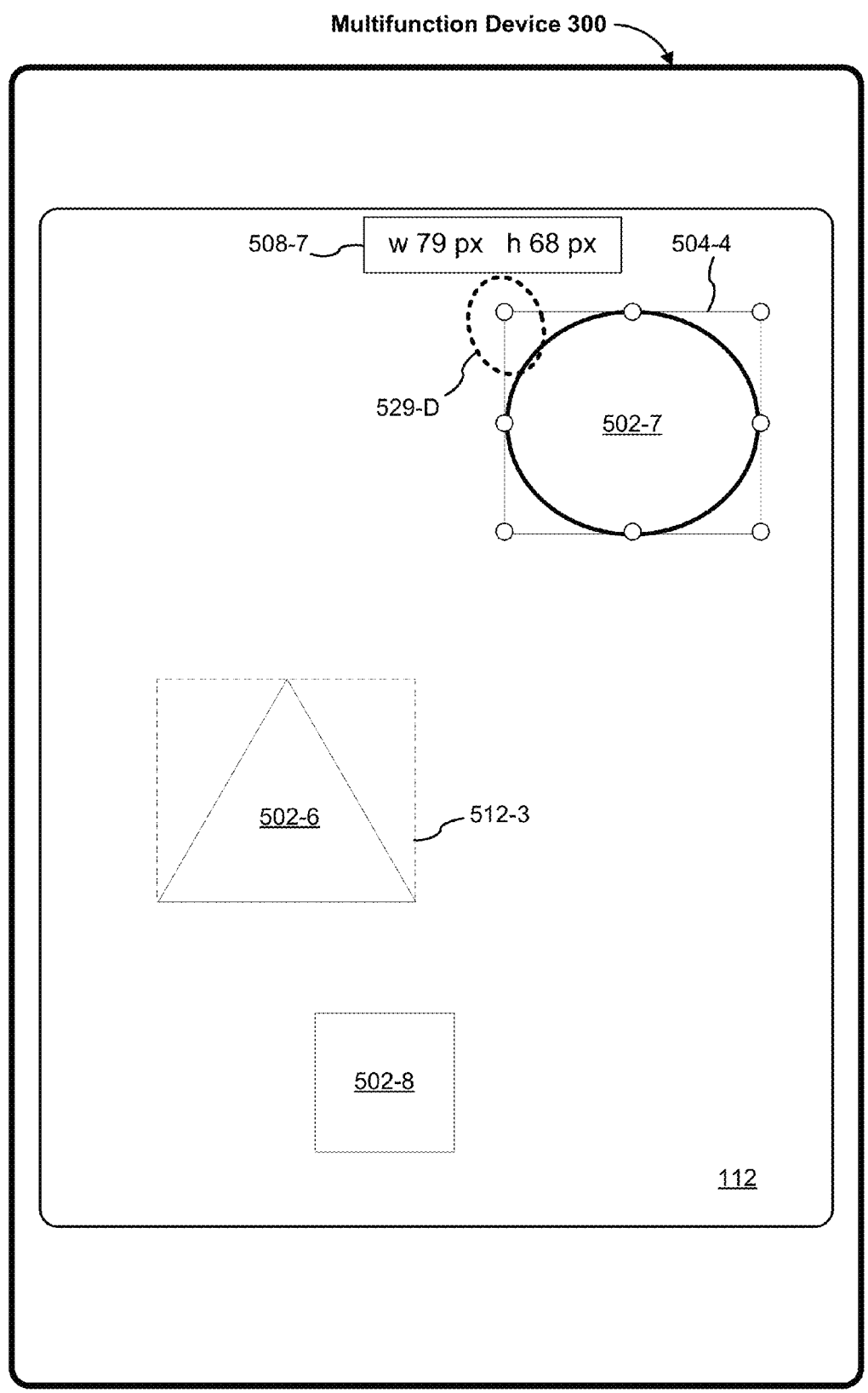

FIG. 5Z illustrates that object 502-7 is selected. In this example, selected object 502-7 is visually distinguished (e.g., the selected object has a thicker border than when unselected). Also bounding box 504-4 is displayed around selected object 502-7. In this example, bounding box 504-4 is a rectangle that fits selected object 502-7, and the width and height of bounding box 504-4 matches the width and height of object 502-7. Bounding box 504-4 includes a plurality of handles (including handle 506-18), which when activated (e.g., by a finger contact) initiate the resizing of the selected object (e.g., in the "side/corner resizing" mode). While being resized, the object scales in accordance with the bounding box.

In FIG. 5AA, contact 529 is detected at location 529-A on touch screen 112 corresponding to handle 506-18. FIG. 5AA also illustrates that callout 508-7 is displayed, indicating the width and height of object 502-7.

In FIG. 5BB, contact 531 is detected at a location on touch screen 112 corresponding to object 502-6. In this example, object 502-6 is visually distinguished (e.g., by having different shading, color, shadow, or a thicker border). In some embodiments, callout 508-8 is displayed to indicate the size (e.g., width and height) of the second object (e.g., 502-6). In some embodiments, callout 508-8, alternatively or additionally, indicates that the second object is a reference object (e.g., by displaying "reference" text). In some embodiments, callout 508-8 is displayed proximate to contact 531. In other embodiments, callout 508-8 is displayed adjacent to object 502-6 (e.g., above or below), or at a predetermined location (e.g., top or bottom of touch screen 112 or near a menu bar).

FIG. 5CC illustrates that contact 529 (e.g., a finger contact) has moved across touch screen 112 to location 529-B. Object 502-7 and bounding box 504-4 scale in accordance with movement of contact 529.

In FIG. 5DD, contact 529 (e.g., a finger contact) has moved across touch screen 112 to location 529-C. As described above, object 502-7 and bounding box 504-4 scale in accordance with the movement of contact 529, and the width of object 502-7 matches the width of object 502-6. In response, object 502-7 is visually distinguished (e.g., by having different shading, color, shadow, or a thicker border). In some embodiments, in addition to, or instead of, visually distinguishing object 502-7, callout 508-7 associated with object 502-7 and/or a portion of text located within callout 508-7 are visually distinguished (e.g., by having different font color, background color, font type, underline, font size). In this example, a portion of text within callout 508-7 displaying the width of object 502-7 is visually distinguished (e.g., in a bold, larger font with an underline). In some embodiments, callout 508-8 associated with second object 502-6 and/or a portion of text located within callout 508-8 are visually distinguished in addition to, or in stead of, visually distinguishing object 502-7 and/or callout 508-7.

FIG. 5EE illustrates that contact 529 (e.g., a finger contact) has moved further across touch screen 112 to location 529-D. As described above, object 502-7 and bounding box 504-4 scale in accordance with contact 529, and object 502-7 matches the size (e.g., width and height) of object 502-6. In response, object 502-7 is visually distinguished (e.g., by having different shading, color, shadow, or a thicker border; or by having the same shading, color, shadow, or border as second object 502-6) to indicate that the size (e.g., width and height) of object 502-7 match the size (e.g., width and height) of object 502-6. In some embodiments, in addition to, or instead of, visually distinguishing object 502-7, callout 508-7 associated with object 502-7 and/or a portion of text located within callout 508-7 are visually distinguished (e.g., by having different font color, background color, font type, underline, font size). In this example, the entire portion of text within callout 508-7 displaying the width and height of object 502-7 is visually distinguished (e.g., in a bold, larger font with an underline). In some embodiments, callout 508-8 associated with second object 502-6 and/or a portion of text located within callout 508-8 are visually distinguished in addition to, or in stead of, visually distinguishing object 502-7 and/or callout 508-7.

FIG. 5FF illustrates the user interface after completion of the resizing. The device detects termination (e.g., lift off) of contacts 529 and 531. Object 502-7 maintains the size (e.g., width and height) from the resizing. In this example, object 502-7 is no longer selected after the completion of the resizing. As a result, the visual distinction (e.g., a thicker border) and bounding box 504-4 cease to be displayed (or removed). In some embodiments, lifting off of contact 529 immediately before or after lifting off of contact 531 (e.g., within 0.01-1 seconds, preferably within 0.1-0.2 seconds) achieves the same result. In other embodiments, object 502-7 remains selected after detecting termination of contacts 529 and 531 (not shown). In some embodiments, when contact 531 is lifted off of touch screen 112 without lifting off contact 529, the device returns to the "side/corner resizing" mode for object 502-7 (FIG. 5GG).

Figure 6:
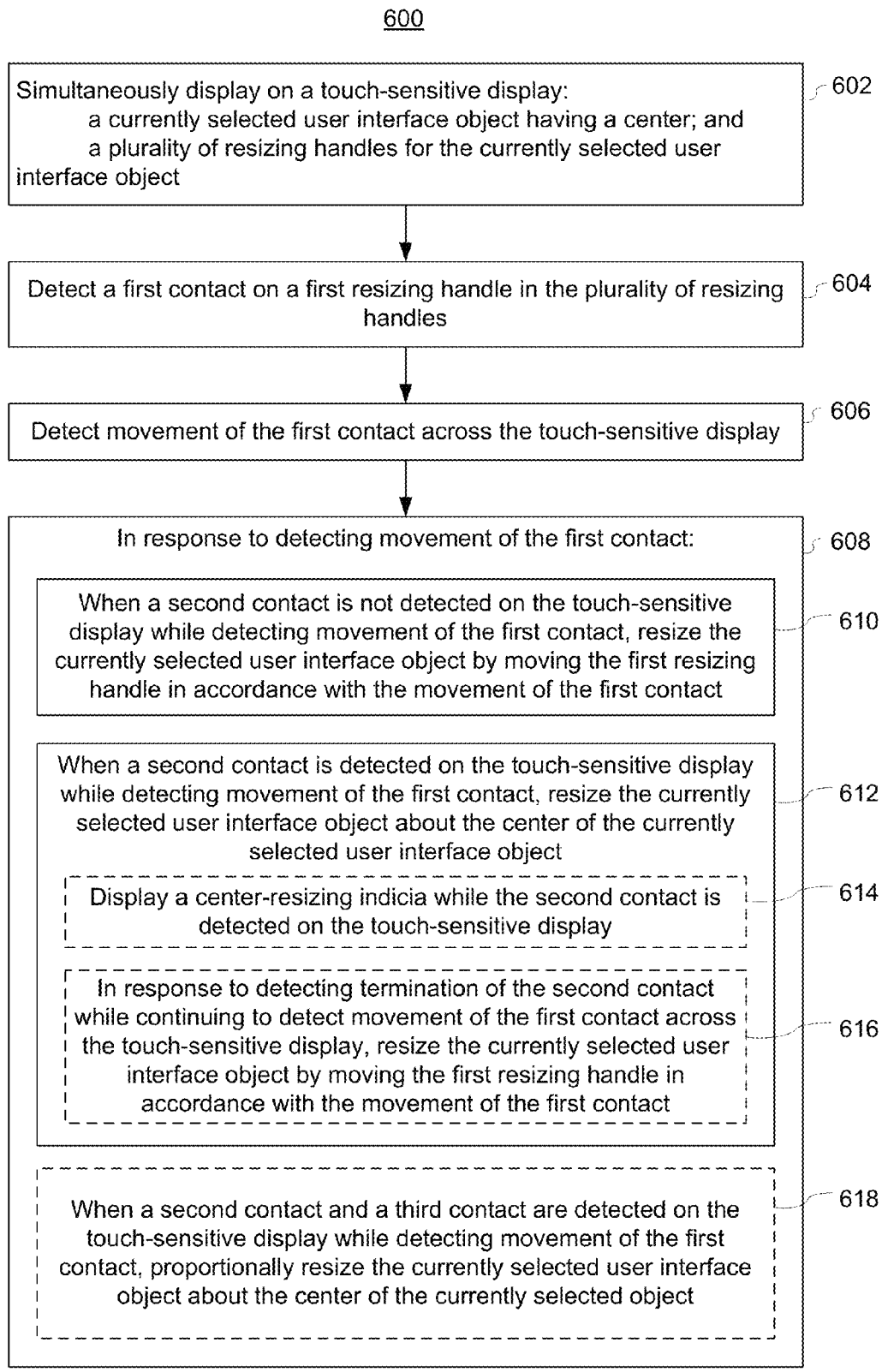
FIG. 6 is a flow diagram illustrating a method of performing side/corner resizing or center resizing in accordance with some embodiments.

FIG. 6 is a flow diagram illustrating method 600 of performing side/corner resizing or center resizing in accordance with some embodiments. Method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to perform side/corner or center resizing of a user interface object without using a keyboard. The method reduces the cognitive burden on a user when performing side/corner or center resizing, thereby creating a more efficient human-machine interface. For battery-operated computing devices, enabling a user to perform side/corner or center resizing faster and more efficiently conserves power and increases the time between battery charges.

The device simultaneously displays (602) on the touch-sensitive display: a currently selected user interface object (e.g., object 502-1 in FIG. 5B) having a center; and a plurality of resizing handles (e.g., handles 506 in FIG. 5B) for the currently selected user interface object.

The device detects (604) a first contact (e.g., contact 507 in FIG. 5C) on a first resizing handle (e.g., handle 506-5) in the plurality of resizing handles;

The device detects (606) movement of the first contact across the touch-sensitive display (e.g., contact 507 moves to location 507-B in FIG. 5D).

In response to detecting movement of the first contact (608), when a second contact is not detected on the touch-sensitive display while detecting movement of the first contact, the device resizes (610) the currently selected user interface object by moving the first resizing handle in accordance with the movement of the first contact (e.g., object 502-1 in FIGS. 5D, 5G, and 5L). In this "side/corner resizing" mode, where just the first contact is detected, the side(s)/corner of the bounding box of the currently selected object that include the first resizing handle move in concert with the movement of the first contact, while the sides of the bounding box that do not include the first resizing handle remain stationary. For example, in FIGS. 5C-5D, the bottom and right sides of bounding box 504-1, which include handle 506-5, move in concert with the movement of contact 507, while the top and left sides of bounding box 504-1, which do not include handle 506-5 remain stationary.

Conversely, in response to detecting movement of the first contact, when a second contact (e.g., contact 509 in FIG. 5E) is detected on the touch-sensitive display while detecting movement of the first contact, the device resizes (612) the currently selected user interface object about the center of the currently selected user interface object (e.g., object 502-1 in FIGS. 5E, 5H-5K, and 5M).

In this "center-resizing" mode, the sides of the currently selected object are scaled around the center point of the object in accordance with the movement of the first contact. For example, in FIGS. 5E and 5H-5K, the sides of object 502-1 are scaled around the center point of object 502-1 in accordance with the movement of contact 507. In some embodiments, while still detecting the first contact, the device exits the center-resizing mode when detection of the second contact ceases (e.g., due to lift off of the second contact) and reverts to the side/corner resizing mode. In some embodiments, after the device detects concurrently the second contact and the first contact, the device remains in the center-resizing mode until the first contact ceases to be detected (rather than switching back to the side/corner resizing mode when detection of the second contact ceases).

In some embodiments, the device displays (614) a center-resizing indicia while the second contact is detected on the touch-sensitive display. For example, in FIGS. 5E, 5H-5K, and 5M, a temporary text box (e.g., a callout box) with the words "Center Resize" appears proximate to the second contact while the second contact is detected on the touch-sensitive display.

In some embodiments, in response to detecting termination of the second contact while continuing to detect movement of the first contact across the touch-sensitive display, the device resizes (616) the currently selected user interface object by moving the first resizing handle in accordance with the movement of the first contact. For example, in FIG. 5G, after termination of second contact 509 (FIG. 5E), object 502-1 is resized by moving handle 506-5 in accordance with the movement of the first contact (in the "side/corner resizing" mode).

In some embodiments, when a second contact and a third contact (e.g., contacts 511 and 511' in FIG. 5H) are detected on the touch-sensitive display while detecting movement of the first contact, the device proportionally resizes (618) the currently selected user interface object about the center of the currently selected object.

Note that details of the processes described above with respect to method 600 are also applicable in an analogous manner to the methods described below, including method 900. For brevity, these details are not repeated below.

Figure 7A:
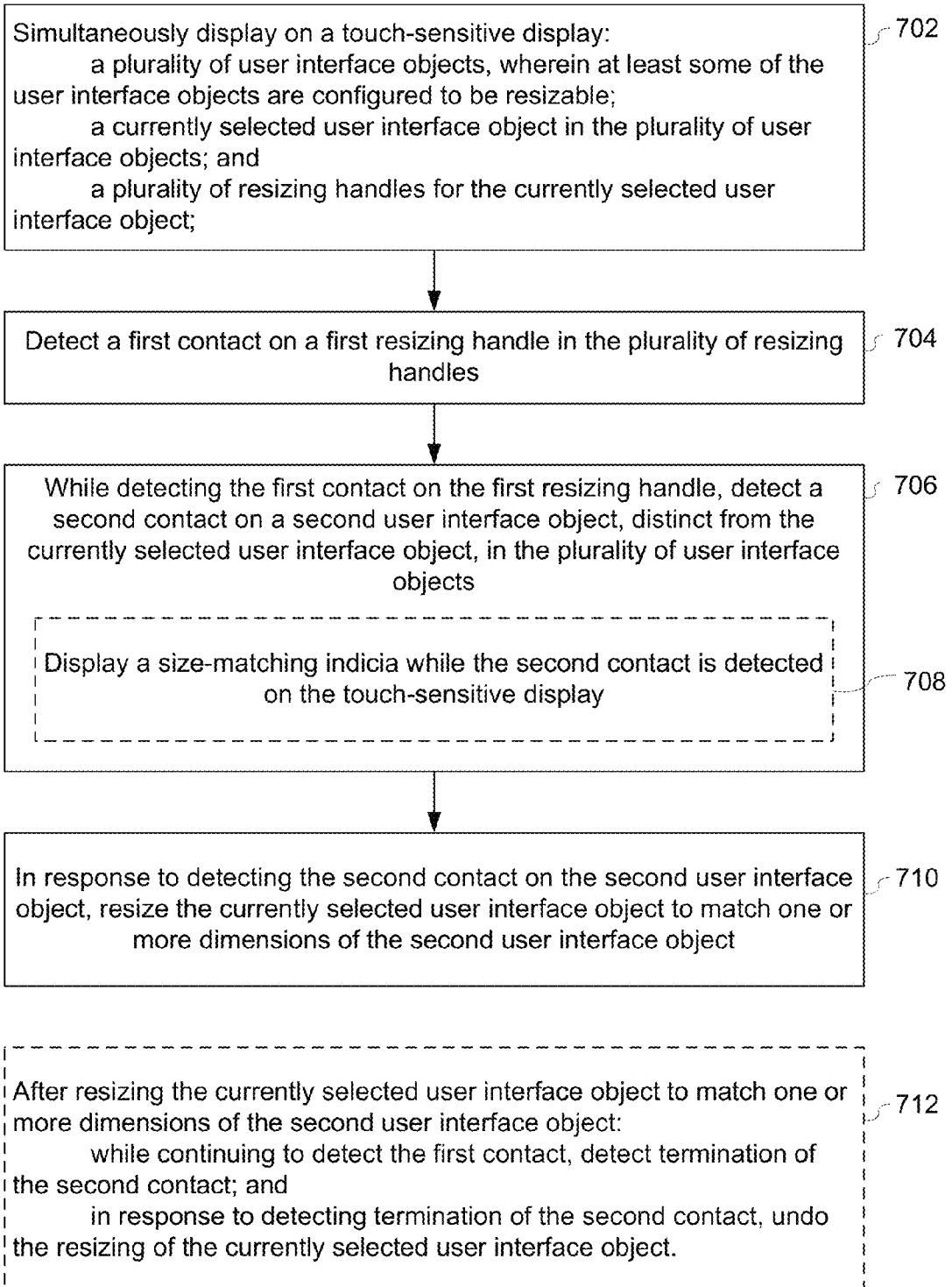

FIGS. 7A-7B are flow diagrams illustrating method 700 of performing size matching of user interface objects in accordance with some embodiments. Method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to perform size matching of user interface objects. The method reduces the cognitive burden on a user when performing size matching, thereby creating a more efficient human-machine interface. For battery-operated computing devices, enabling a user to perform size matching faster and more efficiently conserves power and increases the time between battery charges.

The device simultaneously displays (702) on the touch-sensitive display: a plurality of user interface objects (objects 502-2 and 502-3 in FIG. 5O), wherein at least some of the user interface objects are configured to be resizable; a currently selected user interface object (object 502-3) in the plurality of user interface objects; and a plurality of resizing handles (handles around object 502-3 including handle 506-9) for the currently selected user interface object.

The device detects (704) a first contact (e.g., contact 517 in FIG. 5O) on a first resizing handle (e.g., handle 506-9) in the plurality of resizing handles.

While detecting the first contact on the first resizing handle, the device detects (706) a second contact on a second user interface object, distinct from the currently selected user interface object, in the plurality of user interface objects. For example, contact 519 is detected at a location on touch screen 112 corresponding to object 502-2 in FIG. 5Q. Object 502-2 is distinct from the currently selected user interface object (e.g., object 502-3).

In some embodiments, the device displays (708) a size-matching indicia while the second contact is detected on the touch-sensitive display. For example, in FIG. 5Q, a temporary text box (e.g., a callout box) with the words "Match Size" appears proximate to contact 519 (e.g., on or near user interface object 502-2) while contact 519 is detected on the touch-sensitive display.

In response to detecting the second contact on the second user interface object, the device resizes (710) the currently selected user interface object to match one or more dimensions of the second user interface object. In this "size matching" mode, the height and/or width of the currently selected user interface object is matched to the height and/or width of a second user interface object contacted by the user. For example, in FIG. 5Q, the width and height of object 502-3 is resized to match the width and height of object 502-2 upon which a second contact (e.g., contact 519) is detected. In FIG. 5V, only the width (and not the height) of object 502-5 is matched to the width of the object 502-4.

In some embodiments, resizing the currently selected user interface object to match one or more dimensions of the second user interface object comprises (714) matching a height of the currently selected user interface object to a height of the second user interface object (e.g., matching the height of the currently selected object to the height of the second user interface object or matching the height of the bounding box for the currently selected object to the height of the bounding box for the second user interface object). For example, in FIG. 5Q, the height of object 502-3 is matched to the height of object 502-2.

In some embodiments, resizing the currently selected user interface object to match one or more dimensions of the second user interface object comprises (716) matching a width of the currently selected user interface object to a width of the second user interface object (e.g., matching the width of the currently selected object to the width of the second user interface object or matching the width of the bounding box for the currently selected object to the width of the bounding box for the second user interface object). For example, in FIG. 5Q, the width of object 502-3 is matched to the width of object 502-2. Similarly, in FIG. 5V, the width of object 502-5 is matched to the width of object 502-4.

In some embodiments, resizing the currently selected user interface object to match one or more dimensions of the second user interface object comprises (718) matching a height of the currently selected user interface object to a height of the second user interface object and matching a width of the currently selected user interface object to a width of the second user interface object (e.g., matching the width and height of the currently selected object to the width and height of the second user interface object or matching the width and height of the bounding box for the currently selected object to the width and height of the bounding box for the second user interface object). For example, in FIG. 5Q, the width and height of object 502-3 is resized to match the width and height of object 502-2 upon which a second contact (e.g., contact 519) is detected. In some embodiments, matching the height of the currently selected user interface to the height of the second user interface object and matching the width of the currently selected user interface object to the width of the second user interface object includes modifying the height-to-width ratio of the currently selected user interface object.

In some embodiments, matching the size of a first object (e.g., the currently selected user interface object) having a first height-to-width ratio to the size of a second object (e.g., the second user interface object) having a second height-to-width ratio, where the first height-to-width ratio and the second height-to-width ratio are distinct, includes determining whether to match the width of the first object to the width of the second object or, alternatively, to match the height of the first object to the height of the second object.

In some embodiments, resizing the currently selected user interface object to match one or more dimensions of the second user interface object comprises (720), when the currently selected user interface object has a constrained height-to-width ratio (e.g., a digital image), matching a height of the currently selected user interface object to a height of the second user interface object when a first predefined condition is satisfied, and matching a width of the currently selected user interface object to a width of the second user interface object when a second predefined condition is satisfied.

In some embodiments, whether to match the width of the first object to the width of the second object or, alternatively, to match the height of the first object to the height of the second object is determined in accordance with the selection of the handle on which the first contact is detected. For example, when a contact is detected on a handle on the left or right side of the object (e.g., handles 506-10 and 506-14 in FIG. 5T), after detecting the second contact on the second user interface object, the device matches the width of the currently selected user interface object to the width of the second user interface object. In contrast, when a contact is detected on a handle on the top or bottom of the object (e.g., handles 506-16 and 506-12), after detecting the second contact on the second user interface object, the device matches the height of the currently selected user interface object to the height of the second user interface object. In this case, the first predefined condition is satisfied when a first contact is detected on a top or bottom handle of the currently selected user object when the second contact is detected on the second user interface object, and the second predefined condition is satisfied when the first contact is detected on a side handle of the currently selected user object when the second contact is detected on the second user interface object.

Conversely, in some embodiments, when a contact is detected on a handle on the left or right side of the object, in response to detecting the second contact on the second user interface object, the device matches the height of the currently selected user interface object to the height of the second user interface object. When the contact is detected on a handle on the top or bottom of the object, in response to detecting the second contact on the second user interface object, the device matches the width of the currently selected user interface object to the width of the second user interface object. In this case, the first predefined condition is satisfied when the first contact is detected on a side handle of the currently selected user object when the second contact is detected on the second user interface object, and the second predefined condition is satisfied when the first contact is detected on a top or bottom handle of the currently selected user object when the second contact is detected on the second user interface object.

In some embodiments, whether the currently selected user interface object matches the height or width of the second user interface object is determined in accordance with the size of the currently selected user interface object (when a second contact is detected on the second user interface object). In description of this method (and also in description of FIG. 7C), the following terms are used:
- a first width refers to a width of the currently selected user interface object (when a second contact is detected on the second user interface object);
- a second width refers to a width of the second user interface object;
- a first height refers to a height of the currently selected user interface object (when a second contact is detected on the second user interface object);
- a second height refers to a height of the second user interface object;
- a width difference refers to a difference between the first width and the second width; and
- a height difference refers to a difference between the first height and the second height.

In this method, the first predefined condition is satisfied when the height difference is smaller than the width difference, and the second predefined condition is satisfied when the width difference is smaller than the height difference.

Figure 7C:
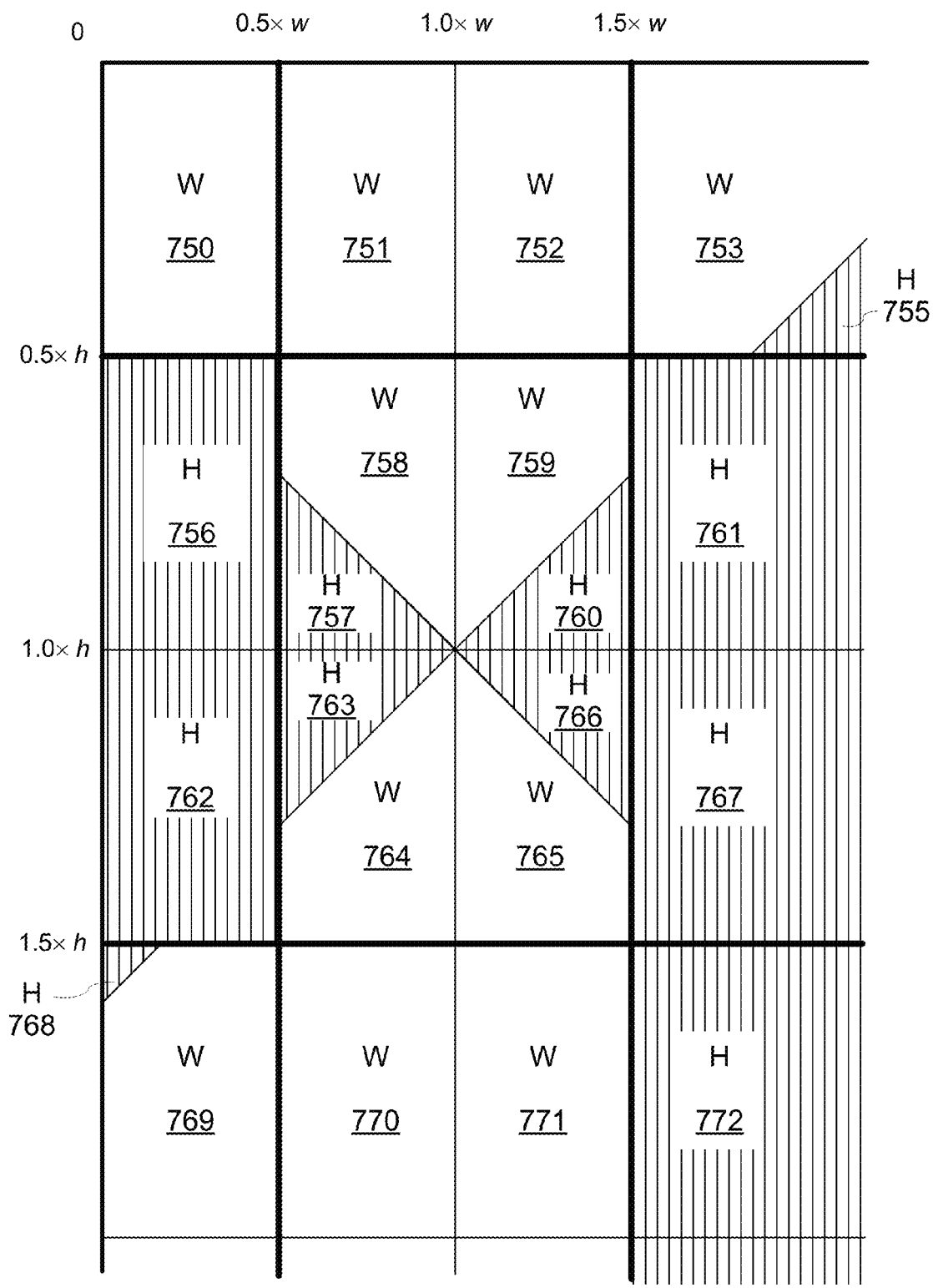
FIG. 7C illustrates an exemplary method of determining whether to match a height or width of a first object to the height or width of a second object.

FIG. 7C illustrates an exemplary method of determining whether to match a height or width of a first object to the height or width of a second object. The method illustrated in FIG. 7C represents a more sophisticated method involving multiple thresholds. FIG. 7C depicts a size chart drawn in accordance with the size of the second user interface object, where the second height is larger than the second width.

In FIG. 7C, thresholds are used to provide rules for determining whether the currently selected user interface object matches the height or width of the second user interface object. Thresholds are determined in accordance with the size of the second user interface object. In this example, the minimum width threshold is half the second width (i.e., 0.5×w), and the maximum width is one-and-a-half times the second width ((i.e., 1.5×w). Similarly, the minimum height threshold is half the second height (i.e., 0.5×h), and the maximum height threshold is one-and-a-half times the second height (i.e., 1.5×h).

FIG. 7C also illustrates a plurality of zones, representing the size of the currently selected user interface object in terms of the thresholds and additional rules. Each zone is labeled with either a character "W" or a character "H." In addition, the "H" zones are shaded.

When the size of the currently selected user interface object (when a second contact is detected on the second user interface object) belongs to a "W" zone, the currently selected user interface object is resized to match the width of the second user interface object, while maintaining the height-to-width ratio. When the size of the currently selected user interface object (when a second contact is detected on the second user interface object) belongs to an "H" zone, the currently selected user interface object is resized to match the height of the second user interface object, while maintaining the height-to-width ratio. In other words, the first predefined condition is satisfied when the size of the currently selected user interface object (when a second contact is detected on the second user interface object) belongs to an "H" zone, and the second predefined condition is satisfied when the size of the currently selected user interface object (when a second contact is detected on the second user interface object) belongs to a "W" zone.

For example, when the first width is larger than the maximum width threshold (e.g., 1.5×w) and the first height is larger than the maximum height threshold (e.g., 1.5×h), the size of the currently selected object belongs to "H" zone 772, and therefore the first predefined condition is satisfied. When the first width is smaller than the minimum width threshold (e.g., 0.5×w) and the first height is smaller than the minimum height threshold (e.g., 0.5×h), the size of the currently selected object belongs to "W" zone 750, and therefore the second predefined condition is satisfied.

Although FIG. 7C illustrates the conditions when the second height is larger than the second width, it would be obvious for a person having ordinary skill in the art to apply an analogous method when the second height is smaller than the second width (e.g., zone 750 becomes an "H" zone and zone 772 becomes a "W" zone when the second height is smaller than the second width).

In some embodiments, when the currently selected user interface object has a constrained height-to-width ratio, the device resizes (722) the currently selected user interface object, while maintaining the constrained height-to-width ratio, so as to satisfy a predefined size relationship to a bounding box for the second user interface object (e.g., resize to fit within the bounding box; or resize so that one dimension, but not both dimensions, of the currently selected user interface object fits within the bounding box). For example, in FIG. 5U-5V, digital image object 502-5 has a constrained height-to-width ratio, the device resizes digital image object 502-5 while maintaining the constrained height-to-width ratio so as to satisfy a predefined size relationship to a bounding box for the second user interface object (e.g., resize so that the width of object 502-5 matches the width of the bounding box for object 502-4).

In some embodiments, after resizing the currently selected user interface object to match one or more dimensions of the second user interface object, the device, while continuing to detect the first contact, detects (712) termination of the second contact. In response to detecting termination of the second contact, the device undoes the resizing of the currently selected user interface object (not shown). In some embodiments, the size matching of the currently selected object to the second object is reversed if the second contact lifts off before the first contact lifts off, and the currently selected object returns to its size immediately prior to the size matching (e.g., in FIG. 5X, object 502-5 returns to its size immediately prior to the size matching). In some embodiments, in response to detecting termination of the second contact, the device terminates the "size matching" mode, and switches to the "side/corner resizing" mode (e.g., in FIG. 5X, the device switches to the "side/corner resizing" mode).

Note that details of the processes described above with respect to method 700 are also applicable in an analogous manner to the methods described below, including methods 800 and 900. For brevity, these details are not repeated below.

Figure 8:
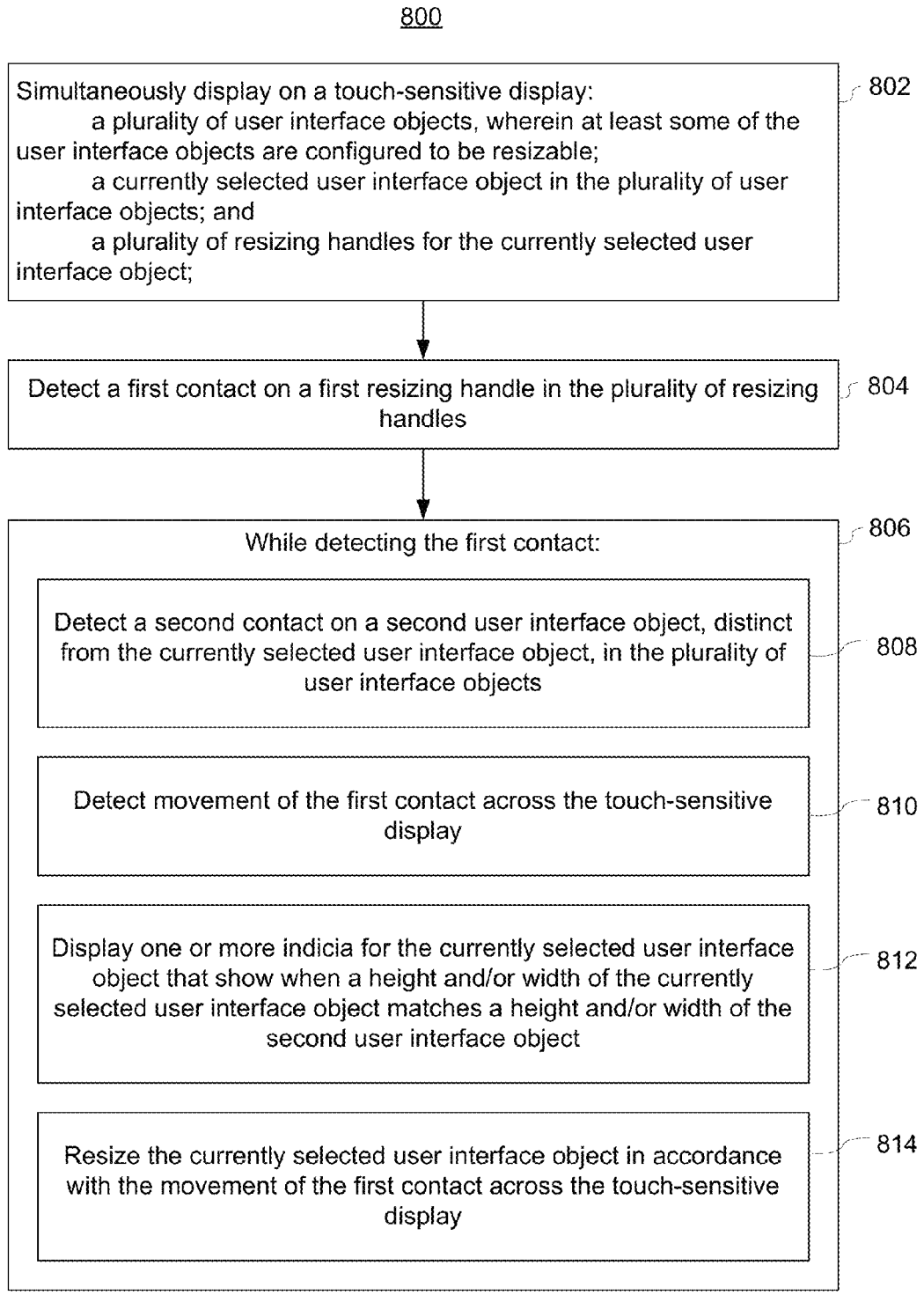
FIG. 8 is a flow diagram illustrating a method of performing guided size matching in accordance with some embodiments.

FIG. 8 is a flow diagram illustrating method 800 of performing guided size matching in accordance with some embodiments. Method 800 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides an intuitive way to perform guided size matching. The method reduces the cognitive burden on a user when matching one or more dimensions of a first object to a second object, thereby creating a more efficient human-machine interface. For battery-operated computing devices, enabling a user to perform guided size matching faster and more efficiently conserves power and increases the time between battery charges.

The device simultaneously display (802) on the touch-sensitive display: a plurality of user interface objects (e.g., objects 502-6, 502-7, and 502-8 in FIG. 5Z), wherein at least some of the user interface objects are configured to be resizable; a currently selected user interface object in the plurality of user interface objects (e.g., objects 502-7); and a plurality of resizing handles for the currently selected user interface object (e.g., handles around object 502-7, including handle 506-18).

The device detects (804) a first contact (e.g., contact 529 in FIG. 5AA) on a first resizing handle (e.g., handle 506-18) in the plurality of resizing handles.

While detecting the first contact (806), the device detects (808) a second contact on a second user interface object, distinct from the currently selected user interface object, in the plurality of user interface objects (e.g., in FIG. 5BB, contact 531 is detected on second user interface object 502-6, which is distinct from selected user interface object 502-7).

Also while detecting the first contact (806), the device detects (810) movement of the first contact across the touch-sensitive display (e.g., movement of contact 529 in FIGS. 5BB-5EE).

While detecting the first contact (806), the device displays (812) one or more indicia for the currently selected user interface object that show when a height and/or width of the currently selected user interface object matches a height and/or width of the second user interface object. For example, in FIG. 5DD, object 502-7 and callouts 508-7 and 508-8 are visually distinguished to indicate that the width of object 502-7 matches the width of object 502-6). Similarly, in FIG. 5EE, object 502-7 and callouts 508-7 and 508-8 are visually distinguished to indicate that the width and height of object 502-7 respectively matches the width and height of object 502-6).

While detecting the first contact (806), the device resizes (814) the currently selected user interface object (e.g., object 502-7) in accordance with the movement of the first contact (e.g., contact 529) across the touch-sensitive display (e.g., see FIGS. 5BB-5EE).

FIG. 9 is a flow diagram illustrating method 900 of performing side/corner resizing, center-resizing, or size matching in accordance with some embodiments. Method 900 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, method 900 provides an intuitive way to perform side/corner resizing, center-resizing, or size matching without using a keyboard. The method reduces the cognitive burden on a user when performing side/corner resizing, center-resizing, or size matching, thereby creating a more efficient human-machine interface. For battery-operated computing devices, enabling a user to perform side/corner resizing, center-resizing, or size matching faster and more efficiently conserves power and increases the time between battery charges.

The device simultaneously displays (902) on the touch-sensitive display: a plurality of user interface objects, wherein at least some of the user interface objects are configured to be resizable; a currently selected user interface object in the plurality of user interface objects, the currently selected user interface object having a center; and a plurality of resizing handles for the currently selected user interface object (e.g., a plurality of objects 502-1 and 502-9, currently selected object 502-1, and handles 506 in FIG. 5B; a plurality of objects 502-2 and 502-3, currently selected object 502-3, and handles around object 502-3 including handle 506-9 in FIG. 5O; or a plurality of objects 502-6, 502-7, and 502-8, currently selected object 502-7, and handles around object 502-7 including handle 506-18 in FIG. 5Z).

The device detects (904) a first contact on a first resizing handle in the plurality of resizing handles (e.g., contact 507 in FIG. 5C; contact 517 in FIG. 5O; or contact 529 in FIG. 5AA).

When a second contact is not detected on the touch-sensitive display while detecting movement of the first contact across the touch-sensitive display, the device resizes (906) the currently selected user interface object (e.g., object 502-1) by moving the first resizing handle (e.g., handle 506-5) in accordance with the movement of the first contact (e.g., contact 507). For example, see the "side/corner resizing" mode as depicted in FIGS. 5C-5D.

When the second contact is detected on the touch-sensitive display (908), and when the second contact is detected on a second user interface object, distinct from the currently selected user interface object, in the plurality of user interface objects, the device resizes (910) the currently selected user interface object to match one or more dimensions of the second user interface object. For example, in FIG. 5Q, contact 519 is detected at a location on touch screen 112 corresponding to object 502-2, which is distinct from currently selected user interface object (e.g., object 502-3). In response, the device resizes currently selected user interface object (e.g., object 502-3) to match one or more dimensions of the second user interface object (e.g., object 502-2).

When the second contact is detected on the touch-sensitive display (908), and when the second contact is not detected on another user interface object, distinct from the currently selected user interface object, in the plurality of user interface objects, while detecting movement of the first contact, the device resizes (912) the currently selected user interface object about the center of the currently selected user interface object. For example, in FIG. 5E, contact 509 is detected at a location on touch screen 112 corresponding to object 502-1, and the location of contact 509 does not correspond to another user interface object (e.g., object 502-9) distinct from the currently selected user interface object (e.g., object 502-1). In response, while detecting movement of the first contact (e.g., contact 507), the device resizes the currently selected user interface object (e.g., object 502-1) about the center of the currently selected user interface object (e.g., object 502-1) (i.e., "center-resizing).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6, 7A-7B, 8, and 9 may be implemented by components depicted in FIGS. 1A-1C. For example, detection operations 604 and 606, resizing operations 610 and 612, and indicia displaying operation 614 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 180 associated with the detection of the event or sub-event. Event handler 180 may utilize or call data updater 176 or object updater 177 to update the application internal state 192. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computing device, comprising:
   a touch-sensitive display;
   one or more processors;
   memory; and
   one or more programs, wherein the one or more programs are stored in the memory and configured to be executed by the one or more processors, the one or more programs including instructions for:

simultaneously displaying on the touch-sensitive display:
a currently selected user interface object having a center; and
a plurality of resizing handles for the currently selected user interface object;
detecting a first contact on a first resizing handle in the plurality of resizing handles;
detecting movement of the first contact across the touch-sensitive display; and,
in response to detecting movement of the first contact:
when a second contact on the currently selected user interface object, distinct from the first contact and stationary, is not detected on the touch-sensitive display while detecting movement of the first contact, resizing the currently selected user interface object by moving the first resizing handle in accordance with the movement of the first contact; and,
when the second contact on the currently selected user interface object, distinct from the first contact and stationary, is concurrently detected on the touch-sensitive display while detecting movement of the first contact, resizing the currently selected user interface object about the center of the currently selected user interface object, wherein the center of the resized object remains fixed at a location on the display during the resizing.

2. The device of claim 1, including instructions for:
when the second contact and a third contact are detected on the touch-sensitive display while detecting movement of the first contact, proportionally resizing the currently selected user interface object about the center of the currently selected object.

3. The device of claim 1, including instructions for:
displaying a center-resizing indicia while the second contact is detected on the touch-sensitive display.

4. The device of claim 1, including instructions for:
in response to detecting termination of the second contact while continuing to detect movement of the first contact across the touch-sensitive display, resizing the currently selected user interface object by moving the first resizing handle in accordance with the movement of the first contact.

5. A method, comprising:
at a computing device with a touch-sensitive display:
simultaneously displaying on the touch-sensitive display:
a currently selected user interface object having a center; and
a plurality of resizing handles for the currently selected user interface object;
detecting a first contact on a first resizing handle in the plurality of resizing handles;
detecting movement of the first contact across the touch-sensitive display; and,
in response to detecting movement of the first contact:
when a second contact on the currently selected user interface object, distinct from the first contact and stationary, is not detected on the touch-sensitive display while detecting movement of the first contact, resizing the currently selected user interface object by moving the first resizing handle in accordance with the movement of the first contact; and,
when the second contact on the currently selected user interface object, distinct from the first contact and stationary, is concurrently detected on the touch-sensitive display while detecting movement of the first contact, resizing the currently selected user interface object about the center of the currently selected user interface object, wherein the center of the resized object remains fixed at a location on the display during the resizing.

6. The method of claim 5, wherein the one or more programs include instructions for, when the second contact and a third contact are detected on the touch-sensitive display while detecting movement of the first contact, proportionally resizing the currently selected user interface object about the center of the currently selected object.

7. The method of claim 5, wherein the one or more programs include instructions for displaying a center-resizing indicia while the second contact is detected on the touch-sensitive display.

8. The method of claim 5, wherein the one or more programs include instructions for, in response to detecting termination of the second contact while continuing to detect movement of the first contact across the touch-sensitive display, resizing the currently selected user interface object by moving the first resizing handle in accordance with the movement of the first contact.

9. A non-transitory computer readable storage medium storing one or more programs, the one or more programs comprising instructions, which when executed by a computing device with a touch-sensitive display, cause the device to:
simultaneously display on the touch-sensitive display:
a currently selected user interface object having a center; and
a plurality of resizing handles for the currently selected user interface object;
detect a first contact on a first resizing handle in the plurality of resizing handles;
detect movement of the first contact across the touch-sensitive display; and,
in response to detecting movement of the first contact:
when a second contact on the currently selected user interface object, distinct from the first contact and stationary, is not detected on the touch-sensitive display while detecting movement of the first contact, resizing the currently selected user interface object by moving the first resizing handle in accordance with the movement of the first contact; and, when the second contact on the currently selected user interface object, distinct from the first contact and stationary, is concurrently detected on the touch-sensitive display while detecting movement of the first contact, resizing the currently selected user interface object about the center of the currently selected user interface object, wherein the center of the resized object remains fixed at a location on the display during the resizing.

10. The computer readable storage medium of claim 9, wherein the instructions, which when executed by the computing device with the touch-sensitive display, cause the device to, when the second contact and a third contact are detected on the touch-sensitive display while detecting movement of the first contact, proportionally resizing the currently selected user interface object about the center of the currently selected object.

11. The computer readable storage medium of claim 9, wherein the instructions, which when executed by the computing device with the touch-sensitive display, cause the device to display a center-resizing indicia while the second contact is detected on the touch-sensitive display.

12. The computer readable storage medium of claim 9, wherein the instructions, which when executed by the computing device with the touch-sensitive display, cause the device to, in response to detecting termination of the second contact while continuing to detect movement of the first contact across the touch-sensitive display, resize the currently selected user interface object by moving the first resizing handle in accordance with the movement of the first contact.

* * * * *